US011836677B2

(12) United States Patent
Avery, Jr. et al.

(10) Patent No.: US 11,836,677 B2
(45) Date of Patent: Dec. 5, 2023

(54) SYSTEMS, METHODS, AND MEDIA FOR MANAGING INVENTORY ASSOCIATED WITH A FACILITY

(71) Applicant: Direct Supply, Inc., Milwaukee, WI (US)

(72) Inventors: William L. Avery, Jr., West Chicago, IL (US); Ryan G. Colwell, West Band, WI (US); Andrew J. Novotny, Whitefish Bay, WI (US); Nathanial C. Ziarek, Muskego, WI (US)

(73) Assignee: Direct Supply, Inc., Milwaukee, WI (US)

( * ) Notice: Subject to any disclaimer, the term of this patent is extended or adjusted under 35 U.S.C. 154(b) by 0 days.

(21) Appl. No.: 17/326,989

(22) Filed: May 21, 2021

(65) Prior Publication Data

US 2021/0357855 A1 Nov. 18, 2021
US 2023/0169461 A9 Jun. 1, 2023

Related U.S. Application Data

(63) Continuation of application No. 16/875,476, filed on May 15, 2020, now Pat. No. 11,037,101.
(Continued)

(51) Int. Cl.
*G06Q 10/08* (2023.01)
*G06Q 10/0875* (2023.01)
(Continued)

(52) U.S. Cl.
CPC ....... *G06Q 10/0875* (2013.01); *G06F 3/0482* (2013.01); *G06F 3/0486* (2013.01);
(Continued)

(58) Field of Classification Search
CPC . G06Q 10/0875; G06F 3/0482; G06F 3/0486; H04L 67/12; H04W 4/80; H04W 40/244
See application file for complete search history.

(56) References Cited

U.S. PATENT DOCUMENTS 5,797,515 A 8/1998 Liff
5,991,728 A 11/1999 DeBusk
(Continued)

OTHER PUBLICATIONS

Hu, Ying, et al. "Supporting RFID-based item tracking applications in Oracle DBMS using a bitmap datatype." Proceedings of the 31st international conference on Very large data bases. (Year: 2005).*
(Continued)

*Primary Examiner* — Nathan A Mitchell
(74) *Attorney, Agent, or Firm* — Quarles & Brady LLP

(57) ABSTRACT

In accordance with some embodiments of the disclosed subject matter, mechanisms (which can, for example, include systems, apparatuses, methods, and media) for managing inventory associated with a facility are provided. In some embodiments, a method is provided comprising: receiving identifying information of items; causing a mobile device to present a subset of items in a user interface; receiving transmitting device identification information, the device associated with a first location; determining, based on the transmitter identifying information, a location of the mobile device within the facility; receiving an indication items are being stored at the location of the mobile device; associating the items with the location; causing a computing device to present a user interface that includes identifying information associated with the items in connection with a location of the items.

20 Claims, 42 Drawing Sheets

Related U.S. Application Data

(60) Provisional application No. 62/849,457, filed on May 17, 2019.

(51) Int. Cl.
*G06F 3/0482* (2013.01)
*H04L 67/12* (2022.01)
*H04W 4/80* (2018.01)
*H04W 40/24* (2009.01)
*G06F 3/0486* (2013.01)

(52) U.S. Cl.
CPC ............. *H04L 67/12* (2013.01); *H04W 4/80* (2018.02); *H04W 40/244* (2013.01)

(56) References Cited

U.S. PATENT DOCUMENTS

| | | |
|---|---|---|
| 6,068,156 A | 5/2000 | Liff |
| 6,283,322 B1 | 9/2001 | Liff |
| 6,471,089 B2 | 10/2002 | Liff |
| 6,581,204 B2 | 6/2003 | DeBusk |
| 6,581,798 B2 | 6/2003 | Liff |
| 6,776,304 B2 | 8/2004 | Liff |
| 6,814,254 B2 | 11/2004 | Liff |
| 6,814,255 B2 | 11/2004 | Liff |
| 7,151,982 B2 | 12/2006 | Liff |
| 7,427,002 B2 | 9/2008 | Liff |
| 7,668,761 B2 | 2/2010 | Jenkins |
| 7,860,724 B2 | 12/2010 | Chudy |
| 7,991,507 B2 | 8/2011 | Liff |
| 8,099,339 B1 | 1/2012 | Pinsonneault |
| 8,126,736 B2 | 2/2012 | Anderson |
| 8,280,549 B2 | 10/2012 | Liff |
| 8,463,622 B2 | 6/2013 | Garms |
| 8,571,886 B2 | 10/2013 | Chudy |
| 8,849,449 B2 | 9/2014 | Waugh |
| 8,930,214 B2 | 1/2015 | Woolford |
| 8,965,796 B1 | 2/2015 | Gala |
| 9,171,344 B2 | 10/2015 | Yu |
| 9,378,484 B1 | 6/2016 | Russell |
| 9,451,674 B1 | 9/2016 | Kong |
| RE46,326 E | 2/2017 | Dearing |
| 9,665,848 B1 | 5/2017 | Johnson |
| 10,013,669 B2 | 7/2018 | McCullough |
| 10,235,653 B1 | 3/2019 | Stubbs |
| 10,262,296 B2 | 4/2019 | McCullough |
| 10,304,030 B1 | 5/2019 | Tzannakos |
| 10,510,442 B2 | 12/2019 | Adams |
| 10,562,706 B1 | 2/2020 | Lee |
| 2003/0216969 A1* | 11/2003 | Bauer ............ G06K 17/00 705/22 |
| 2005/0209947 A1 | 9/2005 | Shafer |
| 2006/0015408 A1* | 1/2006 | Brown ........... G06Q 30/02 705/22 |
| 2006/0076397 A1 | 4/2006 | Langos |
| 2007/0150383 A1 | 6/2007 | Shakes |
| 2007/0239569 A1 | 10/2007 | Lucas |
| 2008/0262948 A1* | 10/2008 | Grady ............ G06Q 30/04 705/28 |
| 2009/0081008 A1 | 3/2009 | Somin |
| 2009/0313365 A1* | 12/2009 | Whitehead ...... G06Q 30/02 709/223 |
| 2012/0005105 A1* | 1/2012 | Beier ............ G06Q 10/087 705/303 |
| 2014/0100769 A1 | 4/2014 | Wurman |
| 2014/0236844 A1* | 8/2014 | Shaw ............ G06Q 30/012 705/303 |
| 2015/0012294 A1* | 1/2015 | Casady ........... G16H 40/20 705/2 |
| 2015/0012396 A1 | 1/2015 | Puerini |
| 2015/0019391 A1* | 1/2015 | Kumar ........... G06Q 10/087 705/28 |
| 2016/0005003 A1 | 1/2016 | Norris |
| 2017/0221070 A1* | 8/2017 | Stout ............ G06Q 30/014 |
| 2017/0262797 A1* | 9/2017 | Wicks ............ G16H 40/40 |
| 2018/0150789 A1* | 5/2018 | Millhouse ....... G06Q 10/30 |
| 2018/0204636 A1* | 7/2018 | Edwards ......... G16H 40/67 |
| 2018/0324550 A1* | 11/2018 | Todeschini ..... G06Q 10/087 |
| 2018/0357100 A1* | 12/2018 | Lalani ........... G06F 16/2228 |
| 2021/0334682 A1* | 10/2021 | Darmour ......... G06N 20/00 |

OTHER PUBLICATIONS

Jayaraman, Raja, Fatima AlHammadi, and Mecit Can Emre Simsekler. "Managing product recalls in healthcare supply chain." 2018 IEEE International Conference on Industrial Engineering and Engineering Management (IEEM). IEEE, 2018. (Year: 2018).*

Lei, Dai, and Sun Xiao. "Building the information management system of defective product recalls." 2011 IEEE 3rd International Conference on Communication Software and Networks. IEEE, 2011. (Year: 2011).*

Wells, Jeff. "First responders: What grocery stores do when recalls happen". Retrieved from <https://www.grocerydive.com/news/grocery--first-responders-what-grocery-stores-do-when-recalls-happen/535213/>. Originally published Apr. 2017. (Year: 2017).*

Ouva. Smart Hospital Wayfinding Solutions webpage. Accessed online at https://www.ouva.co/landing/smart-wayfinding-solution-for-hospitals on Jul. 17, 2020.

Hybrent. Hybrent Homepage. Accessed online at https://hybrent.com/. Version accessed on Jan. 22, 2019.

A. De Blas and D. Lopez-de-Ipina, "Improving trilateration for indoors localization using BLE beacons," 2017 2nd International Multidisciplinary Conference on Computer and Energy Science (SpliTech), Split, 2017, pp. 1-6. (Year: 2017).

J. He, W. Xu and P. Chen, "Using the Beacon Eechnology on Imporvement of Inventory and Ligistics Cirriculum Training," 2018 1st IEEE International Conference on Knowledge Innovation and Invention (ICKII), Jeju, 2018, pp. 317-320, doi: 10.1109/ICKII.2018.8569140. (Year: 2018).

Ramakrishnan, R., Gaur, L., & Singh, G. (2016). Feasibility and Efficacy of BLE Beacon IoT Devices in Inventory Management at the Shop Floor. International Journal of Electrical and Compuet Engineering (IJECE), 6(5), 2362-2368 (Year: 2016).

\* cited by examiner

| DSS! | Master Order Guides | Order Guide Download | Restrictions | Alerts | Reports | | | | ♣ YourNet ⌄ |
|---|---|---|---|---|---|---|---|---|---|

Janitorial Supplies ⟵ Name of General Order Guide　　　　Save Selections ⟶ Save Enabled Locations

|  | Facility Name | | | | | | | |
|---|---|---|---|---|---|---|---|---|
|  | Name | ID | Address Line 1 | Address Line 2 | City | State | Zip | DC Name | DC # |
| ○ |  |  |  |  |  |  |  |  |  |
| ● | Facility 1 | 12101 | 123 Maple St |  | Mapleton | IL | 61547 | Illinois | 011 |
| ● | Facility [Element to Select/Deselect Facility] nnovation Dr |  |  |  | P Distribution Center Assoc. w/ Facility |  | 53223 | Wisconsin | 024 |
| ○ | Facility |  | 0 South Fourth Avenue |  |  |  | 40202 | Tennessee | 011 |
| ○ | Facility 3 | 0000 | 6767 N Industrial Dr | #7 | Milwaukee | WI | 53223 | Wisconsin | 024 |
| ○ | Facility 4 |  | 7000 | 680 South Fourth Avenue |  | Louisville | KY | 40202 | Tennessee | 022 |

FIG. 10B

DSSI Master Order Guides | Order Guide Download | Restrictions | Alerts | Reports | ● Meagan's Healthcare ∨

Master Order Guides > Casual Cafe Menu

[ Casual Cafe Menu ] ——— Name of General Order Guide

REFINE BY
☐ Coverage Alerts
☐ Phase out

▒▒ Full Coverage  ▓▓ Needs Coverage

Aggregate Item Coverage
(#items covering all locs/#items)

Items Needing Coverage
0

Master Items         Unique Products in Product Group

Q Search Table                                                          [▦] [▦] [✕] [↗ GROUP] [+ ADD]

Items per page: 20 ∨                                                                       1 of 1 ❮ 1 ❯

| | Master Item Name | Products | Location Coverage | Distribution Center Coverage | Actions |
|---|---|---|---|---|---|
| ☐ ❯ | Broccoli Cheese Frozen ▪ Unassigned | 3 | 4/4 | 2/2 | ✎ 🗑 |
| ☐ ❯ | Dough Cookie Chocolate Chip ▪ Unassigned | 1 | 4/4 | 2/2 | ✎ 🗑 ← Delete |
| ☐ ❯ | Soup Broccoli Cheese ▪ Unassigned | 1 | 4/4 | 2/2 | ✎ 🗑 |
| ☐ ❯ | Turkey Breasy Sliced Smoked 2/3oz ▪ Unassigned | 2 | 4/4 | 2/2 | ✎ 🗑 |
| ☐ ❯ | Wrap Spinach ▪ Unassigned | 2 | 4/4 | 2/2 | ✎ 🗑 |

Edit ↑     Expand ↑

Item Coverage by DC

Items per page: 20 ∨         Item Coverage by Facility                  1 of 1 ❮ 1 ❯

Product Group ↗
Expand ↗

FIG. 10C

DSSI | Master Order Guides | Order Guide Download | Restrictions | Alerts | Reports | 👤 Meagan's Healthcare ⌄

Master Order Guides › Casual Cafe Menu

Master Items

🔍 Search Table ← Search Field

[⊞] [|||] [✕]   ⁺GROUP   [+ ADD]

Items per page: 20 ⌄   1 of 1 ‹ 1 › ⌃

| ☐ | Master Item Name | Products | Location Coverage | Distribution Center Coverage | Actions |
|---|---|---|---|---|---|
| ☐ ˅ | Broccoli Cheese Frozen ⓘ Unassigned | 3 | 4/4 | 2/2 | ✏️ 🗑️ |

| Priority | Product # | Description |
|---|---|---|
| 1 | ⓘ 6076030 | Soup Broccoli Cheese |
| 2 | ⓘ 2582039 | Soup Broccoli Cheese Gold Concentrate |
| 3 | ⓘ 2582229 | Soup Broccoli Cheese Concentrate |

| ☐ › | Dough Cookie Chocolate Chip ⓘ Unassigned | 1 | 4/4 | 2/2 | ✏️ 🗑️ |
| ☐ › | Soup Broccoli Cheese ⓘ Unassigned | 1 | 4/4 | 2/2 | ✏️ 🗑️ |
| ☐ › | Turkey Breasy Sliced Smoked 2/3oz ⓘ Unassigned | 2 | 4/4 | 2/2 | ✏️ 🗑️ |
| ☐ › | Wrap Spinach ⓘ Unassigned | 2 | 4/4 | 2/2 | ✏️ 🗑️ |

Items per page: 20 ⌄   1 of 1 ‹ 1 › ⌃

FIG. 10D

OSSI Master Order Guides | Order Guide Download | Restrictions | Alerts | Reports | ● OGM3 Demo Site ⌄

Master Order Guides >Catering>Fuel, Canned Stem Wick ← Product Group  ✏ Fuel, Canned Stem Wick | 💾 Save Master Item
↳ Edit Product Group Name

Prioritize Products

ADD PRODUCTS BY:
🔍 Search
▦ Product Number

DISPLAY OPTIONS
Categories
☑ Expanded Descriptions

SELECTION RULE
Stocked, Demand, then Central ⌄ ← Selection Rule

Name of General Order Guide

3/4
Total Coverage

3
Products Selected

Selected Products

| Priority | Product # | Description | Brand | Pack/Size | UM | Price | Price Per Unit | Prop | Stocking | Coverage | Actions |
|---|---|---|---|---|---|---|---|---|---|---|---|
| > 1 | 6076030 | Fuel Canned Chafing Stem Wick | ACME | 24/6 HR | - | - | - | - | - | 3/4 | 🗑 |
| > 2 | 2171926 | Fuel Canned Heat Stem Wick Leaving Soon | BLAMCO | 24/6 HR | - | - | - | ALL | - | 2/4 | 🗑 |
| > 3 | 2351684 | Fuel Canned Chafing Wick Green | BLAMCO | 24/6 HR | - | - | - | - | ● Central | 3/4 | 🗑 |

✨ Sage Suggests:  ▦  ✕

| Priority | Product # | Description | Brand | Pack/Size | UM | Price | Price Per Unit | Prop | Stocking | Coverage | Actions |
|---|---|---|---|---|---|---|---|---|---|---|---|
| > 1 | 4783678 | Fuel Canned Chafing Wick 4hr | ACME | 24/4 HR | - | - | - | - | ● Central | 4/4 (+1) | + |
| > 2 | 2171944 | Fuel Canned Heat Handy Wick | BLAMCO | 24/2 HR | - | - | - | - | ● Central | 0/4 (+0) | + |
| > 3 | 2212300 | Fuel Canned Heat Handy Wick Leaving Soon | BLAMCO | 24/6 HR | - | - | - | - | ● Central | 0/4 (+0) | + |

Suggested Alternatives    Facilities Covered    Increase in Coverage    Add to Product Group

FIG. 10E

| | | | | | | |
|---|---|---|---|---|---|---|
| DSSI Master Order Guides | Order Guide Download | Restrictions | Alerts | Reports | | 🔒 YourNet ▾ |

Acme Distribution

Master Order Guide [ DSSI Test Site - 44320 ▾ ]   [ Download ]   [ Clear ]

| Master Item | Product # | Description | Brand | Pack/Size | DC # | DC Name |
|---|---|---|---|---|---|---|
| AAA Batteries | 1148H | Alkaline Batteries, AAA, 8 Batteries/Pack | | 8/EA | | Wisconsin |
| D Cell Batteries | 4755H | Alkaline Batteries, D, 12/Pack | | 12/EA | | Wisconsin |
| Industrial Alkaline Batteries, AAA, 24 Batteries/box | H1556 | Industrial Alkaline Batteries, AAA, 24 Batteries/box | | 24/EA | | Wisconsin |
| Aloe Vera Gel | 3939394 | ALOE VERA GEL 16OZ | BLAMCO | 1/BT | | Illinois |
| Moisturizer | 4329394 | MOISTURIZER, 16OZ | BLAMCO | 1/EA | | Illinois |
| Flat Upholstery Set with Full Armrests, 16"2 X 16"d | 13680 | Flat Upholstery Set with Full Armrests, 16"2 X 16"d | | 1/EA | | Wisconsin |
| General-purpose Vinyl Gloves, Clear, Medium, 3 Mil, 100/box | E3048 | General-purpose Vinyl Gloves, Clear, Medium, 3 Mil, 100/box | | 100/EA | | Minnesota |

*Product Group* → (Gloves row)
*Selected Product For Facility Order Guide* → (E3048 row)
*General Order Guide* → (Gloves)

FIG. 10G

Master Order Guides | Order Guide Download | Restrictions | Alerts | Reports

Alerts

VIEW ALERTS BY TYPE
- ⦿ Inactivated Products
- ○ Coverage

[All Suppliers ▼]

| Date | Master Order Guide | Master Item | Message | Actions |
|---|---|---|---|---|
| 1/24/2019 | Pharmaceuticals | Acetamin 160 Mg/5Ml Af Susp 4Oz 12/Cs | Product #OCT6220 was inactivated at Acme Drugs | Acknowledge \| Resolve |
| 1/24/2019 | Medical Supplies | Adapter, Luer, Female/Female, 1" | Product #324243 was inactivated at Globex Healthcare | Acknowledge \| Resolve |
| 1/24/2019 | Medical Supplies | Adapter Luer Lock Double Male | Product #342435 was inactivated at Globex Healthcare | Acknowledge \| Resolve |
| 1/17/2019 | Medical Supplies | Accessory, 14" Brush | Product #676753 was inactivated at Globex Healthcare | Acknowledge \| Resolve |

FIG. 10H

Availability Summary

Blank - Product # is not available
S - Product # is stocked || D - Product # is a demand status item || R - Product # is a remotely stocked item
p - Product # is marked as proprietary || * - Product # selected by Order Management System

| Master Order Guide Name | Covered DC Count | Product Group Name | Selection Rule | Priority | Product # | DSSI Description (expanded) | First Level | First Level Category Name | Brand | Pack/Size | ALBANY 025 | ALBANY 049 | ARIZONA 029 | ARKANSAS 002 | ATLANTA 018 | BARABOO 049 | CENT. ALABAMA 004 | CENT. CALIF. 022 | CENT. FLORIDA 194 | CENT. ILLINOIS 051 | CENT. PENN. 013 | CHARLOTTE 048 | CHICAGO 024 | CINCINNATI 019 | CLEVELAND 015 | COL... 137 | ...054 |
|---|---|---|---|---|---|---|---|---|---|---|---|---|---|---|---|---|---|---|---|---|---|---|---|---|---|---|---|
| Catering | 4 | Serving Spoon Black | Stocked, demand, then central | 3 | 7404748 | SPOON SERVING SOLID 13 | 10 | SUPP & EQUIP | WINCO | 1/13" | *R | R | R* | R | *R | R | R | R | R | R | S | R | R | R | R | R | |
| Catering | 4 | Serving Spoon Black | Stocked, demand, then central | 2 | 8064271 | SPOON PERF SERVING HI-HEAT BLK | 10 | 10043085084 | CARLISL | 1/13" | | *R | | S | | | | | Sp | | | | | | | | |
| Catering | 4 | Serving Spoon Black | Stocked, demand, then central | 1 | 8064263 | SPOON PERF SERVING HI-HEAT BLK | 10 | SUPP & EQUIP | CARLISL | 1/13" | | | Sp | S | | | | | | | | | | | | *R | |

FIG. 10J

|  | Original | Alternative 1 | Alternative 2 | Alternative 3 |
|---|---|---|---|---|
|  | Ready-To-Use Restroom Disinfectant Cleaner By Manufacturer A | Ultra-P Instrument Cleaner By Manufacturer B | Cleaner Degreaser Disinfectant By Manufacturer C | Phenomenal Citrus Disinfectant Deodorant By Manufacturer D |
| MRSA Disinfectant | Yes | Yes | No | Yes |
| VRE Disinfectant | Yes | No | Yes | Yes |
| Unit of Measure | Case of 12 | Case of 4 | Each | Case of 10 |
| Pack Size | 33.8oz Bottle | Gallon | 12oz Bottle | 33.8oz Bottle |
| Rating | ★★★☆ | ★★★☆☆ | ★★★☆☆ | ★★★★☆ |
| Price | $328.68 (0.81/oz) | $409.60 (0.80/oz) | $15.84 (1.32/oz) | $275.83 (0.80/oz) |
| Delivery | Spray | Pour | Spray | Spray |

FIG. 10K

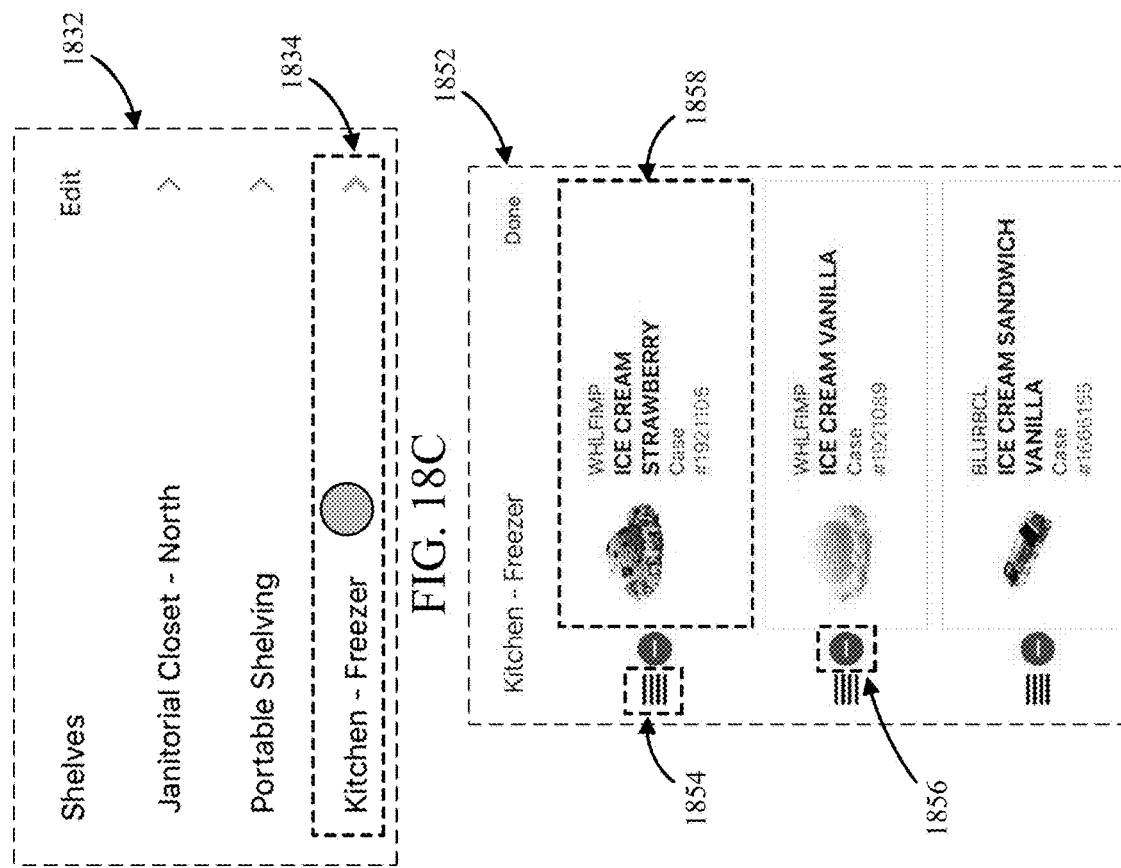

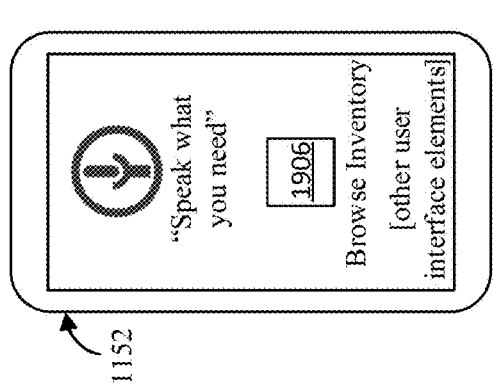
FIG. 19A
FIG. 19B
FIG. 19C
FIG. 19D
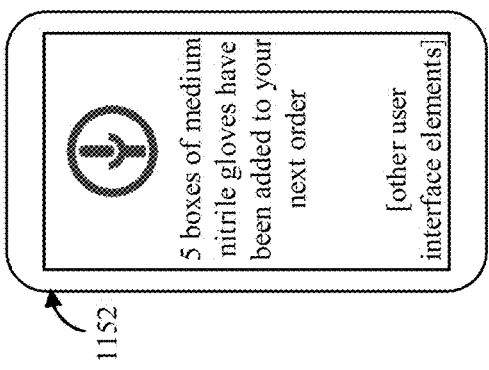
FIG. 19E

SYSTEMS, METHODS, AND MEDIA FOR MANAGING INVENTORY ASSOCIATED WITH A FACILITY

CROSS-REFERENCE TO RELATED APPLICATIONS

This application is a continuation of U.S. application Ser. No. 16/875,476, filed May 15, 2020, which is based on, claims the benefit of, and claims priority to, U.S. Provisional Patent Application No. 62/849,457, filed May 17, 2019. Each of the preceding applications is hereby incorporated herein by reference in its entirety for all purposes.

BACKGROUND

Many organizations purchase or repurchase the same products, such as food, linens, janitorial supplies, medical supplies, maintenance, repair, and operating items (MRO), and the like. Organizations often order these products from a distributor or multiple distributors (e.g., ordering can be performed by individuals at facilities associated with the organization), and the distributor is typically responsible for delivering the ordered products to individual facilities via one or more distribution centers. Upon delivery, the products often need to be stored in various locations across the facility. It is often not clear exactly where each item is to be stored, especially in facilities that are relatively large and/or that use a relatively wide variety of products. This can lead to products being stored incorrectly and/or inconsistently, which can cause confusion when the item is needed. This can also lead to a person ordering products to be unaware of what is currently in inventory, which can lead to over-ordering if a sufficient amount of a product is in inventory without the person ordering products realizing it because it is in unexpected location. Additionally, this can lead to under-ordering if the person ordering believes that the amount of product in inventory is higher than it is in reality.

Accordingly, new systems, methods, and media for managing inventory associated with a facility are desirable.

SUMMARY

In accordance with some embodiments of the disclosed subject matter, systems, methods, and media for managing inventory associated with a facility are provided.

In accordance with some embodiments of the disclosed subject matter, a method for automatically associating items in an inventory with location information corresponding to a portion of a facility is provided, the method comprising: receiving identifying information associated with a plurality of items; causing a mobile device to present at least a subset of the plurality of items in a user interface; receiving, from the mobile device, identifying information associated with a transmitting device, wherein the transmitting device is associated with a first location within the facility; determining, based on the identifying information associated with the transmitting device, a second location within the facility corresponding to a location of the mobile device; receiving, from the mobile device, an indication that one or more items of the plurality of items is being stored at the location of the mobile device; associating the one or more items with the second location; receiving, from a computing device, a request to present information about items stored at the first facility; and causing the computing device to present a user interface that includes identifying information associated with the one or more items in connection with an indication that the one or more items are located at the second location.

In some embodiments, receiving identifying information associated with the plurality of items comprises receiving an order placed with a distributor, wherein the order comprises the plurality of items to be delivered to the facility.

In some embodiments, the method further comprises: receiving, in connection with the identifying information associated with the plurality of items, a location within the facility at which at least one of the items is to be stored.

In some embodiments, causing the mobile device to present at least the subset of the plurality of items in the user interface comprises: causing the mobile device to present a location at which a first item of the plurality of items is to be stored.

In some embodiments, the method further comprises: causing the mobile device to present directions from a current location of the mobile device to the location at which the first item of the plurality of items is to be stored.

In some embodiments, the method further comprises: receiving, from the second mobile device, identifying information associated with a second transmitting device, wherein the transmitting device is associated with a third location within the facility; determining, based on the identifying information associated with the second transmitting device, a fourth location within the facility corresponding to a location of the second mobile device; receiving, from a second mobile device, an indication that an item has been added to the inventory; in response to receiving the indication that the item has been added to the inventory, updating the quantity of the item associated with the fourth location.

In some embodiments, the method further comprises: receiving, from the second mobile device, identifying information associated with a second transmitting device, wherein the transmitting device is associated with a third location within the facility; determining, based on the identifying information associated with the second transmitting device, a fourth location within the facility corresponding to a location of the second mobile device; receiving, from a second mobile device, an indication that an item has been removed from the inventory; in response to receiving the indication that the item has been removed from the inventory, updating the quantity of the item associated with the fourth location.

In some embodiments, the method further comprises: determining that a quantity of the item associated with the facility is at or below a threshold; and in response to determining that a quantity of the item associated with the facility is at or below the threshold, prompting a user to add the item to an order.

In some embodiments, the method further comprises: prompting a user associated with the facility to inspect inventory at a particular storage area associated with the facility; prompting the user associated with the facility to provide input indicative of a quantity a particular item stored in the particular storage area; determining, based on the input indicative of the quantity of the particular item, that the quantity of the particular item is at or below a threshold; and in response to determining that the quantity of the particular item is at or below the threshold, prompting the user to add the particular item to an order.

In some embodiments, the method further comprises: receiving identifying information associated with a plurality of transmitting devices installed at the facility; receiving, for each of the plurality of transmitting devices, information indicating a location within the facility at which that transmitting device is installed; and recording, for each of the plurality of transmitting devices, the identifying information associated with the transmitting device and the information indicating the location at which the transmitting device is installed.

In some embodiments, the information indicating the location comprises identifying information of the location.

In some embodiments, the transmitting device is a Bluetooth beacon and the identifying information associated with the transmitting device is a universally unique identifier (UUID), and the method further comprises: receiving, from the mobile device, data indicative of a signal strength of a signal received from the transmitting device.

In some embodiments, a system for automatically associating items in an inventory with location information corresponding to a portion of a facility is provided, the system comprising: at least one hardware processor that is programmed to: receive identifying information associated with a plurality of items; cause a mobile device to present at least a subset of the plurality of items in a user interface; receive, from the mobile device, identifying information associated with a transmitting device, wherein the transmitting device is associated with a first location within the facility; determine, based on the identifying information associated with the transmitting device, a second location within the facility corresponding to a location of the mobile device; receive, from the mobile device, an indication that one or more items of the plurality of items is being stored at the location of the mobile device; associate the one or more items with the second location; receive, from a computing device, a request to present information about items stored at the first facility; and cause the computing device to present a user interface that includes identifying information associated with the one or more items in connection with an indication that the one or more items are located at the second location.

In accordance with some embodiments of the disclosed subject matter, a non-transitory computer readable medium containing computer executable instructions that, when executed by a processor, cause the processor to perform a method for automatically associating items in an inventory with location information corresponding to a portion of a facility is provided, the method comprising: receiving identifying information associated with a plurality of items; causing a mobile device to present at least a subset of the plurality of items in a user interface; receiving, from the mobile device, identifying information associated with a transmitting device, wherein the transmitting device is associated with a first location within the facility; determining, based on the identifying information associated with the transmitting device, a second location within the facility corresponding to a location of the mobile device; receiving, from the mobile device, an indication that one or more items of the plurality of items is being stored at the location of the mobile device; associating the one or more items with the second location; receiving, from a computing device, a request to present information about items stored at the first facility; and causing the computing device to present a user interface that includes identifying information associated with the one or more items in connection with an indication that the one or more items are located at the second location.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 10B shows an example of a user interface presenting multiple facilities that can be associated with a particular general order guide in accordance with some embodiments of the disclosed subject matter.

FIG. 10C shows an example of a user interface presenting coverage across facilities associated with a particular general order guide in accordance with some embodiments of the disclosed subject matter.

FIG. 10D shows an example of a user interface presenting an expanded view of a particular product group associated with a particular general order guide in accordance with some embodiments of the disclosed subject matter.

FIG. 10E shows an example of a user interface presenting details related to a particular product group and suggested alternatives to items included in the product group in accordance with some embodiments of the disclosed subject matter.

FIG. 10G shows an example of a user interface presenting a portion of a facility order guide for a particular facility generated from multiple general order guides associated with the facility in accordance with some embodiments of the disclosed subject matter.

FIG. 10H shows an example of a user interface presenting alerts related to changes in status of particular items in accordance with some embodiments of the disclosed subject matter.

FIG. 10J shows an example of a report that can be generated to show details of several general order guides and coverage for product groups within those general order guides across various distribution centers in accordance with some embodiments of the disclosed subject matter.

FIG. 10K shows an example of a user interface presenting alternatives to a particular product in accordance with some embodiments of the disclosed subject matter.

FIG. 18C shows an example of a portion of the user interface of FIG. 18A in which a user interface element corresponding to a particular storage area is being selected in accordance with some embodiments of the disclosed subject matter.

FIG. 18D shows an example of a user interface for adjusting a quantity of particular items associated with the selected storage area in accordance with some embodiments.

FIG. 18E shows an example of a user interface for managing products associated with the selected storage area in accordance with some embodiments.

FIG. 19A shows yet another example of a user interface for an inventory management application in accordance with some embodiments of the disclosed subject matter.

FIG. 19B shows an example of the user interface of FIG. 19A in which a user interface element is being selected in accordance with some embodiments of the disclosed subject matter.

FIG. 19C shows an example of a user interface for the inventory management application of FIG. 19A prompting a user to select a user interface element and/or provide a vocal instruction for ordering one or more items in accordance with some embodiments of the disclosed subject matter.

FIG. 19D shows an example of a user device receiving audio corresponding to an instruction to order items using the user interface of FIG. 19C in accordance with some embodiments of the disclosed subject matter.

FIG. 19E shows an example of a user interface for the inventory management application of FIG. 19A confirming items that were added to an order in response to audio detected by the user device in accordance with some embodiments of the disclosed subject matter.

DETAILED DESCRIPTION

Figure 1:
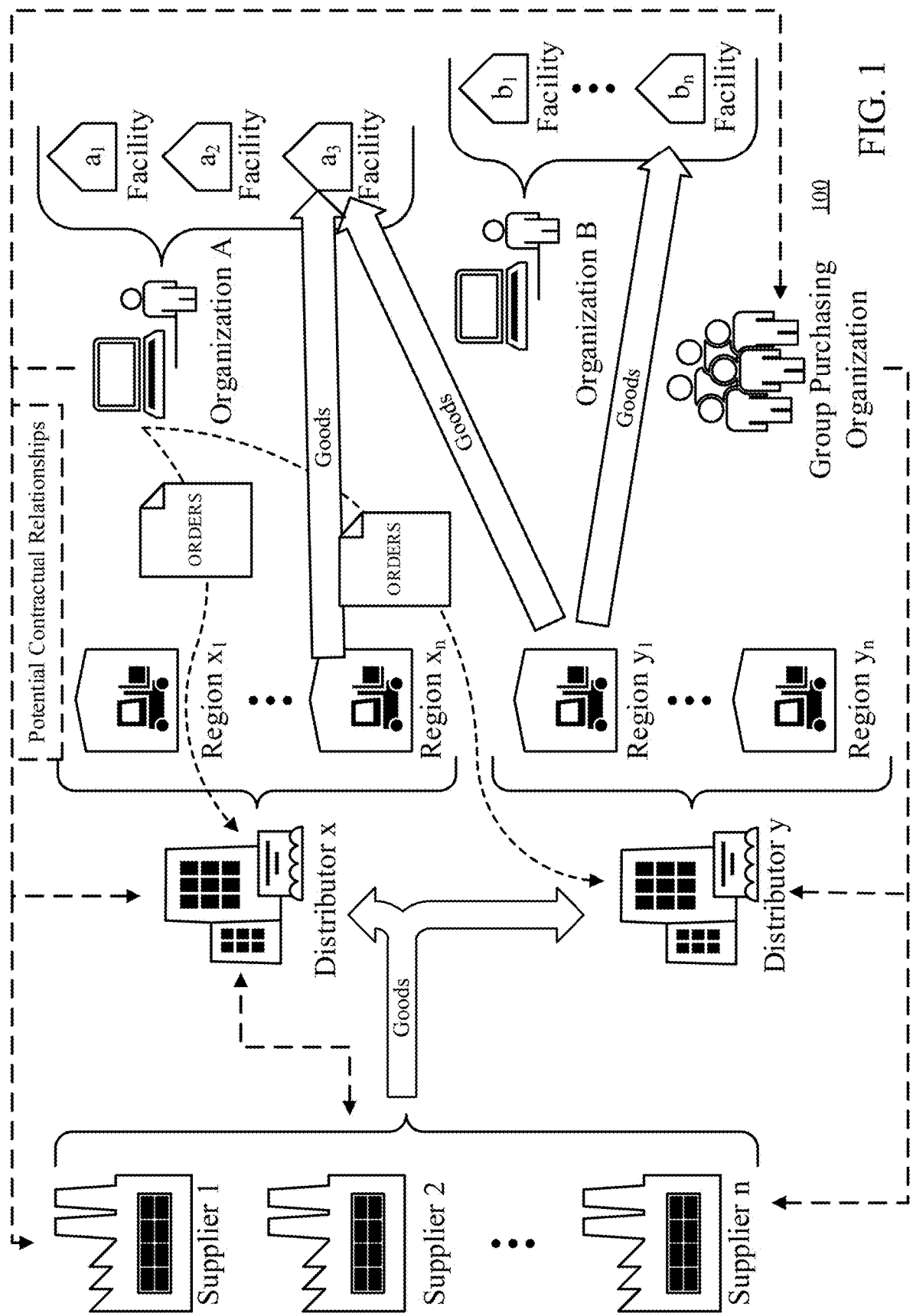
FIG. 1 shows an example of distribution networks connecting various suppliers and end users in which costs and product choices can be negotiated between any pair or more of parties associated with the distribution networks.

In accordance with various embodiments, mechanisms (which can, for example, include systems, methods, and media) for managing inventory associated with a facility are provided.

In accordance with some embodiments, the mechanisms described herein can collect information about which items are included in an inventory associated with a particular facility and storage locations of the inventory. For example, the mechanisms described herein can receive information about order placed for items to be delivered to the facility. As another example, the mechanisms described herein can receive information about inventory as the inventory is being stored in various locations around the facility. As yet another example, the mechanisms described herein can receive information about inventory as the inventory is being recorded.

In some embodiments, the mechanisms described herein can cause a mobile device to present a user interface that can be used to record a location(s) at which inventory is being and/or has been stored. For example, when an order is delivered to a facility, an employee at the facility and/or an employee of the distributor delivering the order can use a mobile device to access a user interface that presents items associated with the delivery. In such an example, when each item is stored, input can be provided to the mobile device indicating which item(s) is being/has been stored at a current location. The mechanisms described herein can record the location at which the items have been stored. As another example, an employee at the facility can use a mobile device to access a user interface that presents items recorded as being in the inventory of the facility, and the employee can provide input indicating whether the employee was able to verify the existence of each item in the inventory. In some embodiments, the mechanisms described herein can prompt a user to store items associated with a delivery in an appropriate location and in accordance with a proper handling procedure. For example, some items may be associated with particular storage requirements, such as perishable items that may require refrigeration or may require storage in a particular environment (e.g., a cool, dark environment), sterile items that require sterile handling can be stored in a particular storage area, items (e.g., high value items, regulated items) that require point of use tracking can be stored in a particular location with extra steps to maintain an appropriate record to fulfill compliance requirements, items (e.g., pharmacy items) that require provenance and/or lot tracking with extra steps to maintain an appropriate record to fulfill compliance requirements, items that are delivered and/or intended for assembly into part of a kit/assembly can be stored together, items that are not owned by the organization may be considered consigned inventory and may be stored in a particular storage location that clarifies the status of the inventory as such. In such examples, mechanisms described herein can provide a user with instructions related to where to store the items, and/or instructions related to appropriate steps to take when handling and/or storing the items to comply with appropriate organizational policies, rules, regulations, and/or laws.

In some embodiments, the mechanisms described herein can cause a mobile device to detect one or more signals that can be used to record a location of the mobile device. For example, a mobile device can be configured to detect wireless signals that are associated with physical locations, and the mechanisms described herein can calculate a position based on identifying information associated with the signal(s) and/or a signal strength associated with the signal(s). In a more particular example, the wireless signals can be ultrahigh frequency radio waves emitted by a transmitter associated with a particular physical location. An example of a device that is configured to emit such wireless signals is a Bluetooth low energy beacon.

In some embodiments, the mechanisms described herein can cause a mobile device to present a user interface that can be used to guide a user to the location of a particular item in a facility. For example, based on a storage location that was previously associated with an item, the mechanisms described herein can provide information that a user can utilize to find a particular item(s). In such an example, a current location of the mobile device can be determined based on detected wireless signals, and the location can be used to provide real-time directions to a storage location of a particular item. Note that the terms facility and storage location as used herein are intended to be non-limiting. For example, while a facility or storage location can refer to a structure or a place, such as a single building, it can also refer to a portion of a building, a group of multiple buildings that may or may not be located near each other, a campus, a vehicle (e.g., a "food truck," a mobile home, or the like). Additionally, facility as used herein can refer to non-places, such as a juristic entity (e.g., a corporation, a foundation, a government agency, or the like), or a natural person. Specific examples of a facility can include a healthcare facility (e.g., a hospital, an outpatient clinic, a standalone emergency facility, a standalone hospice facility, a standalone surgical center, a hospital campus, a specific building on a hospital campus, a specific room within a healthcare facility such as an operating room, a hospital cafeteria, or the like), an elder care facility (e.g., an assisted living facility, an independent living facility, a nursing home, or the like), an educational facility (e.g., a school, a university campus, a building on a university campus, a cafeteria on a university campus which may be located within a different facility such as a dorm, or the like), a corporation, a corporate campus, a government agency, a government building, a group of government buildings, a restaurant, a chain of restaurants, a particular vehicle (e.g., a cart, a truck, a car, a trailer, a service cart) used to transport, deliver and/or vend a product (e.g., prepared food, new medical equipment, non-sterile medical equipment to be sterilized), a home, a portion of a home (e.g., a home office). Another example of a facility can be anything that has an address or that is located at a particular place or places. Yet another example of a facility can be anything that is affiliated with an organization, and that independently orders products via the affiliation with the organization. As used herein, storage location can include conventional storage locations, such as warehouses, closets, storage rooms, sheds, and the like, and can also include other locations at which equipment and/or other inventory can be stored, such as a mobile storage location (e.g., a medical cart, a medical pole stand, a medical device, furniture such as a patient's bed).

In some embodiments, the mechanisms described herein can cause a mobile device to present a user interface that can be used to verify inventory at a storage location, adjust the inventory (e.g., when an item is removed), and/or add items to be ordered from a distributor and/or service provider. For example, a mobile device can be configured to detect wireless signals that are associated with physical locations, the mechanisms described herein can determine a storage location associated with the location, and retrieve inventory information about items that are stored at the location. In a more particular example, the mobile device can be used to adjust the inventory by indicating that one or more items are being removed. As another more particular example, the mobile device can be used to compare the amount of an item recorded in inventory for a particular location to the amount of the item present at the physical location. As yet another more particular example, the mobile device can be used to add items to an order (e.g., based on one or more order guides) based on the amount of items in inventory. In some embodiments, the mechanisms described herein can facilitate more efficient tracking, management, calculation of reorder points, management of shortages/stock outs, and can be used to inform reorder processes across one or more facilities of an organization. These tasks are often extremely complicated and time consuming, which is increased by orders of magnitude in certain environments (e.g., healthcare environments) which involve a very broad set of materials management tasks and a very complex collection of items, many with specific inventory management requirements.

FIG. 1 shows an example 100 of distribution networks connecting various suppliers and end users in which costs and product choice can be negotiated between any pair or more of parties associated with the distribution networks. As shown in FIG. 1, many parties can be involved in distributing goods (e.g., food, medical supplies, medical equipment, physician preference items, janitorial supplies, household goods, and the like) from suppliers to organizations that use the goods. For example, one or more distributors can purchase goods from various suppliers with the intent of distributing the goods through regional distribution centers (e.g., warehouses or networks of warehouses in various geographical locations). In such an example, a distributor can negotiate with each supplier regarding the price that the distributor will pay to the supplier, how much of a particular item the distributor will order, how the goods will be transported from the supplier to the distributor, and/or any other terms related to the procurement by the distributor of products from the supplier. Due to the relatively large volumes that distributors are often willing to order from a supplier, the distributor may be able to secure a discounted price compared to what an end user would pay to a retailer offering the same product(s).

In many cases, some goods may be available from a particular supplier in one sales channel or region, but not in another. For example, suppliers of perishable food may only offer certain foods in a geographically limited territory due to the relatively short shelf life of the product. In such an example, a distributor may have to establish relationships with different suppliers for the same items in different places, which may overlap (e.g., item one may be offered by supplier one in a first region, and an equivalent of item one may be offered by supplier two in a second region that overlaps the first region in certain areas). These regions may also overlap with the regions in which the distributor has established distribution centers. Accordingly, to ensure that customers of the distributor can order at least one item or its equivalent from another supplier, the distributor may purchase the items from both suppliers, and stock them where they are available. In such an example, some distribution centers may stock the first item, other distribution centers may stock the second item, and yet other distribution centers may stock the first item and the second item. As another example, a distributor that operates in multiple countries may be unable to stock a particular item from a first supplier in each country in which it operates (e.g., due to transportation costs, regulations, and the like), and accordingly may purchase equivalent items from multiple suppliers in various countries or regions.

A distributor establishes networks of distribution centers in order to provide products purchased from suppliers to the distributor's customers. In many cases, the customer may be an organization that operates across more than one of the regions served by the distributor. For example, a health care provider may operate a network of facilities in many different geographic regions. In a more particular example, the health care provider may establish elder care facilities in various metropolitan areas across several states.

Such organizations can establish relationships with a distributor to, among other things, reduce costs. For example, an organization can establish a relationship (e.g., the terms of which may or may not be defined by a contract) with a food distributor to supply ingredients and/or ready to eat food to all of the organization's facilities. By ordering relatively large quantities, the organization can receive a relatively low price. Additionally, the distributor can provide logistical support in coordinating delivery of food to the various different facilities. However, the organization still needs to interface with the distributor to order the food that is needed by each facility, which can be a significant administrative task that can be complicated due to different facilities having different needs, or being located in different regions such that the same items cannot be supplied by the distributor to all of the facilities.

As shown in FIG. 1, an organization can have a relationship (e.g., a contractual relationship) with a group purchasing organization (GPO) that can negotiate with multiple other parties, such as distributors and/or suppliers on behalf of the member organizations of the GPO. For example, a GPO can negotiate with a supplier for a coupon or rebate that member organizations can use to lower the cost of purchasing that supplier's products. As another example, a GPO can negotiate with a distributor for a discount that that member organizations can use to lower the cost of purchasing items through that distributor.

In some cases, a GPO can be responsible for tracking volumes ordered by members (e.g., organizations) of the GPO, and distribute rebates, earnings, and/or dividends based on the ordering volumes. For example, a GPO can receive funds from distributors and/or suppliers (e.g., in the form of fees, or rebates) on behalf of members, and can distribute the funds based on orders placed by the member organizations. Additionally, in some cases, GPOs that are classified as purchasing cooperatives can distribute funds as dividends to member organizations. For example, to accurately calculate rebates and funds distributions the GPO often must use reporting and discovery mechanisms (e.g., processes and/or systems) to determine items and quantities ordered by each organization, and when the items were ordered. Additionally, a GPO can use multiple mechanisms to obtain information about the purchasing behaviors of its member organizations to identify contracting and cost reduction opportunities. Should the GPO have visibility to items for which the GPO has not negotiated a contract with a distributor, but has sufficient qualities to be included in a contract negotiation, the GPO can negotiate a contract for that product to the potential advantage of the GPO's members that already purchase or wish to purchase that product.

Many distributors provide a platform that allows customers to track and submit orders electronically. One or more users (in some cases with the assistance of one or more automated services) associated with an organization can submit orders to a distributor for various facilities associated with the facility.

Figure 2:
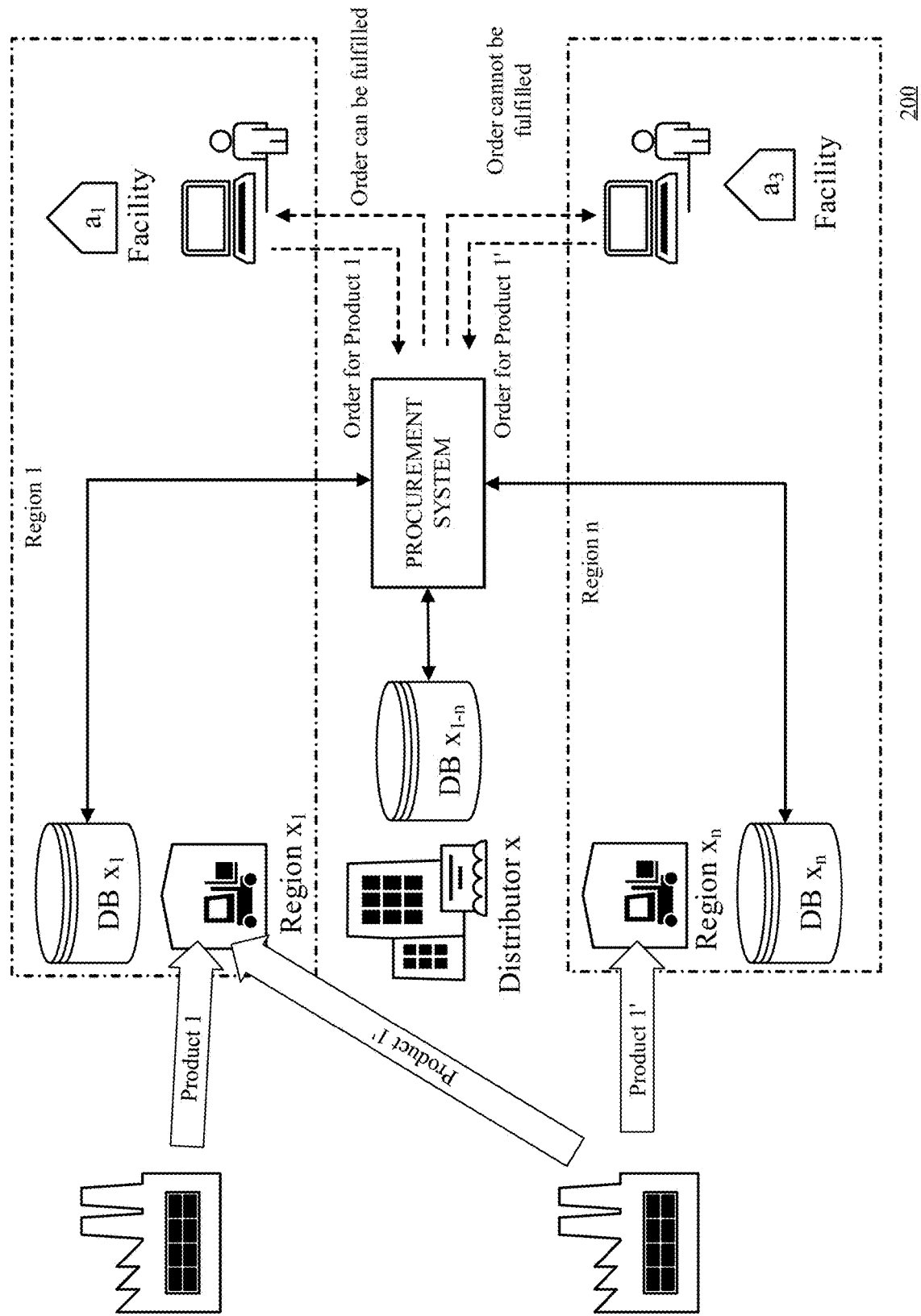
FIG. 2 shows an example of paths along a distribution network from two suppliers to a single end user organization associated with multiple facilities in different geographic regions and the potential for a lack of availability across regions that can add complexity in tracking inventory of products delivered to and/stored at the various facilities.

FIG. 2 shows an example 200 of paths along a distribution network from two suppliers to a single end user associated with multiple facilities in different geographic regions and the potential for a lack of availability across regions that can cause inconsistency in products that are delivered to the various facilities. As shown in FIG. 2, an organization (e.g., "Organization A" in FIG. 2) can place orders with a distributor (e.g., "Distributor x") for the same item (e.g., "Product 1") from the same distributor for different facilities, but if those facilities are aligned with different portions of the distributors network (e.g., "Region 1" and "Region n," respectively) the product may be available in one portion of the network, but not the other. In such an example, an alternative to the item may be available (e.g., "Product 1'") that originated from a different supplier. However, this may not be clear to the user(s) placing orders for the organization. For example, the user may be restricted to viewing items available in only one region at a time, or the region(s) in which the item(s) are available may not be clear from the user interface. In such an example, a user may create an order for one facility and attempt to use that order as a template for creating orders for other similar facilities, only to find out that one or more items ordered for the first facility are not available for delivery to the other facilities. Consequently, if the organization attempts to order the item for both facilities (e.g., because the item fits a need, because the item is discounted, or the like), the distributor may not be able to fulfill the order in the second region, or fulfillment may be delayed by routing the ordered item from the first region to the second region. In some cases, the distributor may inform the user that the ordered item is not available for delivery or delivery may be delayed to the facility in the second region, and the user may initiate ordering a different item. However, it may be difficult for the user to identify an acceptable alternative to the originally ordered item, for example if the item was selected to fulfill nutritional requirements it may not be apparent which other items similarly fulfill those nutritional requirements. In some cases, a user associated with each facility (e.g., a facility manager, a kitchen manager, a supply manager, or the like) can use a procurement system to place an order with a distributor, and the procurement system can interface with a system (e.g., a database) or systems maintained by the distributor. When a user places an order for a particular item for a particular facility, the procurement system can interact with the distributers system(s) to determine whether the item is available in the distribution center serving the facility. For example, the procurement system can query a database that the distributor maintains that has information on currently available products in each region. As another example, the procurement system can query a database that the distributor maintains that has information on currently available products in a particular region (e.g., DB $x_1$). As yet another example, the procurement system can use information most recently received from the distributor (e.g., in a nightly data dump) to generate an order, and upon receiving the order the distributor can determine whether each item in the order is currently available in the region that serves the facility associated with the order. In such an example, after an order is submitted it may be rejected, and the user may be required to modify the order to add a different item (e.g., by conducting a user-directed search for an alternative). Note that although mechanisms described herein are generally described in connection with products ordered from a distributor, this is merely an example, and mechanisms described herein can be used in connection with items received from another source, such as a service provider that operates a service center. Examples of service providers can include a laundry and/or linen service provider, a provider of surgical kit sterilization services, a provider of rental equipment, and/or any other suitable service provider that provides a product (e.g., an exhaustible and/or reusable product) as part of a service.

In some cases, some organizations may not encounter such a situation. For example, an organization may designate an employee at each facility (e.g., a kitchen manager at an elder care facility) to determine what is required and place orders with the distributor. In such an example, because a user at each facility is independently determining what to order and placing orders with the distributor, it is unlikely that the user will order something that is not available in that region. However, while distributing the responsibility of ordering can help avoid ordering unavailable items, it can also increase costs and produce inefficiencies.

Figure 3A:
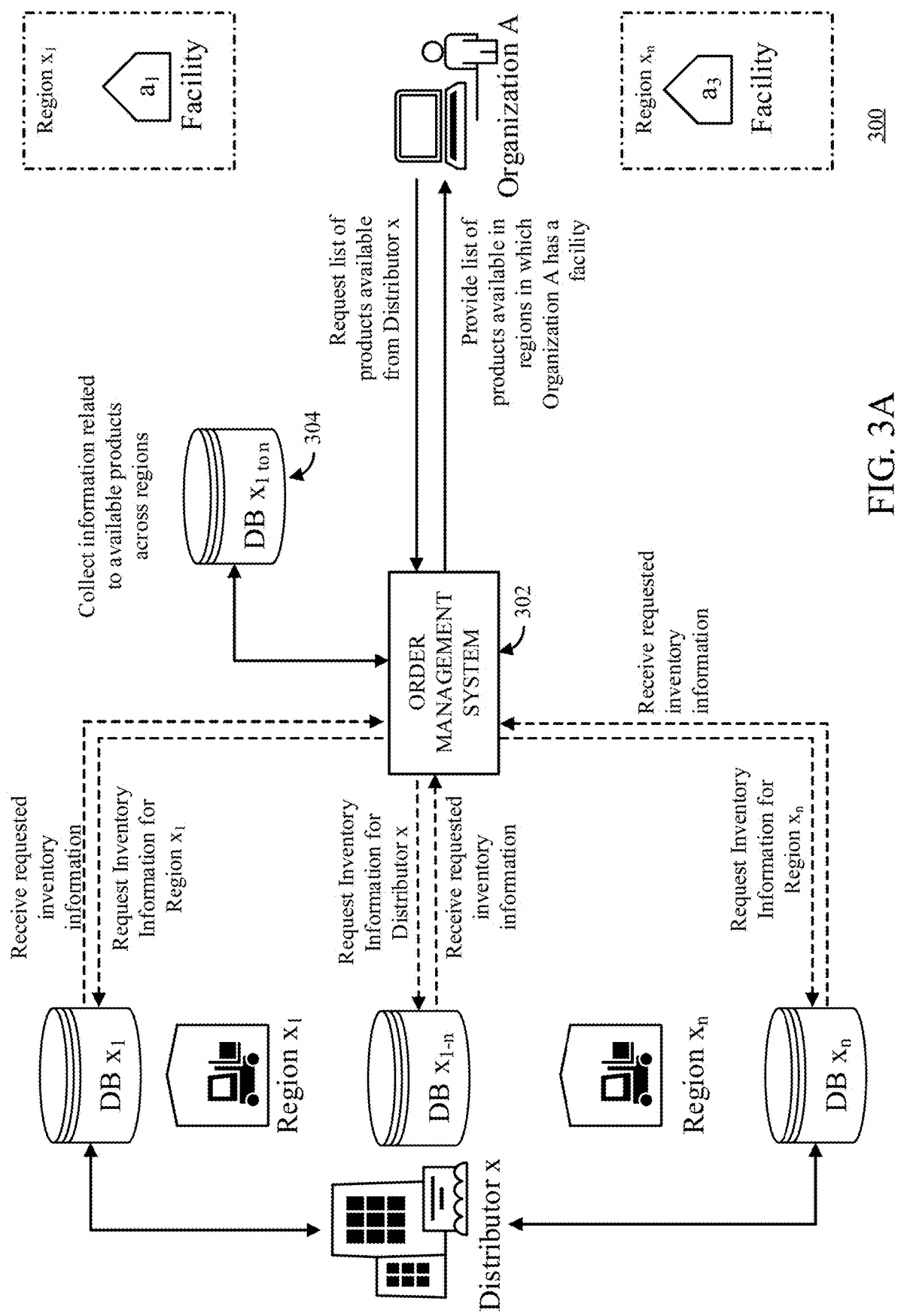
FIG. 3A shows an example of a portion of a distribution network connecting various suppliers to a single end user associated with multiple facilities in different geographic regions via a single distributor associated with a system for managing inventory associated with a facility implemented in accordance with some embodiments of the disclosed subject matter.

Note that although not shown, a supplier can also be associated with its own distribution network that facilitates delivery more directly between the supplier and end users in addition to, or in lieu of, being part of a distribution network associated with a distributor. For example, a supplier can act as both a supplier and a distributor. As another example, a distributor can act as a supplier, by manufacturing (e.g., either directly or by contracting with a manufacturer) items for distribution via its own and/or other distributor's distribution networks. In some embodiments, the mechanisms described herein can be used to generate order guides that include items available from one or more distributors, and/or directly from a supplier via a distribution network associated with the supplier. FIG. 3A shows an example 300 of a portion of a distribution network connecting various suppliers to a single end user associated with multiple facilities in different geographic regions via a single distributor associated with a system for managing inventory associated with a facility implemented in accordance with some embodiments of the disclosed subject matter. Notably, the constraint of "geographical region" is but one non-limiting example of a constraint related to a path in a distribution network or order and many others may be substituted or layered. As shown in FIG. 3A, in some embodiments, mechanisms described herein can be used to present a user with all products that are available across regions in which an organization has a facility. As shown in FIG. 3A, in some embodiments, an order management system 302 can collect information about the products that are stocked and/or are generally available in each region in which a distributer operates. In some embodiments, order management system 302 can query the database (or databases) for information about inventory currently available in one or more regions, and can collect the information into a database 304.

In some embodiments, a user (e.g., associated with organization A) can access the information in database 304 via an application and/or service that is configured to interact with database 304. For example, the user can access an application and/or service via a computing device.

In some embodiments, the user can request a list of products available from a distributor associated with database 304 by causing a computing device to send a request to order management system 302. Order management system 302 can determine, based on information about the organization, which items to present (e.g., all items available, only items available within regions in which a facility is located, and the like).

In some embodiments, order management system 302 can be configured to sort, search, filter, and the like, items available from the distributor to assist a user in identifying items that meet the organization's needs. Note that although FIG. 3A illustrates an example where information is gathered across various regions associated with a single distributor, the mechanisms described herein can also be used to provide an interface with multiple distributors, which may or may not have overlapping inventory. For example, an organization may have many facilities that are served by one distributor, but may have one or more facilities that are not served by the distributor. In such an example, the organization may need to find a different distributor to source goods to such facilities. In some embodiments, the mechanisms described herein can collect information from multiple distributors to facilitate more efficient order management across all of an organization's facilities. Additionally, even when a facility is served by both facilities, there may be differences in price or inventory that would make it advantageous to place orders with both distributors. In some embodiments, the mechanisms described herein can automatically place orders with different distributors for a single facility based on product availability, price, and/or any other suitable factors.

Figure 3B:
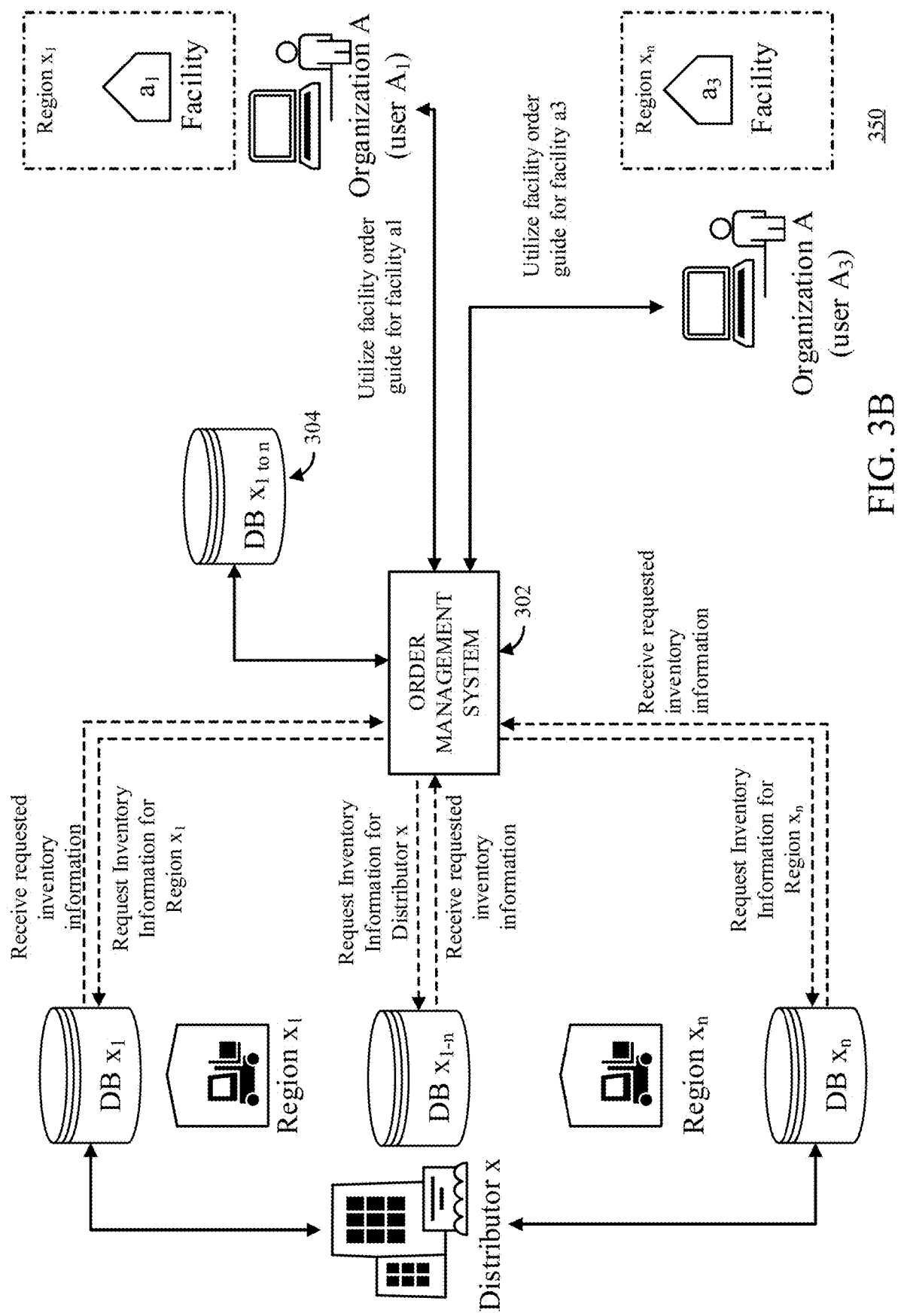
FIG. 3B shows an example of a portion of a distribution network connecting various suppliers to multiple facilities in different geographic regions via a single distributor associated with a system for managing inventory associated with a facility implemented in accordance with some embodiments of the disclosed subject matter.

FIG. 3B shows an example 350 of a portion of a distribution network connecting various suppliers to multiple facilities in different geographic regions via a single distributor associated with a system for managing inventory associated with a facility implemented in accordance with some embodiments of the disclosed subject matter. As shown in FIG. 3B, users associated with individual facilities (e.g., user $A_1$) of the organization can interact with order management system 302 to utilize a facility order guide that is based on one or more general order guides assigned to the facility, and the portion of the distribution network(s) in which the facility is located (e.g., region $x_1$). For example, user $A_1$ can download a facility order guide from order management system 302. As another example, user $A_1$ can request the facility order guide via another application (e.g., a procurement application), and order management system 302 can provide the requested facility order guide to a computing device associated with the application.

Figure 4:
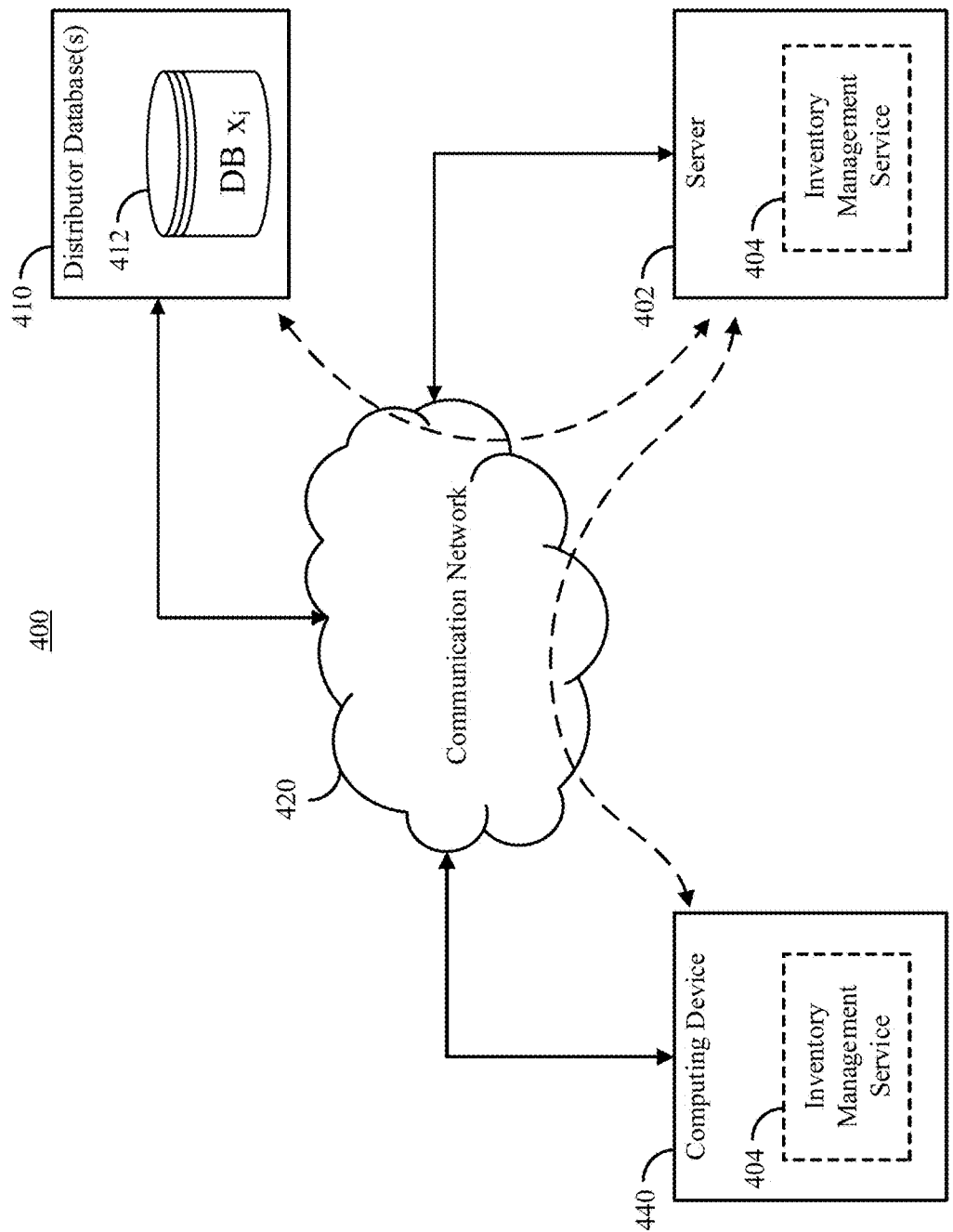
FIG. 4 shows an example of a system for managing inventory associated with a facility in accordance with some embodiments of the disclosed subject matter.

FIG. 4 shows an example 400 of a system for managing inventory associated with a facility in accordance with some embodiments of the disclosed subject matter. As shown in FIG. 4, a server (or other processing unit) 402 can execute one or more applications to provide access to an inventory management service 404. In some embodiments, inventory management service 404 can assist an organization in the management of inventory in one or more of its facilities. For example, inventory management service 404 can be used in connection with a mobile computing device and one or more devices that emit a signal that can be used to determine a location of the mobile device. When items are stored, a user (e.g., a person delivering items, an employee of the facility, and the like) can provide an input indicating that a particular item is being stored, and inventory management service 404 can determine and record a location at which the particular item is being stored, such that when the item is needed a user can query inventory management service 404 to determine where the item can be retrieved.

In some embodiments, server 402, and/or inventory management service 404 can receive requests for information, queries, selections of items, user input, and/or any other suitable data, over a communication network 420. In some embodiments, such information can be received from any suitable computing device, such as computing device 430. For example, computing device 430 can receive user input through an application being executed by computing device 430, such as through an input device (e.g., a keyboard, mouse, microphone, touchscreen, and the like). In such an example, computing device 430 can communicate information over communication network 420 to server 402 (or another server that can provide the information to server 402). As shown in FIG. 4, inventory management service 404 can be implemented using computing device 430 and/or server 402. For example, server 402 can be used to implement at least a portion of a back-end of inventory management service 404 and computing device 430 can be used to implement at least a portion of a front-end of inventory management service 404.

In some embodiments, server 402 can communicate with one or more computing devices, such as distributor database server 410, to retrieve information regarding products that are currently available, a quantity of each product that is available, pricing information about the products, and/or any other suitable information. In some embodiments, distributor database server 410 can be used (e.g., by a distributor and/or by a regional facility), to manage information about a particular distribution center or distribution centers. For example, distributor database server 410 can be used to manage a database 412 that includes information about a particular distribution center associated with a particular distributor. As shown, database 412 is associated with Distributor X and Distribution Center i (of n total distribution centers). However, this is merely an example, and distributor database server 410 can manage any suitable database or combination of databases. For example, distributor database server 410 can be used to manage a database that includes information about multiple distribution centers associated with a single distributor. In a more particular example, a particular distributor may use a single database to track products across multiple distribution centers, while a different distributor may use a different database to track products for each distribution center. In some embodiments, server 402 can communicate with one or more distributor database servers 410 to collect information about products that can be ordered via the distributor associated with the database.

In some embodiments, communication network 420 can be any suitable communication network or combination of communication networks. For example, communication network 420 can include a Wi-Fi network (which can include one or more wireless routers, one or more switches, and the like), a peer-to-peer network (e.g., a Bluetooth network), a cellular network (e.g., a 3G network, a 4G network, a 5G network, and the like, complying with any suitable standard(s), such as CDMA, GSM, LTE, LTE Advanced, WiMAX, 5G NR, and the like), a wired network, and the like. In some embodiments, communication network 420 can be a local area network, a wide area network, a public network (e.g., the Internet), a private or semi-private network (e.g., a corporate or university intranet), any other suitable type of network, or any suitable combination of networks. Communications links shown in FIG. 4 can each be any suitable communications link or combination of communications links, such as wired links, fiber optic links, Wi-Fi links, Bluetooth links, cellular links, and the like. In some embodiments, server 402 and/or computing device 430 can be any suitable computing device or combination of devices, such as a desktop computer, a laptop computer, a smartphone, a tablet computer, a wearable computer, a server computer, a virtual machine being executed by a physical computing device, and the like.

In some embodiments, communications transmitted over communication network 420 and/or communication links shown in FIG. 4 can be secured using any suitable technique or combination of techniques. For example, in some embodiments, communications transmitted to and/or from server 402, computing device 430, and/or database server 410 can be encrypted using any suitable technique or combination of techniques. For example, communication between two or more computing devices associated with communication network 420 (e.g., server 402, computing device 430, database server 410, Domain Name System (DNS) servers, one or more intermediate nodes that serve as links between two or more other devices, such as switches, bridges, routers, modems, wireless access points, and the like) computing devices can be carried out based on Hypertext Transfer Protocol Secure (HTTPS). As another example, communications can be carried out based on Transport Layer Security (TLS) protocols and/or Secure Sockets Layer (SSL) protocols. In such an example, an SSL certificate can be used to encrypt when sending information between a web browser and web server. In a more particular example, the SSL certificate can be based on a public key (e.g., obtained by a host from a public SSL certificate server) that is used to encrypt information sent from the browser, and decrypted by the server using a private key. In another more particular example, the SSL certificate can be based on a private key (e.g., provided to a host over a secure communication channel) that is used to encrypt information sent from the browser, and decrypted by the server using another private key. As yet another example, communications can be carried out based on Internet Protocol Security (IPsec) protocols. As still another example, a virtual private network (VPN) connection can be established between one or more computing devices associated with computing network 420. In some embodiments, one or more techniques can be used to limit access to communication network 420 and/or a portion of communication network 420. For example, computing devices attempting to connect to the network and/or transmit communications using a portion of the network can be required to provide credentials (e.g., a username, a password, a hardware-based security token, a software-based security token, a one-time code, any other suitable credentials, or any suitable combination of credentials). In a more particular example, multi-factor authentication can be required when computing devices attempt to connect to the network and/or transmit communications using a portion of the network. For example, a user can be required to provide, through the computing device and/or through another device, a combination of multiple types credential, such as a password and another form of credential.

In some embodiments, one or more security techniques can be applied to any suitable portion of a communication network that interacts with computing devices. For example, security techniques can be used to implement a secure Wi-Fi network (which can include one or more wireless routers, one or more switches, and the like), a secure peer-to-peer network (e.g., a Bluetooth network), a secure cellular network (e.g., a 3G network, a 4G network, a 5G network, and the like, complying with any suitable standard(s), such as CDMA, GSM, LTE, LTE Advanced, WiMAX, 5G NR, and the like), and the like.

Figure 5:
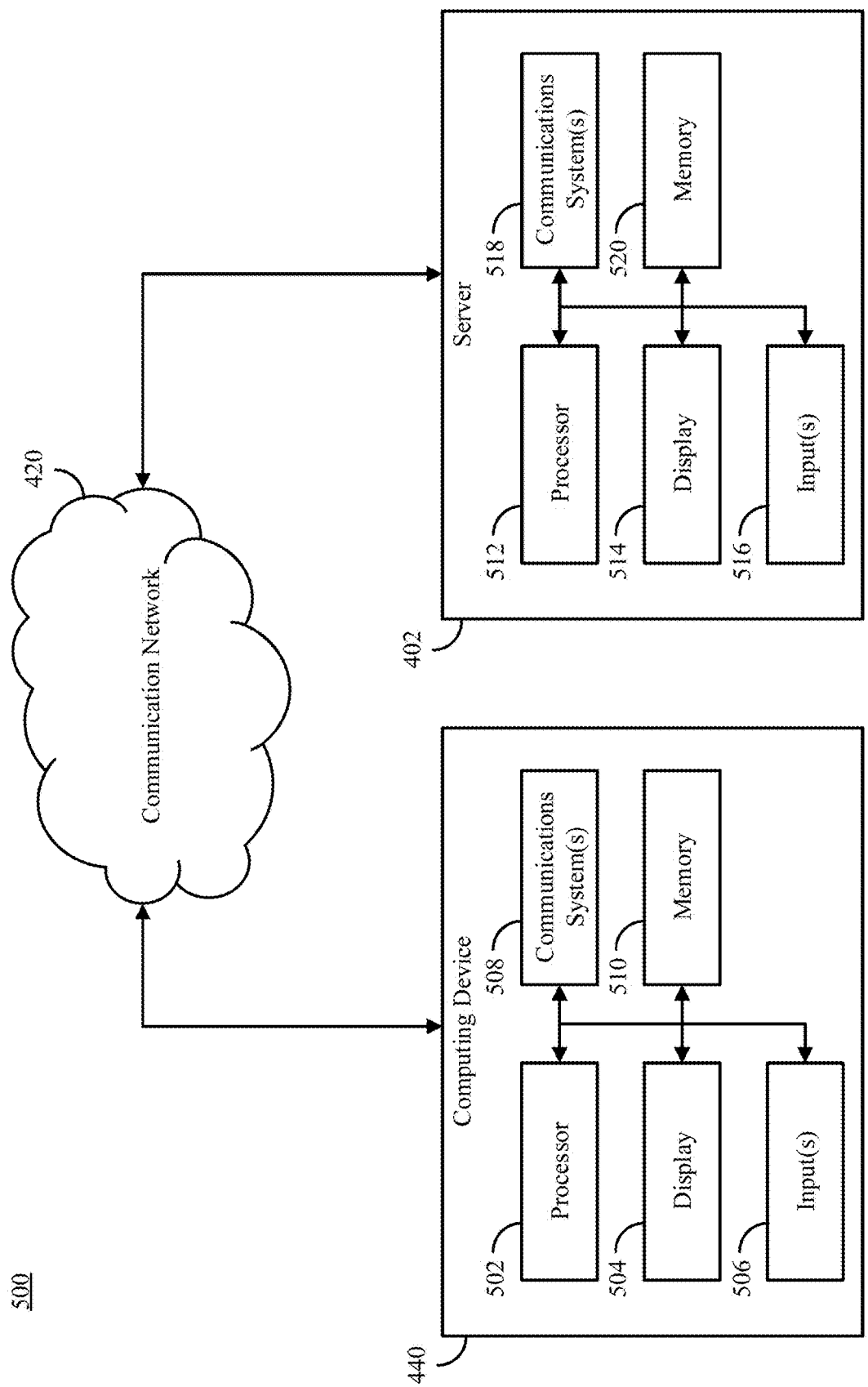
FIG. 5 shows an example of hardware that can be used to implement a server and a computing device in accordance with some embodiments of the disclosed subject matter.

FIG. 5 shows an example 500 of hardware that can be used to implement server 402 and computing device 430 in accordance with some embodiments of the disclosed subject matter. As shown in FIG. 5, in some embodiments, computing device 430 can include a processor 502, a display 504, one or more inputs 506, one or more communication systems 508, and/or memory 510. In some embodiments, processor 502 can be any suitable hardware processor or combination of processors, such as a central processing unit (CPU), a graphics processing unit (GPU), and the like. In some embodiments, display 504 can include any suitable display devices, such as a computer monitor, a touchscreen, a television, and the like. In some embodiments, inputs 506 can include any suitable input devices and/or sensors that can be used to receive user input, such as a keyboard, a mouse, a touchscreen, a microphone, a camera, and the like.

In some embodiments, communications systems 508 can include any suitable hardware, firmware, and/or software for communicating information over communication network 420 and/or any other suitable communication networks. For example, communications systems 508 can include one or more transceivers, one or more communication chips and/or chip sets, and the like. In a more particular example, communications systems 508 can include hardware, firmware and/or software that can be used to establish a Wi-Fi connection, a Bluetooth connection, a cellular connection, an Ethernet connection, and the like.

In some embodiments, memory 510 can include any suitable storage device or devices that can be used to store instructions, values, and the like, that can be used, for example, by processor 502 to present content using display 504, to communicate with server 402 via communications system(s) 508, and the like. Memory 510 can include any suitable volatile memory, non-volatile memory, storage, or any suitable combination thereof. For example, memory 510 can include RAM, ROM, EEPROM, one or more flash drives, one or more hard disks, one or more solid state drives, one or more optical drives, and the like. In some embodiments, memory 510 can have encoded thereon a computer program for controlling operation of computing device 430. In such embodiments, processor 502 can execute at least a portion of the computer program to present content (e.g., user interfaces, tables, graphics, and the like), receive content from server 402, transmit information to server 402, and the like.

In some embodiments, server 402 can be implemented using one or more servers 402 (e.g., functions described as being performed by service 402 can be performed by multiple servers acting in concert) that can include a processor 512, a display 514, one or more inputs 516, one or more communications systems 518, and/or memory 520. In some embodiments, processor 512 can be any suitable hardware processor or combination of processors, such as a CPU, a GPU, and the like. In some embodiments, display 514 can include any suitable display devices, such as a computer monitor, a touchscreen, a television, and the like. In some embodiments, inputs 516 can include any suitable input devices and/or sensors that can be used to receive user input, such as a keyboard, a mouse, a touchscreen, a microphone, and the like. In some embodiments, server 402 can be a mobile device.

In some embodiments, communications systems 518 can include any suitable hardware, firmware, and/or software for communicating information over communication network 420 and/or any other suitable communication networks. For example, communications systems 518 can include one or more transceivers, one or more communication chips and/or chip sets, and the like. In a more particular example, communications systems 518 can include hardware, firmware and/or software that can be used to establish a Wi-Fi connection, a Bluetooth connection, a cellular connection, an Ethernet connection, and the like.

In some embodiments, memory 520 can include any suitable storage device or devices that can be used to store instructions, values, and the like, that can be used, for example, by processor 512 to present content using display 514, to communicate with one or more computing devices 430, and the like. Memory 520 can include any suitable volatile memory, non-volatile memory, storage, or any suitable combination thereof. For example, memory 520 can include RAM, ROM, EEPROM, one or more flash drives, one or more hard disks, one or more solid state drives, one or more optical drives, and the like. In some embodiments, memory 520 can have encoded thereon a server program for controlling operation of server 402. In such embodiments, processor 512 can execute at least a portion of the server program to transmit information and/or content (e.g., results of a database query, a portion of a user interface, textual information, graphics, and the like) to one or more computing 430, receive information and/or content from one or more computing devices 430, receive instructions from one or more devices (e.g., a personal computer, a laptop computer, a tablet computer, a smartphone, and the like), and the like.

Figure 6:
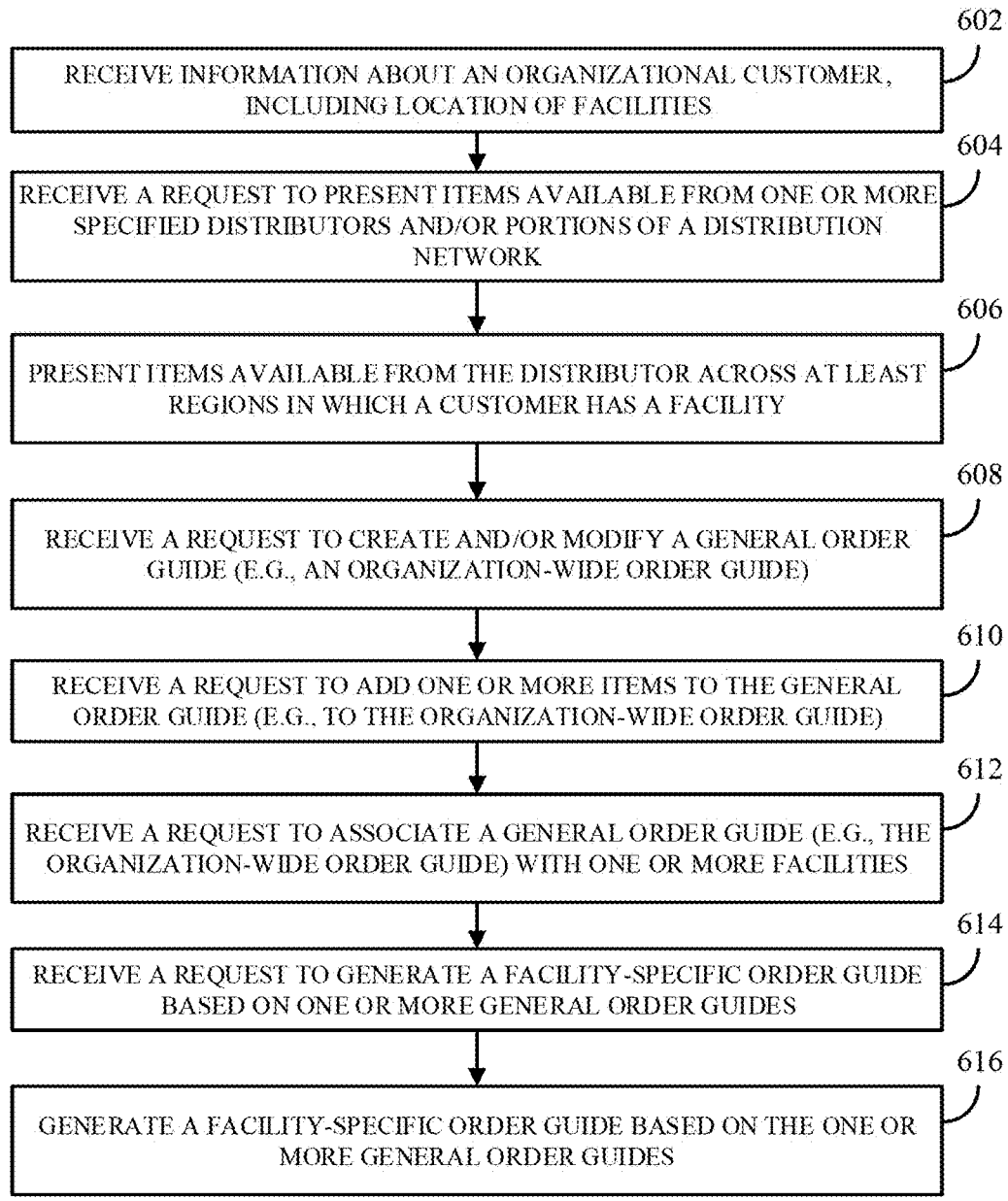
FIG. 6 shows an example of a process for creating and using an order guide to procure items for one or more facilities in accordance with some embodiments of the disclosed subject matter.

As shown in FIG. 6, at 602, process 600 can receive information about an organization that is associated with one or more facilities. Note that information about an organization, such as information received at 602, can be considered organization metadata. In some embodiments, the information about the organization can include any pertinent information. For example, the information about the organization can include identifying information of a group purchasing organization(s) that the organization is associated with (if any). As another example, the information about the organization can include locations (e.g., at any suitable level of generality, such as street address, zip code, municipality, state, and the like) of various facilities to which deliveries may be made (e.g., by a distributor). As yet another example, the information about the organization can include identifying information associated with each of the various facilities (e.g., a semantically meaning name) associated with the organization that a user may wish to associate with an order guide. In some embodiments, process 600 can receive the information about the organization via a user interface (e.g., presented by computing device 430). Additionally or alternatively, in some embodiments, process 600 can receive the information about the organization as a file or stream of information. For example, process 600 can receive a file that includes details about the organization in a file with any suitable format, such as a comma-separated values (CSV)-based format, a tab-separated values (TSV)-based format, a fixed-length-based format, an Extensible Markup Language (XML)-based format, or the like. As another example, process 600 can receive the information in connection with one or more instructions (e.g., a WRITE instruction, an INSERT instruction, an UPDATE instruction, and the like).

In some embodiments, the information associated with the organization received by process 600 can include information about rebates, discounts, or other arrangements that the organization can utilize, the terms of such arrangements, identifying information of one or more other parties in the arrangement (e.g., a supplier, a distributor, a third party, and the like), and/or any other suitable information. For example, such an arrangement can be a contract that has been agreed to by two or more parties (e.g., the organization and a distributor, the organization and multiple distributors, a third party such as a GPO and a distributor, the organization and a manufacturer, or any other suitable combination of parties).

In some embodiments, the information associated with the organization received by process 600 can include information about one or more distributors that the organization may use to procure items for its facilities. For example, if process 600 is executed as part of a service provided by a third party (e.g., not the organization, a particular distributor, nor a supplier) the service may be configured to facilitate ordering with multiple distributors, potentially associated with different categories of items. In such an example, at 602, process 600 can receive information about which distributor(s) in particular the organization may order from, which can include distributors across different categories of products (e.g., food, office supplies, medical supplies, janitorial supplies, etc.). As another example, if process 600 is executed as part of a service provided by a particular distributor, the information associated with the organization received by process 600 may omit information about which distributor the organization is interested in ordering items from.

In some embodiments, the information associated with the organization received by process 600 can include information about the organization's behavior over time. For example, the information can include information about items that the organization (e.g., via various facilities) has purchased over any suitable period of time. In some embodiments, such information can be provided explicitly by a user associated with the organization (e.g., in the form of a file that includes historical information) and/or can be provided programmatically (e.g., a user can cause such information to be automatically shared with process 600 as the organization purchases products).

At 604, process 600 can receive a request to present items available from a specified distributor or distributors, and/or items available in one or more specified portions of a distribution network that includes one or more distributors. In some embodiments, the request can be received in any suitable form. For example, an application executed by a computing device associated with the organization can receive input indicating that items available from a specified distributor are to be presented, which can cause the computing device to request information that can be used to present a user interface that includes items available from the specified distributor. Such an application can be an order management application executed by the operating system of the computing device, an application accessed remotely such as via a web browser (e.g., a web application), or any other suitable type of application. In such an example, the input can be a selection of a particular user interface element associated with the specified distributor, a selection of a user interface element for initiating creation and/or editing of an order guide associated with the specified distributor, or any other suitable input.

In some embodiments, process 600 can utilize data requests that conform to one or more Electronic Data Interchange (EDI) standards to request availability and inventory (e.g., EDI 846, Inventory Inquiry/Advice). Additionally or alternatively, in some embodiments, process 600 can utilize one or more custom web services (e.g., a RESTful web service that is configured to provide interoperability between systems associated with a particular supplier and/or distributor and systems associated with process 600, such as order management system 302). In some embodiments, process 600 can utilize a custom application program interface (API) that facilitates communication between systems associated with process 600 (e.g., as order management system 302) and systems associated with one or more suppliers and/or distributors, which can be utilized to query such systems, and/or to transfer data and information. In some embodiments, communications between systems associated with process 600 can be secured using any suitable technique or combination of techniques, such as techniques described above in connection with FIG. 4 for securing communications between two or more computing systems. In some embodiments, process 600 can cause item/location information to be stored in a unified database (e.g., representing a master catalog) for each supplier and/or distributor, which can be used to present such information to an organization/user via a user interface. In some embodiments, one or more security measures can be used to protect information in the unified database, such as by encrypting the information, requiring that a user provide credentials (e.g., a username, a password, a token, a one-time code, and/or any other suitable credentials) associated with an authorized user in order to access the information in the unified database, requiring that a computing device attempting to access the unified database is associated with a particular domain, and/or any other suitable security measures. In some embodiments, any suitable technique or combination of techniques can be used to protect the information in the database by encrypting data stored in the database. For example, techniques associated with Advanced Encryption Standard (AES) can be used to encrypt data stored in the unified database. As another example, techniques associated with Full Disk Encryption, File Encryption, can be used to encrypt data stored in the database by applying encryption to one or more disk volumes used to store the data. Additionally, in some embodiments, process 600 can cause pricing information to be stored in a separate data structure for each organization. For example, in some embodiments, pricing information can be stored in a table of a database that is associated with the organization (e.g., a relational database, or a non-relational database). In such an example, each organization can be associated with a separate table. Alternatively, multiple organizations can be associated with a single table that uses identifying information associated with the organization in a key (e.g., a primary key) associated with the price information. As another example, each price can be associated with a primary key that includes identifying information associated with the distributor (e.g., a distributor name, a distributor identification number, a distribution center name, and/or a distribution center identification number), identifying information associated with the product (e.g., a product name, and/or a product identification number such as a SKU or UPC), identifying information associated with the organization (e.g., a name associated with the organization, an identification number associated with the organization), and/or any other suitable information. As yet another example, each organization can be associated with a file that includes a list of prices associated with the organization.

At 606, process 600 can cause a computing device associated with the organization to present a user interface that includes information related to items available from the distributor. In some embodiments, process 600 can make available information related to the items available from the distributor in multiple regions or other subnetworks in which a facility associated with the organization is located.

In some embodiments, the items can be presented in any suitable format. For example, the items can be presented as a list in any suitable order based on one or more properties associated with the item (e.g., alphabetical by name, alphabetical by brand, by category, by price, and the like).

As another example, the items can be presented as a frontend of a searchable database with one or more input fields for providing search terms, a field that can be used to present results, and/or any other suitable user interface elements. For example, the items can be presented using a search user interface, such as the user interface shown in and described below in connection with FIG. 10F.

In some embodiments, any suitable information can be used to identify items that are available from the distributor, such as text (e.g., a name of the item, a description of the item, specifications of the item, and the like), one or more images (e.g., images of the item, images of branding associated with the item, and the like), and/or any other suitable information. In general, information associated with an item can be referred to as item metadata, or metadata associated with the item. Such metadata can include any suitable information that can be used to identify the item, describe the item, and/or retrieve information about the item. Additional examples of metadata can include a brand associated with the item, the size of an item, a number of items included in a package, a unit of measure associated with the item, a SKU, a UPC, a price associated with the item, one or more attributes of the item, and a category associated with the item. Note this is not an exhaustive list of every type of information that can be considered item metadata.

In some embodiments, the mechanisms described herein can be used to generate an order guide that includes services and/or includes only services. In such embodiments, in addition to, or in lieu of, presenting items available from a distributor, and adding such items to an order guide that can be used to facilitate procurement, the mechanisms described herein can present one or more services that are available from service providers, and such services can be added to an order guide. For example, bottled water delivery via various providers can be added as a "product group" (although it is generally a service) to an order guide, to facilitate procurement of such a service by individual facilities.

At 608, process 600 can receive a request to create and/or modify an order guide to be associated with the organization. Such an order guide is sometimes referred to herein as a general order guide, and can be referred to using other terms, such as a generic order guide, a corporate order guide, an organization order guide, an organization-wide order guide, a master order guide, a central order guide, a product catalog, a service catalog, a shopping list, a bid, a formulary, a preferred list, a recommended list, or the like. Note that some terms may have special meanings within particular industries, and the preceding list is intended to supplement such meanings, rather than providing a limiting definition of such terms. In some embodiments, such a request can be initiated in response to any suitable action. For example, such a request can be initiated in response to selection of a user interface element associated with creation of a new general order guide (e.g., an icon labeled "create new order guide," an element of a menu labeled "create new order guide"). As another example, such a request can be initiated in response to selection of a user interface element associated with editing an existing general order guide (e.g., an icon labeled "edit an order guide," an element of a menu labeled "edit an order guide," an icon associated with an existing general order guide, and the like). As still another example, such a request can be initiated in response to selection of a user interface element associated with an item (e.g., an icon labeled "save," "add," "add to order guide," "authorize," "+," and the like; an element of a menu that is similarly labeled, and the like). In such an example, in response to selection of such a user interface element associated with a particular item, if a general order guide is not currently selected, process 600 can cause the user to be prompted to select an existing general order guide and/or create a new order guide to which the item is to be added.

At 610, process 600 can receive a request to add one or more items to the general order guide selected and/or created at 608. In some embodiments, such a request can be in any suitable format. For example, such a request can be initiated by selection of a user interface element associated with the item (e.g., an icon labeled "save," "add," "add to order guide," "authorize," "+," and the like), and an application presenting the user interface element can cause identifying information of the item to be transmitted to a device executing process 600. As another example, such a request can be received via a command line interface (e.g., as a series of identifying information associated with one or more items to be added to the general order guide, such as a stock keeping unit (SKU) associated with the item, a Universal Purchase Code (UPC) associated with the item, a Uniform Resource Identifier (URI) associated with the item, a Uniform Resource Locator (URL) associated with the item, a Global Trade Identity Number (GTIN), and/or any other identifying information). As yet another example, such a request can be received via an application program interface (API).

At 612, process 600 can receive a request to associate a general order guide with one or more facilities. For example, a user can create multiple general order guides and assign one or more of the general order guides to each facility associated with the organization. In such an example, the user can create different general order guides that suit the needs of facilities with different needs and/or that are associated with different activities that a facility may perform, and can associate the general order guides with the particular facilities. As a more particular example, if the organization is associated with multiple different types of facilities (e.g., hospitals, outpatient clinics, hospice facilities, nursing homes, and the like), the user can assign each facility one or more order guides. As another more particular example, if a facility is associated with different services (e.g., a hotel that provides breakfast for guests, and that operates a restaurant), the user can assign that facility one or more order guides corresponding to the services provided by the facility. In some embodiments, facilities can be organized into groups and/or into a hierarchy. For example, a user can assign a facility to one or more groups of facilities. As another example, a facility can be added to a group programmatically (e.g., without any user intervention). In such an example, facilities can be added to a group based on one or more characteristics of the facility or facilities. Such characteristics can include location of the facility, the type of facility (e.g., hospitals can be added to a first group, nursing homes can be added to a second group), the name of the facility, whether facilities have been associated with the same general order guides, operating characteristics of a facility (e.g., hours, whether the facility is in a building that is owned by the organization or leased), and/or any other characteristics. As yet another example, groupings of facilities can be suggested based on one or more characteristics of the facility or facilities.

In some embodiments, a general order guide can be associated with a group and/or with an individual facility. For example, if a user associates a general order guide with a group, whether the general order guide is used when generating a facility order guide can be determined based on whether the facility is associated with the group. In such an example, if a particular facility is added to a group after a general order guide is associated with the group, the general order guide can be used when generating an order guide for the facility. Similarly, if a particular facility is included in a group when a general order guide is associated with the group, but the facility is later removed, the general order guide can be excluded from consideration when generating a facility order guide for the facility.

As another example, a single general order guide can be associated with a group, and with a facility included in the group. In such an example, the general order guide can be used when generating an order guide for the facility regardless of the current group membership status of the facility.

At 614, process 600 can receive a request to generate a facility-specific order guide that includes one or more items from one or more general order guides associated with the facility (e.g., at 612). In some embodiments, such a request can be in any suitable format. For example, such a request can be initiated after a user has associated one or more general order guides with a particular facility. As another example, such a request can be initiated when a user finishes associating one or more general order guides with a facility (e.g., by selecting a user interface element to save the associations, by navigating to another portion of the user interface, or the like). As yet another example, such a request can be initiated when a user accesses a user interface associated with a particular facility, such as to review an order guide associated with the facility, to create an order for the facility, or for any other suitable purpose.

At 616, process 600 can automatically create an order guide associated with the facility based on the one or more general order guides associated with the facility. Note that the order guide associated with the facility is sometimes referred to herein as a facility order guide, and can be referred to as a facility-specific order guide, an ordering location order guide, a local order guide, an auxiliary order guide, a secondary order guide, a peripheral order guide, a specific order guide, a local product catalog, a local service catalog, a facility bid, a facility formulary, a facility preferred list, a facility recommended list, or the like. Additionally, in some cases, the phrase order guide is used to refer to both an order guide associated with an organization (generally referred to herein as a general order guide) and order guides associated with various portions of the organization (generally referred to herein as a facility order guide) that are generated based on an order guide associated with the organization. This combination of terms was generally not used herein in the interest of clarity. In some embodiments, the order guide associated with the facility can include items from each of the general order guides associated with the facility. Additionally, in some embodiments, if multiple general order guides include the same item, process 600 can include only a single instance of the item in the facility order guide. Alternatively, in some embodiments, process 600 can include each instance of the item from the general order guides in the facility order guide. In some embodiments, duplicated items in a facility order guide can be removed during an ordering process (e.g., when the facility order guide is submitted to a procurement service or application). In some embodiments, the facility order guide can be formatted in any format that is suitable for presentation and/or submission to an application and/or service that can be used to place an order with one or more distributors based on the facility order guide. For example, the facility order guide can include information such as identifying information associated with the organization, identifying information associated the facility, identifying information of one or more general order guides used to generate the facility order guide, identifying information of one or more items, identifying information of one or more master items or product groups associated with the items, and any other suitable information. As described below, in some embodiments, particular items that are included in the facility order guide can be selected from a list of acceptable alternatives (e.g., sometimes referred to herein as a master list, or a product group) at the time the order guide is created based on any suitable factors such as stated preference, availability, price, size, brand, and the like.

In some embodiments, process 600 can utilize any suitable technique or combination of techniques to determine price and/or availability at the time when an order is being created. For example, process 600 can utilize techniques described above in connection with 606. In some embodiments, process 600 can query one or more systems associated with a particular distributor associated with the order to obtain updated price and availability information in real time (or near real time). In some embodiments, if such information is not available or otherwise cannot be obtained in real time, process 600 can use stored price information and can reconcile available inventory information after the order is accepted by the distributor. In some embodiments, information about backorders and discontinued items can be communicated to an organization and/or user at any suitable time. For example, such information can be communicated to the organization in a separate process. As another example, such information can be presented via a user interface or API used to place an order. In some embodiments, process 600 can use information about rebates, discounts, and/or other arrangements that the organization can utilize, the terms of any such arrangements, identifying information of one or more other parties in the arrangement (e.g., a supplier, a distributor, a third party, and the like), and/or any other suitable information related to such an arrangement to determine a net price that the organization would pay for a particular item. For example, in some cases, an organization (e.g., directly, or through a cooperative such as a GPO) can be the beneficiary of a contract with a distributor guaranteeing a particular price on an item if one or more certain conditions are satisfied. In such an example, process 600 can utilize information about the contract (and/ or information about whether the condition(s) are satisfied) to determine the price for that item.

Figure 7A:
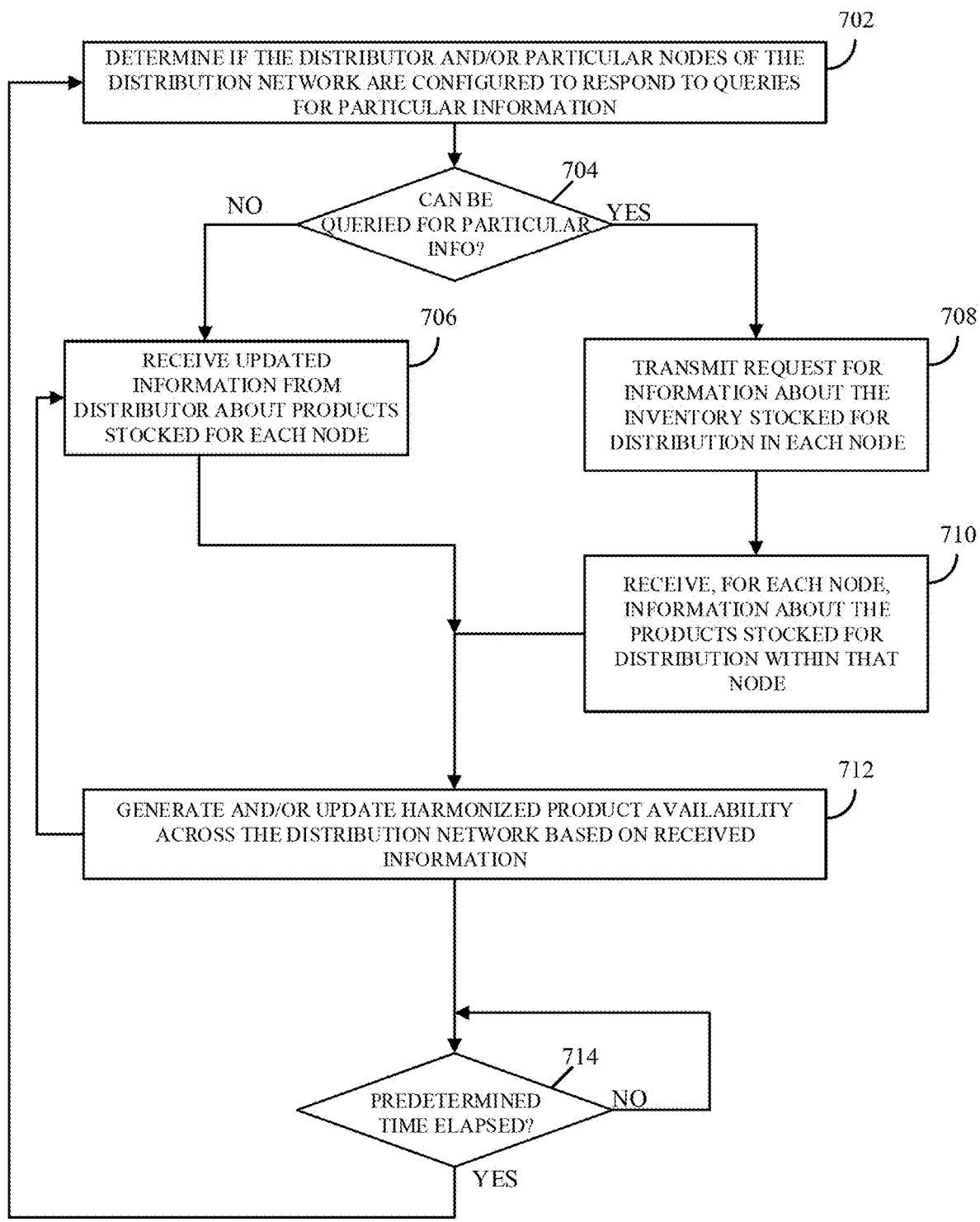
FIG. 7A shows an example of a process for generating and maintaining a list of items available from a distributor across various paths of a distribution network in accordance with some embodiments of the disclosed subject matter.

FIG. 7A shows an example 700 of a process for generating and maintaining a list of items available from a distributor across various paths of a distribution network in accordance with some embodiments of the disclosed subject matter. As shown in FIG. 7, at 702, process 700 can include determining whether a system associated with the distributor has been configured to respond to queries about particular product information. For example, a distributor can provide access to at least a portion of the information in one or more databases (or other suitable data structures) that the distributor (or another entity) maintains for keeping track of which products are currently available via each node in the distribution network through which the products are available (e.g., each distribution center, regional warehouse, etc.). In some embodiments, such access can be provided using various techniques. For example, the distributor can configure an API to respond to queries regarding information stored in one or more databases. As another example, the distributor can provide access via a web service.

If process 700 determines that at least a portion of the distributor's system is not configured to respond to queries for particular information ("NO" at 704), process 700 can proceed to 706. In some embodiments, as an alternative to determining if the distributor's systems are configured to respond to queries at 702 and 704, process 700 can be configured to start at 706 or 708 based on how the distributor's systems are configured and/or based on how the distributor and an entity associated with process 700 have agreed to share information. For example, if a push model is to be used in which the distributor shares information by placing a file at a particular location (e.g., as described below in connection with 706), process 700 can be configured to begin at 706.

At 706, process 700 can receive updated information from a distributor about products that are available (e.g., stocked) via various portions of the distribution network associated with the distributor. In some embodiments, process 700 can receive the updated information using any suitable technique or combination of techniques. For example, the distributor can periodically (e.g., once per day, twice per day, once per hour, or at any other suitable frequency) at regular and/or irregular intervals, provide the information to a location associated with an order management service (e.g., a File Transfer Protocol (FTP) server, a Secure File Transfer Protocol (SFTP) server, a storage location such as an S3 bucket or an encrypted S3 bucket provided via the Amazon S3 service made available by Amazon Web Services, or the like). In some embodiments, the information provided by the distributor can be a file that includes information about which items are currently available from the distributor, identifying information associated with the items, how many of each item are available, size information (e.g., the amount of each item by count, by weight, by measure, or the like). in which portions of the distributors network the items are available (e.g., distribution centers which can provide the item), a stocking status identifier (e.g., if the item is currently in the inventory of the distribution center, if the item can be procured by the distribution center for delivery to facilities served by the distribution center, or other stocking status identifiers). In some embodiments, the information can include pricing information associated with each item. Note that such price information can be a list price, which may not apply to particular organizations, which may have negotiated for a different price for certain items. In some embodiments, the distributor can provide a single file with information for all portions of the distribution network. Additionally or alternatively, the distributor can provide multiple files that each correspond to a portion of the distribution network. In some embodiments, the information transmitted by a distributor's system (e.g., at 706 and/or 710, described below) can be in any suitable format, such as a CSV-based format, a TSV-based format, a fixed-length-based format, an XML-based format, or the like.

In some embodiments, an entity associated with process 700 (e.g., a third party service provider, an organization, a distributor, a supplier) may establish expectations (e.g., via a written agreement) about which information is to be included in the information provided by the distributor, how often the information is to be provided, which portion(s) of the distribution network is to be included in the information, and/or any other suitable parameters associated with the sharing of information.

Otherwise, if process 700 determines that at least a portion of the distributor's system is configured to respond to queries for particular information ("YES" at 704), process 700 can proceed to 708. At 708, process 700 can transmit a request to one or more systems associated with the distributor for information about items that are currently stocked at each distribution center, and/or items that are ordinarily stocked (but may currently be out of stock). For example, each distribution center associated with a distributor can use a database to keep track of which items are in stock, and the database can be kept updated as new items are received and other items are shipped to fulfill orders. As another example, a distributor can maintain a database to keep track of which items are currently stocked at each of multiple distribution centers. In some embodiments, process 700 can submit a query or queries for information maintained in the database associated with each node in the distribution (e.g., distribution center).

In some embodiments, the distributor's system can be configured to respond to a request by providing all pertinent information associated with one or more portions of the distribution network, such as information described above in connection with a file shared by the distributor at 706. Additionally or alternatively, in some embodiments, the distributor's system can be configured to respond to queries by providing a subset of information, with the information delivered being based on the format of the query.

At 710, process 700 can receive, for each node (e.g., distribution center), information about items that are stocked for distribution from that node and/or items available for transfer from another node. For example, process 700 can receive a list of items that are currently stocked, a quantity of each item (if any), size information, a cost associated with each item, and/or any other suitable information. As another example, process 700 can receive a list of actions that have been performed to add or remove items from the database associated with a particular node. In such an example, the actions can be used to update a database maintained by an entity associated with process 700. Additionally, in some embodiments, process 700 can receive information about a price at which inventory is available, and whether the price varies across different nodes of the distribution network and/or across different organizations.

At 712, process 700 can generate and/or update harmonized product availability information across all nodes for which information is available. For example, process 700 can generate and/or update a database of items that are available from the distributor, and can associate each item with a node or nodes (e.g., distribution centers) in which the item is available, in what quantities, in what size(s), and/or any other suitable information. In some embodiments, process 700 can use the most recent information available to generate and/or update the harmonized product availability information. For example, if information is received for the same distribution node at both 706 and 708, process 700 can determine which information is most recent and preferentially utilize that information.

In some embodiments, in which information is provided by the distributor at regular and/or irregular intervals, process 700 can return to 706 to await updated information after generating and/or updating the harmonized product availability information. For example, in some embodiments, process 700 can omit 702, 704, 708, 710, and 714 when information is only obtained from a particular distributor via the distributor pushing information to a location from which process 700 can retrieve the information.

At 714, process 700 can determine whether a predetermined amount of time has elapsed since the harmonized product availability information was updated. If process 700 determines that the predetermined time has not elapsed ("NO" at 714), process 700 can continue to wait. Otherwise, if process 700 determines that the predetermined time has elapsed ("YES" at 714), process 700 can return to 702 to request updated information from each node in the distribution network. Note that, in some embodiments, a portion of process 700 can be executed asynchronously. For example, if a portion of the distributor's systems are not configured to respond to queries for particular information, process 700 can receive information from the distributor at 706 when the information is sent (e.g., pushed) from the distributor's system(s), which may not coincide with times at which information is requested at 708.

Note that process 700 is a particular example of a process for generating and maintaining a list of items available from a distributor across the distribution network (or a particular portion(s) of the network), but other processes can be used to perform a similar task. For example, a computing device associated with each node in the distribution network can be configured to send updated information periodically (at regular and/or irregular intervals) to a computing device that maintains a list of products available across all the distribution network. Alternatively, in some embodiments, rather than each distribution center being associated with a particular database, the inventory across the distribution network can be tracked using a single unified encrypted database. In some embodiments, process 700 can utilize any suitable technique or combination of techniques to determine obtain information about inventory that is stocked and the price of such inventory. For example, process 600 can utilize techniques described above in connection with 606.

Figure 7B:
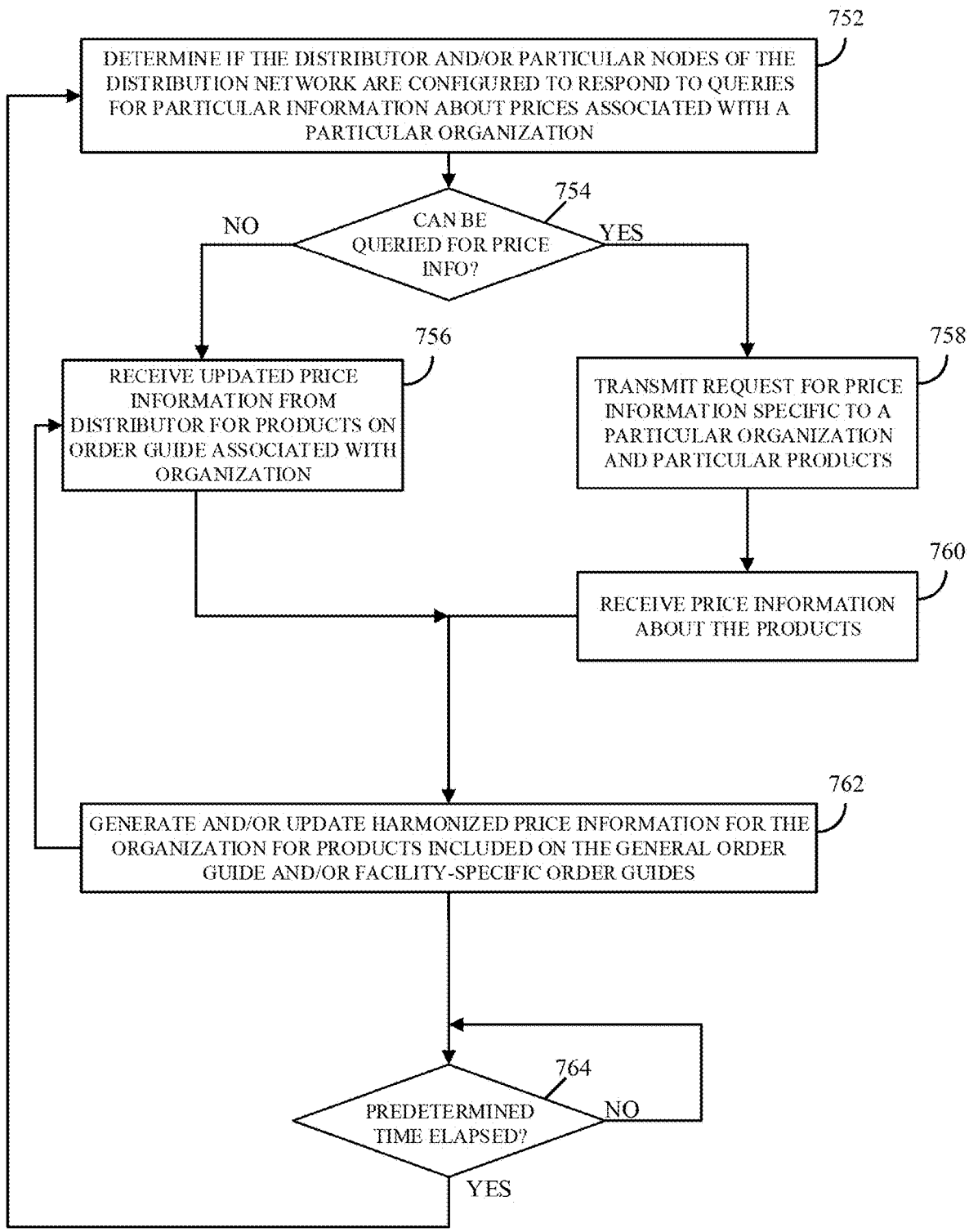
FIG. 7B shows an example of a process for generating and maintaining price information associated with a particular organization and one or more distributors and/or distribution paths in accordance with some embodiments of the disclosed subject matter.

FIG. 7B shows an example of a process for generating and maintaining price information associated with a particular organization and one or more distributors and/or distribution paths in accordance with some embodiments of the disclosed subject matter. At 752, process 750 can include determining whether a system associated with the distributor has been configured to respond to queries related to prices associated with particular products and/or particular organizations. For example, a distributor can provide access to at least a portion of the price information in one or more databases (or other suitable data structures) that the distributor (or another entity) maintains for keeping track of which products are currently available via each node in the distribution network through which the products are available (e.g., each distribution center, regional warehouse, etc.). In some embodiments, such access can be provided using various techniques. For example, the distributor can configure an API to respond to queries regarding price information stored in one or more databases. As another example, the distributor can provide access to price information via a web service. Additionally, in some embodiments, process 700 can determine whether one or more other sources of price information (e.g. other than the distributor) is configured to respond to queries for information about prices of particular items (e.g., a contract price for a particular item that the organization is entitled to pay, a rebate on a particular item that the organization may be eligible to receive, and the like). Such a source of information can be maintained by the distributor and/or one or more particular nodes of the distribution network, and/or can be maintained by another system (e.g., a system associated with a GPO, a system executing process 700, a system associated with the organization, and/or any other suitable system).

If process 750 determines that at least a portion of the distributor's system is not configured to respond to queries for particular price information ("NO" at 754), process 700 can proceed to 756. In some embodiments, as an alternative to determining if the distributor's systems are configured to respond to queries at 752 and 754, process 750 can be configured to start at 756 or 758 based on how the distributor's systems are configured and/or based on how the distributor and an entity associated with process 750 have agreed to share price information. For example, if a push model is to be used in which the distributor shares price information by placing a file(s) at a particular location (e.g., as described below in connection with 756), process 750 can be configured to begin at 756.

At 756, process 700 can receive updated information from a distributor about prices associated with particular products and/or organizations (e.g., certain customers of the distributor). In some embodiments, process 750 can receive the updated price information using any suitable technique or combination of techniques. For example, the distributor can periodically (e.g., once per day, twice per day, once per hour, or at any other suitable frequency) at regular and/or irregular intervals, provide the price information to a location associated with an order management service (e.g., a server, a storage location, or the like). In some embodiments, the information provided by the distributor can be a file that includes price information related to items made available by the distributor. In some embodiments, the file can be associated with a particular customer, and the distributor can provide a file for each of various customers that have a relationship with an entity associated with process 700 (or another process, such as process 600). Additionally or alternatively, the distributor can provide a single file that identifies customers and prices associated with the customer for each product available from the distributor (and/or each product for which a price associated with the customer differs from a list price).

In some embodiments, an entity associated with process 750 (e.g., a third party service provider, an organization, a distributor, a supplier) may establish expectations (e.g., via a written agreement) about which information is to be included in the price information provided by the distributor, how often the price information is to be provided, which portion(s) of the distribution network is to be covered in the price information (which can vary by organization), and/or any other suitable parameters associated with the sharing of price information. For example, in some embodiments, the price information provided by the distributor can include a contract price to which a specific organization is entitled on an item, a spot price on an item, and/or a list price for an item.

Otherwise, if process 750 determines that at least a portion of the distributor's system is configured to respond to queries for particular price information ("YES" at 754), process 750 can proceed to 758. At 758, process 750 can transmit a request to one or more systems associated with the distributor (and/or another party, such as a GPO) for price information associated with a particular customer, one or more particular nodes, and/or one or more products. For example, certain organizations can negotiate prices with distributors through various relationships (e.g., as described above in connection with FIG. 1), and the distributor can maintain information about prices to charge the organization for each item for which a price has been agreed. In such an example, process 750 can request price information for a particular organization. In some embodiments, the distributor's system can be configured to respond to a request by providing all pertinent price information associated with one or more customers of the distributor, and/or one or more portions of the distribution network, such as information described above in connection with a file shared by the distributor at 756. Additionally or alternatively, in some embodiments, the distributor's system can be configured to respond to queries by providing a subset of price information, with the information delivered being based on the format of the query.

At 760, process 750 can receive price information about items that are associated with the distributor for one or more organizations for which price information was requested at 758. For example, process 750 can receive a list of prices for items available to the organization, prices for items on a general order guide, items in a master list or product group, and/or for any other items.

At 762, process 750 can generate and/or update harmonized price information for an organization and a particular distributor(s). For example, process 750 can generate and/or update a database of prices that the organization can expect to pay for certain items available from the distributor. In some embodiments, process 750 can use the most pertinent price information available to generate and/or update the harmonized price information. For example, if price information is received for the same organization and products at both 756 and 758, process 750 can determine which price information is most recent and preferentially utilize that information. As another example, if price information is received that includes list prices and other prices information that includes prices specific to a particular organization, process 750 can use the more specific information regardless of which information is more up to date. In some embodiments, process 700 can use information about rebates, discounts, and/or other arrangements that the organization can utilize (which can be received from the distributor, from a GPO, stored by a system executing process 700, stored in a system associated with the organization, and/or stored in any other suitable location), such as the terms of any such arrangements, identifying information of one or more other parties in the arrangement (e.g., a supplier, a distributor, a third party, and the like), and/or any other suitable information related to such an arrangement to determine a net price that the organization can expect to pay for one or more particular items. For example, in some cases, an organization (e.g., directly, or through a cooperative such as a GPO) can be the beneficiary of a contract with a distributor guaranteeing a particular price on an item if one or more certain conditions are satisfied. As another example, the organization can receive a rebate on the same item from the manufacture if one or more conditions are satisfied (which may or may not overlap with the conditions associated with the contract in the previous example). In some embodiments, process 700 can utilize information about one or more arrangements to determine a likely net price for each item based on the existence of the one or more arrangements and the likelihood that the conditions associated with the arrangement (if any) will be satisfied.

In some embodiments, in which price information is provided by the distributor at regular and/or irregular intervals, process 750 can return to 756 to await updated information after generating and/or updating the harmonized price information. For example, in some embodiments, process 750 can omit 752, 754, 758, 760, and 764 when price information is only obtained from a particular distributor via the distributor pushing price information to a location from which process 750 can retrieve the price information.

At 764, process 750 can determine whether a predetermined amount of time has elapsed since the harmonized price information was updated. If process 750 determines that the predetermined time has not elapsed ("NO" at 764), process 750 can continue to wait. Otherwise, if process 750 determines that the predetermined time has elapsed ("YES" at 764), process 750 can return to 752 to receive updated price information from the distributor. Note that, in some embodiments, a portion of process 750 can be executed asynchronously. For example, if a portion of the distributor's systems are not configured to respond to queries for particular price information, process 750 can receive price information from the distributor at 756 when the information is sent (e.g., pushed) from the distributor's system(s), which may not coincide with times at which information is requested at 758.

Figure 8:
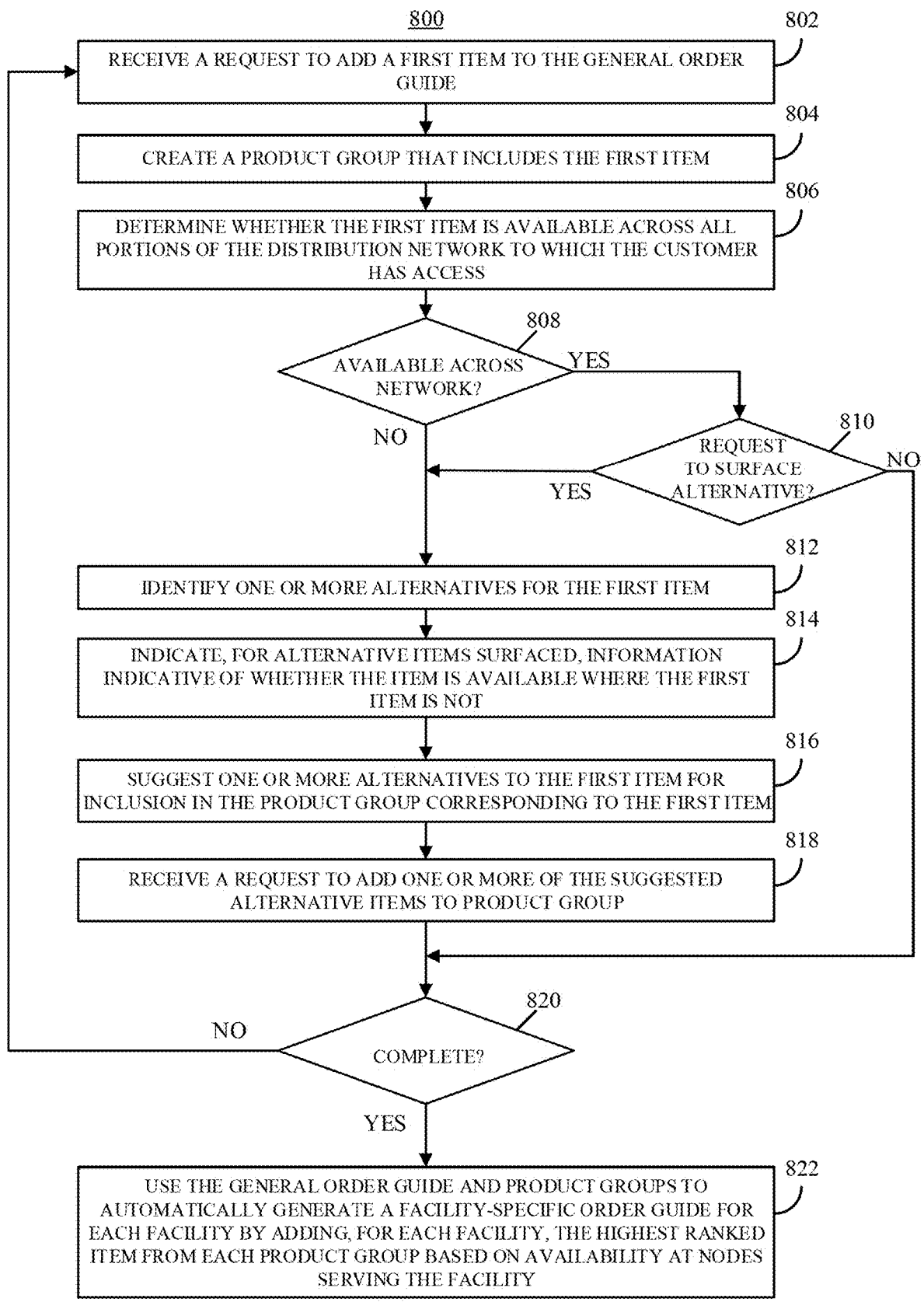
FIG. 8 shows an example of a process for grouping two or more items into a master list and/or product group, and automatically selecting one or more of the items for inclusion in a facility order guide based on availability and/or price information in accordance with some embodiments of the disclosed subject matter.

FIG. 8 shows an example 800 of a process for grouping two or more items into a master list and/or product group, and automatically selecting one or more of the items for inclusion in a facility order guide based on availability within a region in which the item is being ordered in accordance with some embodiments of the disclosed subject matter. As shown in FIG. 8, at 802, process 800 can receive a request to add a first item to a general order guide. As described above in connection with 610, such a request can be sent in any suitable format and in response to any suitable action.

At 804, process 800 can create a master list or product group that includes the first item. In some embodiments, when an item is first added to a general order guide, process 800 can automatically create a master list or product group associated with the item. In some embodiments, if a product group already exists for a product that can be a substitute for the product to be added based on the request at 802, process 800 can identify the existing product group and/or process 800 can automatically add the selected item to the existing product group.

At 806, process 800 can determine whether the first item is available in at least all portions of the distribution network to which the organization associated with the order guide has access (e.g., in each distribution center that serves a facility associated with the organization). Additionally or alternatively, in some embodiments, at 806, process 800 can determine whether the first item is available in at least all portions of the distribution network associated with a particular general order guide. For example, process 800 can submit a request to a system that maintains information about which items are available across the distributor's distribution network. In a more particular example, process 800 can submit a query to a unified encrypted database (e.g., database 304) of inventory across all nodes in the distributor's distribution network for information about the first item. In some embodiments, process 800 can receive information indicating from which nodes the first item is available (and/or from which nodes the first item is normally available), and can compare those nodes in which the item is available to nodes which the facilities associated with the organization have access (e.g., comparing a list of distribution centers which can deliver the item to a particular region to a list of regions in which the organization has facilities and/or a list of facilities that are each associated with a region). In some embodiments, a user interface that presents information about items included in a general order guide, items included in a master list or product group, items included in search results, or any other time a user interface is presenting information about an item, the user interface can present coverage information indicating how many of the facilities are within a portion of the distribution network in which the item (or items included in a master list or product group corresponding to the item) is available. For example, coverage information can be presented as shown in, and described below in connection with, FIGS. 10C, 10E, and 10F.

At 808, process 800 can determine whether the first item is available across the portions of the distribution network to which the organization has access. If process 800 determines that the first item is available across the portions of the distribution network to which the organization has access ("YES" at 808), process 800 can move to 808.

At 810, process 800 can determine whether a request has been received to surface alternatives to the first item. For example, such a request can be manually initiated via selection of a particular user interface element. As another example, such a request can be programmatically initiated in response to a determination that the organization may be interested in being presented with alternatives (e.g., which can be indicated by a setting, by past conduct, and the like). As yet another example, such a request can be initiated whenever information about a particular item and/or a master list or product group that includes the particular item is presented. In a more particular example, if a user navigates to a portion of a user interface that presents information about a particular item, process 800 can consider navigation to that portion of the user interface to be a request to surface alternatives. As still another example, such a request can be initiated periodically at regular and/or irregular intervals. In a more particular example, a request can be initiated for different organizations in turn such that alternatives are surfaced for each of the organizations at least once in a particular period of time. In such an example, alternatives can be surfaced for each of the organizations at least once per day, per week, per month, or any other period of time. Such alternatives can be surfaced to, for instance, determine when there is an opportunity for savings. In some embodiments, a request to surface alternatives can be received when a particular user interface element is presented in a user interface, such as a field for presenting alternatives to a presented item. Alternatively, in some embodiments, a user may browse for other items (e.g., by navigating to another portion of the user interface, by entering one or more terms into a search field of the user interface, or the like).

If process 800 determines that a request has been received to surface alternatives to the first item ("YES" at 810), or if process 800 determines that the first item is unavailable in at least one portion of the distribution network to which the organization has access or a given facility has access ("NO" at 808), process 800 can move to 812.

At 812, process 800 can identify one or more alternatives for the first item. In some embodiments, process 800 can use any suitable technique or combination of techniques to identify alternatives to the first item, such as techniques described below in connection with FIG. 9. For example, process 800 can identify one or more alternatives by querying an encrypted database or knowledgebase that includes associations between products that are alternatives. Additionally or alternatively, process 800 can identify alternatives to the first item by allowing a user to search or otherwise browse for one or more items.

At 814, process 800 can indicate, for alternative items surfaced (e.g., automatically by process 800, or via a user initiated search for the one or more additional items), information indicative of whether each item is available where the first item (and/or other items in a master list or product group corresponding to the first item) is not available. Such information can be presented using any suitable technique or combination of techniques. For example, the information can be presented numerically. In a more particular example, process 800 can present the information using a number indicating how many more regions the item would cover compared to how many regions are currently covered. As another example, the information can be presented graphically. In a more particular example, process 800 can present the information using a pie chart or bar graph showing current coverage in a first color, additional coverage provided by the item in a second color, and regions still lacking coverage in a third color. In another more particular example, process 800 can present the information using different colors to indicate how much additional coverage is provided by an item. A first color (e.g., red) can indicate that the item provides no additional coverage, a second color (e.g., yellow) can indicate that the item provides some additional coverage, and a third color (e.g., green) can indicate that the item provides coverage for all regions that previously lacked coverage.

At 816, process 800 can suggest one or more alternatives to the first item for potential inclusion in a master list or product group for a class of items that includes the first item and the suggested alternative(s). For example, if the first item is a particular size container of detergent from a first supplier (e.g., a first brand of detergent), but that item is not available in all portions of the distribution network to which the organization has access or a given facility has access, process 800 can suggest detergent from another supplier and/or in a different size that is available in a portion of the distribution network in which the first item is not as a potential substitute to potentially include in a master list for the class "detergent." In some embodiments, process 800 can use any suitable technique or combination of techniques to suggest the one or more alternatives. For example, process 800 can suggest the one or more alternatives by presenting the alternatives identified at 812 in a particular order. As another example, process 800 can suggest the one or more alternatives by highlighting (in any suitable manner) a lowest priced alternative, an alternative that provides the most additional coverage, an alternative that meets brand, nutrition, or other standards, and/or other similar criteria. In some embodiments, the suggested alternatives can be available via multiple different distributors.

At 818, process 800 can receive a request to add one or more of the suggested alternative items to the master list or product group. For example, a user can select one or more of the alternatives and/or select a position within the master list to place each of the one or more selected alternatives. In some embodiments, a product group can include items from multiple different distributors.

At 820, process 800 can determine whether a user has completed interaction with a particular master list or product group. In some embodiments, any suitable action can indicate that the user has completed interaction with a particular master list or product group. For example, process 800 can determine that a user has completed interaction with a particular master list or product group when the user navigates to a different portion of a user interface (e.g., to the general order guide associated with the master list or product group, to another master list or product group, to a list of general order guides, and/or another portion of the user interface that is not configured to edit which items are included in a particular master list or product group). As another example, process 800 can determine that a user has completed interaction with a particular master list or product group when the user stops interacting with the user interface (e.g., by signing out, closing an application, selecting a user interface element to save a current state of a master list or product group, or any other suitable action indicating that a user has stopped interacting with the user interface).

If process 800 determines that a user has not completed interaction with a particular master list or product group ("NO" at 820), process 800 can return to 802 (or any other portion of process 800 preceding 820, such as 804 to 818) to continue to edit a particular master list or product group. Otherwise, if process 800 determines that a user has completed interaction with a particular master list or product group ("YES" at 820), process 800 can move to 822. At 822, process 800 can use the master list or product group during creation or one or more facility order guides. For example, process 800 can use the order in which items are included in the master list or product group to select which of the items to include in the facility order guide being created. In such an example, process 800 can select the highest ranked item that is also available in the portion of the distribution network associated with the facility. As another example, process 800 can determine which item to select from the master list or product group based on price information. In such an example, process 800 can select the lowest priced item (e.g., by price per count, per pound, per ounce, or the like, rather than per unit) that is also available in the portion of the distribution network associated with the facility. Note that, in some embodiments, a facility order guide can include items available from different distributors. In such embodiments, when being used during an ordering process (e.g., via a procurement system), items available from different distributors can be presented in a unified user interface. Additionally or alternatively, in some embodiments, items available from different distributors can be presented using different user interfaces that can be presented serially or in parallel. For example, a user can be presented with a first user interface for ordering items in the order guide from one distributor, and when that is complete can be presented with another user interface for ordering items in the order guide from a second distributor. As another example, a user can be presented with a first user interface for ordering items in the order guide from one distributor, and can be presented with another user interface for ordering items in the order guide from a second distributor at the same time (e.g., as two different applications, as two different browser windows, as different tabs within a single browser window).

As yet another example, process 800 can determine which item to select from the master list or product group based on stocking information. In such an example, process 800 can sort the items in the master list or product group based on information indicating how readily available the item is, and can select an item that is most readily available that also meets another criteria or criterion such as highest priority or lowest price. Items can be available in a particular region because the items are currently physically located at the distribution center (which can be a category that is most readily available), the items can be sourced from a nearby distribution center relatively quickly (e.g., the item can be available on demand, but is not currently physically located at the distribution center), or the items can be sourced from a central distribution center (e.g., the items are available, but may not be shipped for several days, which can be a category that is least readily available).

At still another example, process 800 can determine which item to select from the master list or product group based on one or more other criteria or criterion, such as based on size (e.g., an organization may prefer a particular size over another), based on brand, based on contract status (e.g., if the organization has a contractual relationship with the distributor or a supplier in connection with the item), and/or any other suitable criterion or criteria.

In some embodiments, having identified a preferred item, process 800 can determine whether the preferred instance of the item is available in the subnetwork of the distribution network in which the facility is located. For example, process 800 can query a unified database associated with the distributor's available inventory and/or a database associated with the particular node(s) corresponding to the subnetwork in which the distribution network is located to determine whether the preferred item is available to that particular facility. Additionally, process 800 can determine whether the preferred item could be transferred from another distribution center to the node serving that facility to be shipped to the facility at the time as specified by the order.

If, when an order is being submitted for a particular facility, process 800 determines that the preferred instance of the item is not available for shipment to that facility from a node of the distribution network corresponding to that facility, process 800 can determine which of the alternatives in the product group is available and/or whether a next most preferred instance of the item is available from that node. In some embodiments, process 800 can determine the preferred instance of the item based on a one or more rules specified by the organization, which can be specified on an organizational level, a facility level, or a general order guide level. For example, the organization can select a rule based on the explicit priority assigned to each instance of the items. As another example, the organization can select a rule based on the stocking status (e.g., whether the item is stocked locally, or if it is stocked elsewhere but can still be ordered from the distribution center). As yet another example, the organization can select a rule based on price (e.g., the lowest price per count can be selected). As still another example, the organization can select a rule based on contract status (e.g., whether the organization has entered into a contractual relationship obligating the organization to preferentially purchase particular items, or allowing the organization to purchase particular items at reduced prices if certain conditions are met). In some embodiments, the initial decision about which instance to place on the facility order guide can be based on whether the item is stocked, but may not account for the amount that is stocked. For example, if the facility normally orders 100 units of an item, but only 25 units of that item are stocked, process 800 may place the item on the order guide regardless. Additionally or alternatively, in some embodiments, process 800 may select a different item, or may add alternatives (e.g., less preferred items) to a list of acceptable alternatives if that item is out of stock.

In some embodiments, process 800 can use any suitable factor(s) to determine which item from the master list to substitute for a most preferred item. For example, process 800 can select the alternative that would produce the lowest cost. As another example, process 800 can select an alternative based on the existence of a contractual relationship. In such an example, if the organization has an obligation to purchase a particular brand (e.g., due to a GPO contract with the supplier), process 800 can select the alternative in order to satisfy this obligation if possible. As yet another example, process 800 can select an alternative based on brand preferences, which can be made explicitly by a user or implied from past behavior of a user. In such an example, any suitable technique can be used to imply brand preference, such as machine learning techniques. Machine learning techniques that can be used to infer brand preference can include Random Forest techniques, K-Means clustering techniques, Word2Vec techniques, convolutional neural network classification techniques, recurrent neural network techniques, any other suitable machine learning techniques, and any suitable combination thereof.

In some embodiments, if process 800 determines that none of the items on the master list are available for a particular facility, process 800 can take an alternate action. For example, process 800 can alert a user that the item could not be placed on the facility order guide. In such an example, process 800 can present one or more alternatives that are available for the particular facility, and the user can indicate which (if any) to include in the facility order guide, and/or whether the selected item is to be added to the master list or product group. As another example, process 800 can automatically identify an alternative to be added to the facility order guide. In such an example, process 800 can determine which alternative to add based on the products ranking in a list of identified alternatives to at least one item in the master list. Additionally, a ranking can be based on how many of the items in the master list or product group are identified as being alternatives to an item surfaced automatically by process 800.

Figure 9:
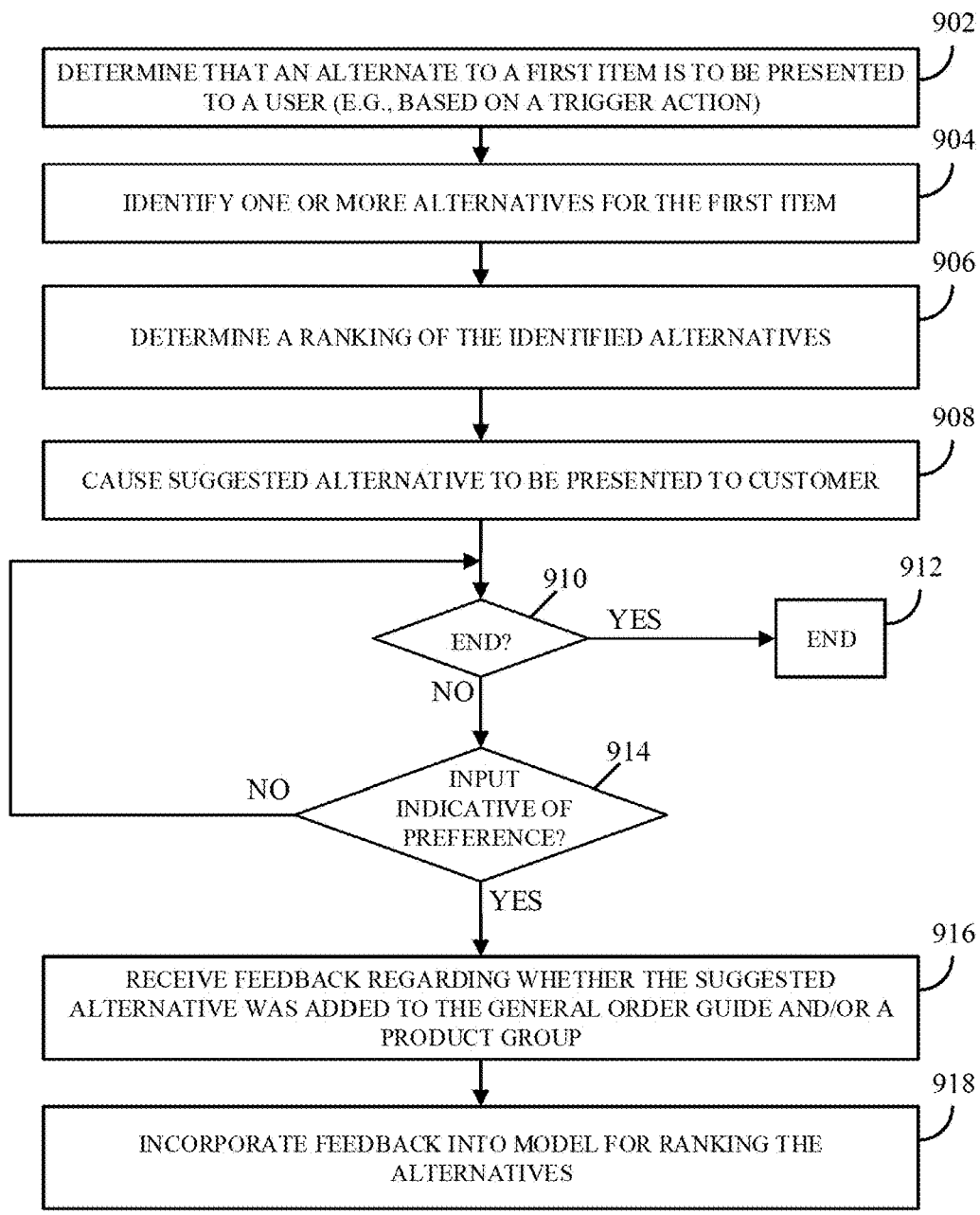
FIG. 9 shows an example of a process for selecting one or more alternative items for presentation to a user based on cost, regional availability, compatibility, and/or any other suitable factors in accordance with some embodiments of the disclosed subject matter.

FIG. 9 shows an example 900 of selecting one or more alternative items for presentation to a user based on cost, regional availability, compatibility, and/or any other suitable factors in accordance with some embodiments of the disclosed subject matter. As shown in FIG. 9, at 902, process 900 can determine that an alternative to a first item is to be presented to a user in response to some triggering action. In some embodiments, any suitable action can cause process 900 to determine that an alternative is to be presented. For example, selection of a user interface element to explicitly request that alternatives be surfaced (e.g., as described above in connection with 808). As another example, if an item of a particular class is to be included in an order, but there is not an approved instance of that class available from a particular node (e.g., distribution center) and/or in a particular region (e.g., if there is no master list, or if no items on the master list are in stock), process 900 can determine that an alternative is to be presented to a user. As yet another example, process 900 can determine that a saving opportunity exists for a particular item.

In some embodiments, process 900 can identify and present saving opportunities using any suitable technique or combination of techniques. For example, process 900 can identify items in a product group, at least a portion of a purchase history of the organization (e.g., products purchased by a facility, how much was purchased) for any suitable length of time (e.g., three months, six months, 12 months). For each product group, process 900 can calculate the cost per unit (e.g., per quantity, per mass/weight, per volume), which can account for rebates and/or discounts available to the organization, and can select the cheapest item from the product group based on the cost. Additionally, in some embodiments, process 900 can calculate the cost of one or more alternatives to at least one item in the product group, and can determine whether any of the alternatives are cheaper. For each product group, process 900 can calculate savings based on the cost of the cheapest item, and based on the order history information. Process 900 can calculate how much the organization can save per time (e.g., per week, per month, per year) if the organization were to preferentially order the cheaper item/cheaper alternative. Process 900 can present a list of saving opportunities that have been identified (e.g., as a list of product groups and corresponding savings in descending order of total savings).

At 904, process 900 can identify one or more alternatives to the first item. In some embodiments, identifying alternatives can include querying a database and/or knowledge base for alternatives to the first item. In such embodiments, a process of classifying items as being alternatives can be performed asynchronously (e.g., periodically at regular and/or irregular intervals) such that the information is available when requested. Additionally or alternatively, in some embodiments, process 900 can identify one or more alternatives by determining one or more properties of the first item, and automatically searching for alternatives with similar characteristics.

In some embodiments, a second item can be identified as an alternative to the first product based on various properties. For example, process 900 can determine whether two items are alternatives based on a comparison of the description and/or product category of the first item and a description and/or product category of other items. As another example, process 900 can determine whether two items are alternatives based on a size and/or unit of measure of the first item and the other items. In a more particular example, where the first product is a gallon container of detergent from a first supplier, process 900 can identify containers of detergent of similar size from other suppliers as being potential alternatives, but can determine that packets of detergent from the first supplier may not be an acceptable alternative.

As yet another example, process 900 can determine whether two items are alternatives based on nutritional content of the first item and other items that are potentially similar. For example, if the first item is low sodium vegetable stock, process 900 can determine whether potential alternatives have a particular sodium content.

As still another example, process 900 can determine whether two items are alternatives based on one or more properties of the first item and other items. More particular examples can included, if the first item is indicated as nut free, if the first time is in indicated as being gluten free, if the first time is in indicated as being organic, if the first time is in indicated as being conventional, if the first time is in indicated as being GMO free, and the like. In another more particular example, process 900 can determine whether another product is suitable for achieving the same outcome as the first item, which can include acting as a disinfectant for particular types of pathogens (e.g., bacteria, viruses, and/or other organisms). In some embodiments, various sources of knowledge can be used to determine whether a product is suitable for achieving a particular outcome, such as information provided by a government agency (e.g., a chart provided by the Centers for Disease Control and Prevention that identifies whether particular cleaning agents are suitable for use as disinfectants for particular pathogens).

As a further example, process 900 can determine whether two items are alternatives based on past user actions, such as which past suggestions were accepted and/or declined. In a more particular example, process 900 can use a trained model (e.g., trained using one or more machine learning techniques) that is provided information about which suggestions a user has adopted and/or which suggestions a user has declined as input, and provides output indicative of one or more alternatives to a particular item or items. In another more particular example, various products can be clustered using cluster analysis techniques, such as K-means clustering, mean-shift clustering, density-based spatial clustering of applications with noise. In such an example, products can be clustered across categories which can be used to determine, given products that a user has affirmatively selected, which other products the user may be interested in. Alternatives can be identified and/or ranked based on the product itself being similar, and also based on whether the product is in a cluster with other products that the user has affirmatively selected. Alternatively, users can be clustered based on similarity of user actions (e.g., product selections made by the users), and alternatives can be identified based on the product itself being similar and also based on how many other users in the same cluster have selected the product. In some embodiments, process 900 can generate signals that can be used to train and/or use trained models by affirmatively suggesting a product as an alternative and recording whether the user accepted or rejected the alternative, and/or what priority the user assigned to the alternative.

As another more particular example, if in the past a user (or users) have consistently expressed a brand preference when an item is not available for a particular facility, process 900 can determine that the user prefers a particular brand. In such an example, a particular item (e.g., a particular size of an item) is unavailable (e.g., when creating a facility order guide or at the time of ordering) or not available in a desired quantity, process 900 can suggest multiple items as alternatives such as an item from another supplier and an item from the same supplier in a different size, with the item from the other supplier being suggested first because it is less costly. If the user consistently chooses the item from the same supplier in spite of it appearing less desirable, process 900 can use this as a signal of brand preference for items from the first supplier.

In yet another more particular example, if a user consistently selects a particular quality of item (e.g., items can be classified into various quality levels, such as generic or private label, discount, standard, and premium), process 900 can use this as a signal indicative of the user's preference for a particular quality of product. In such an example, process 900 can preferentially suggest items of the quality preferred by the user regardless of whether the item is more expensive than other potential alternatives. This can be used as a signal across different types of products, such as if a user selects a generic item (e.g., a generic ketchup, a generic floor vacuum cleaner, a generic cleaning solution, a generic package of garbage bags, generic adhesive bandages, generic over the counter medication, generic light bulbs), the user may be open to other types of generic items, whereas if the user selects a corresponding branded item it may indicate that the user would be more interested in other branded items (which may be independent of whether the other items are associated with the same brand) even if they are not the least expensive option.

As an additional example, process 900 can determine whether two items are alternatives based on product relationships identified from menu planning activities. In a more particular example, a user can provide input indicating whether a particular item is not acceptable as an alternative and/or whether a particular item is an acceptable alternative, and in some cases a reason why the user considers the item to be acceptable or not. In such an example, this can be used as a signal when suggesting alternatives. If a user has identified two chicken breasts as being acceptable alternatives because the nutritional content is equivalent for the user's purposes, and has identified another chicken breast as not being an acceptable alternative because it has an unacceptably high sodium content, process 900 can utilize the information in determine whether other potential alternatives (e.g., other chicken breasts) are likely to be acceptable alternatives.

As another additional example, process 900 can determine whether two items are alternatives based on price. In a more particular example, two items may be very similar but the first item may be much less costly than the otherwise similar alternative. This may occur, for example, when the first item is a private label item and the second item is a brand name item. Alternatively, this may occur when the first item is a brand name item that is discounted based on a contractual relationship with the supplier, and the second item is a brand name item that is not discounted. In some embodiments, different properties of items can be used to determine whether an item is an alternative and/or how similar the item is as an alternative. For example, similarity for food products can be determined for various categories and/or properties such as: similarity based on product descriptions; similarity based on product categories; similarity based on product attributes (e.g., vegan, kosher, organic, low sodium, low fat, nut free, dairy free, and/or any other attributes); similarity based on unit of measure; match based on GTIN (UPC identifier); similarity based on nutritional analysis; similarity based on ingredients (e.g., common ingredients, mismatched equivalent ingredients, omitted ingredients); curated alternatives based on menu planning activities performed by users associated with the organization and/or users associated with other organizations; curated alternatives identified by a developer or other user associated with an entity providing access to process 900; past user behavior by all users (e.g., what have other users indicated as alternatives, such as by including two items in a product group); past user behavior particular to a specific user/organization. As another example, similarity for maintenance, repair and operations (MRO) products can be determined for various categories and/or properties such as: similarity based on product descriptions; similarity based on product categories; similarity based on product attributes (e.g., voltage/amperage, capacity, heat output, and/or any other attributes); similarity based on unit of measure; match based on GTIN (UPC identifier); similarity based on electrical power requirements; similarity based on materials (e.g., stainless steel, plastic, biodegradable, "green" alternatives, and/or any other attributes); curated alternatives based on product selection requirements performed by users associated with the organization and/or users associated with other organizations; curated alternatives identified by a developer or other user associated with an entity providing access to process 900; past user behavior by all users (e.g., what have other users indicated as alternatives, such as by including two items in a product group); past user behavior particular to a specific user/organization. In some embodiments, similarity scores can be generated for any of these properties and/or categories, and/or other properties and/or categories, and these similarity scores can be combined to generate a similarity score for a pair of items. Such a similarity score can be used to identify alternatives and/or to rank alternatives. In some embodiments, different similarity scores can be weighted differently. For example, past user behavior associated with the organization can be weighted more heavily than similarity based on unit of measure. In some embodiments, weights can be different for different users, such as if a user indicates that nutritional content or product attributes are especially important (either explicitly or implicitly), a similarity score that reflects similarity based on that category can be weighted more heavily.

In some embodiments, process 900 can determine whether a group of products is an alternative to a particular product or group of products. For example, if a product is composed of individual components, a group of products corresponding to the components can be identified as being an alternative to the product. In a more particular example, for a product (or item) such as a kit used to assemble a finished product, process 900 can identify the individual components as an alternative to the product. In another more particular example, for a single product (e.g., a finished product, a single package that includes multiple products) that can be assembled from components, process 900 can identify the components as being an alternative to the finished product. In some embodiments, process 900 can suggest a group of components as alternative to a product that is being presented and/or a product that is currently included on a general order guide. Additionally or alternatively, in some embodiments, where a group of products is an alternative to a product, and each product in the group is included in a particular order guide, process 900 can suggest the single product as an alternative to the group of products, especially if the single product presents an opportunity for savings.

Many examples exist of products that are composed of components. A very simple example is a package including multiple instances of the same item (e.g., a pack of 6 containers of a cleaning solution) can be an alternative to an equivalent amount of the same item in isolation and/or different sizes. As another example, a kit that includes various items that can be used to assemble a product (e.g., a kit that includes ingredients for a dish) can be an alternative to each item in isolation. In such an example, if it would be less expensive to purchase items corresponding to the items that are included in the kit, process 900 can suggest those items for inclusion as a group on a general order guide. As yet another example, a package that includes a variety of related items (e.g., various plastic utensils) can be an alternative to each item in isolation.

In some embodiments, if a particular product is available from a particular distributor, process 900 can identify alternatives that are available from a different distributor or distributors in the same portion of the distribution network. For example, if a particular product is available via a particular distributor, process 900 can present products available from that distributor as alternatives. As another example, if a particular product is available via the particular distributor, process 900 can present products available from a different distributor as alternatives. As yet another example, if a particular product is available via the particular distributor, process 900 can present a group of products available from the distributor as an alternative. As still another example, if a particular product is available via the particular distributor, process 900 can present a group of products available from a different distributor as an alternative. As a further example, if a particular product is available via the particular distributor, process 900 can present a group of products as alternative where one or more of the products presented as part of the group is available from the distributor and one or more of the other products presents as part of the group is available from a different distributor. In some embodiments, process 900 can present any combination of alternatives, including products available from the same distributor, products available from another distributor, and/or a group of products available from the same and/or a different distributor.

At 906, process 900 can determine an order for the identified alternatives. For example, process 900 can rank the potential alternatives based on how similar the alternatives are to the first item. Such a ranking can take into account multiple factors such as comparisons of the description and/or product category, size and/or unit of measure, nutritional content, product specifications, properties of the items, past user actions, menu planning and/or selection activities, cost, and the like.

At 908, process 900 can cause one or more of the identified alternatives to be presented to the user based on the ranking at 906. For example, process 900 can cause a highest ranked alternative to be presented, and in some cases, one or more other less highly ranked alternatives. In some embodiments, a cost difference of the alternative(s) can be presented to assist a user in determining which alternative (if any) to select. In such embodiments, the cost difference can be presented using various techniques, such a unit price difference, a difference in price per count or measure (e.g., per 100 count, per ounce, per kilogram, and the like). Additionally or alternatively, in some embodiments, a cost difference can be presented based on a difference in expected cost per time (e.g., per week, per month, per year) based on how much of the first item (or first class of item) the organization ordinarily purchases, and how much of the first item can (or must) replaced with an alternative.

At 910, process 900 can determine whether to end process 900 using any suitable technique or combination of techniques without incorporating user feedback into a model used to identifying and/or rank identified alternatives. For example, if alternatives are being presented and a user does not select any of the alternatives prior to navigating away from the alternatives, process 900 can end without considering the navigation to be feedback about the alternatives. As another example, if alternatives are being presented and a user closes the user interface, process 900 can end without considering it to be feedback about the alternatives presented.

If process 900 determines at 910 that process 900 is to end ("YES" at 910), process 900 can move to 912, and process 900 can end. Otherwise, if process 900 does not determine at 910 that process 900 is to end ("NO" at 910), process 900 can move to 914. At 914, process 900 can determine whether input has been received that is indicative of a user's preferences regarding one or more presented alternatives. For example, if a user selects one or more particular alternatives for inclusion in a master list or product group, process 900 can determine that input was received that is indicative of a user's preferences (e.g., indicating that the user prefers the selected alternative(s)). As another example, if a user selects a user interface element to manually search for alternatives, process 900 can determine that input was received that is indicative of a user's preferences (e.g., that the user is dissatisfied with all of the presented alternatives). As yet another example, if a user selects a user interface element to request that additional alternatives be automatically surfaced, process 900 can determine that input was received that is indicative of a user's preferences (e.g., that the user is dissatisfied with all of the presented alternatives). As still another example, input indicative of preference can be derived from inventory information (e.g., as described below in connection with FIG. 12) indicating that a particular item is preferred to an alternative (e.g., indicated by the speed at which the inventory is depleted).

If process 900 determines that input indicative of preference has not been received ("NO" at 914), process 900 can return to 910 (or another earlier portion of process 900, such as 902). Otherwise, if process 900 determines that input indicative of preference has been received ("YES" at 914), process 900 can move to 916. At 916, process 900 can receive feedback regarding whether the suggested alternative (or one of the suggested alternatives) was added to the master list or product group, where in the master list or product group the alternative was added, if none of the alternatives were added to the master list, or if a user added an item to the master list that was surfaced via a user directed search, or any other feedback.

At 918, process 900 can use feedback received at 916 to update a model that is configured to identify and/or rank potential alternatives in the future. For example, as more users add a particular item to a master list that includes a first item, process 900 can determine that the item is more likely to be a preferred alternative to the first item. As another example, as users decline to add any of the presented alternatives, process 900 can determine that an item that has not been presented is likely to be a more preferred alternative. As yet another example, as users add an item to a master list or product group via a user directed search that was not included in an automatically surfaced set of alternatives for that master list or product group, process 900 can determine that the item is likely to be an appropriate alternative.

Figure 10A:
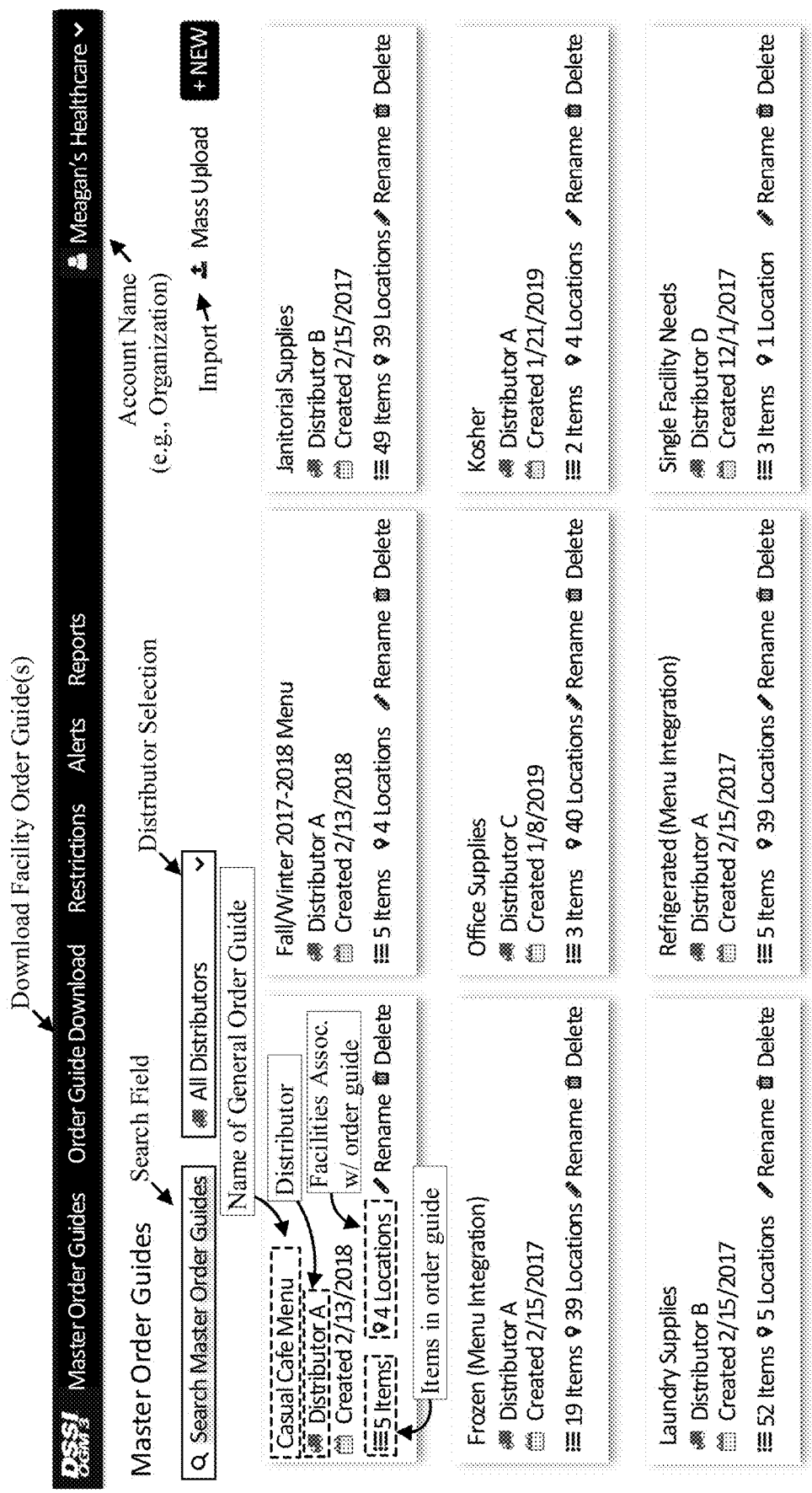
FIG. 10A shows an example of a user interface presenting multiple general order guides associated with a user (e.g., a user associated with an organization) in accordance with some embodiments of the disclosed subject matter.

FIG. 10A shows an example of a user interface presenting multiple general order guides associated with a user (e.g., a user associated with an organization) in accordance with some embodiments of the disclosed subject matter. Note that order guide as used herein is intended to be non-limiting. For example, an order guide can refer to a collection of products, product groups, master items, items, services, deliverables, and/or any other thing(s) that may be the subject of procurement activities. In such an example, the order guide can be used (e.g., by an organization, facility, distributor, supplier, individual, and/or a user associated therewith) to facilitate procurement activities. As another example, a catalog that includes various products and/or services that can be ordered can be considered an order guide. As shown in FIG. 10A, a user interface can be presented to a user associated with an organization and/or a user that has been granted permission to access information related to the organization. As shown in FIG. 10A, the user interface includes various general order guides that can each have identifying information (e.g., a semantically meaningful name), and can be associated with a distributor, any suitable number of items, and any suitable number of facilities. Note that in FIG. 10A, the number of items in the order guide corresponds to the number of product groups, which can each be associated with one or more items that may or may not be available for delivery to each facility. Additionally, the user interface shown in FIG. 10A includes a search field that can be used to search for a particular general order guide (or order guides), for items included in the general order guides, a "mass upload" user interface element that can be used to import information to be used to generate and/or update a general order guide, and a user interface element to add a "New" general order guide. Note that these features shown in FIG. 10A are an example, and a particular user interface that facilitates interaction with one or more general order guides can include less information (e.g., distributor can be excluded), more information, and/or different information.

FIG. 10B shows an example of a user interface presenting details related to multiple facilities that can be associated with a particular general order guide in accordance with some embodiments of the disclosed subject matter. In some embodiments, a user can navigate to the user interface of FIG. 10B using any suitable technique or combination of techniques, such as by selecting one or more user interface elements associated with a particular general order guide in a user interface such as that shown in FIG. 10A. For example, a user can select a user interface element associated with the number of facilities associated with the general order guide, a user interface element associated with identifying information of the general order guide, a user interface element associated with live search results presented in connection with the search field, and/or any other suitable user interface element.

As shown in FIG. 10B, the user interface includes a name of the general order guide for which details are being presented, user interface elements (e.g., implemented as check boxes in FIG. 10B) associated with each location (and a select all element associated with the row that includes column headers) to select and/or deselect one or more particular facilities, and columns that can be used to present: the name of the various facilities shown; identifying information of the facility (e.g., which may be used by a distributor, by the organization, by the provider of the user interface, or any other suitable entity, to identify the facility when a semantically meaningful name may not be necessary or appropriate); physical address information associated with the facility (e.g., street address, suite number, city, state, country, zip code, postal code, any other suitable address information, or any suitable combination thereof); distributor information associated with the facility (e.g., a semantically meaningful name associated with a distribution center (s) that serves the facility, other identifying information such as an identification code associated with a distribution center(s) that serves the facility, or the like). Note that these features shown in FIG. 10B are an example, and a particular user interface that provides details about facilities that can be associated with the general order guide can include less information, more information, and/or different information.

As shown in FIG. 10B, the user interface also includes a user interface element to save associations of the selected locations with the order guide (labeled "Save Enabled Locations" in FIG. 10B). A user selects and/or deselects whichever of the facilities shown in the user interface, and can cause those facilities to be associated with the order guide by selecting the save user interface element. Note that in the example shown in FIG. 10B, selections are not saved until the user affirmatively selects the save user interface element. However, this is merely an example, and additionally or alternatively, associations of facilities with the order guide can be saved in real time as the user selects and/or deselects facilities.

FIG. 10C shows an example of a user interface presenting coverage across facilities associated with a particular general order guide in accordance with some embodiments of the disclosed subject matter. In some embodiments, a user can navigate to the user interface of FIG. 10C using any suitable technique or combination of techniques, such as by selecting one or more user interface elements associated with a particular general order guide in a user interface such as that shown in FIG. 10A. For example, a user can select a user interface element associated with the number of product groups included in the general order guide, a user interface element associated with identifying information of the general order guide, a user interface element associated with live search results presented in connection with the search field, and/or any other suitable user interface element.

As shown in FIG. 10C, the user interface includes a name of the general order guide for which coverage details are being presented, user interface elements (e.g., implemented as check boxes in FIG. 10C) associated with each product group (and a select all element associated with the row that includes column headers) to select and/or deselect one or more particular product groups (e.g., to combine the selected product groups, to batch delete the selected product groups, to expand all of the selected product groups, or the like), and columns that can be used to present: the name of the product group; the number of unique items (e.g., based on SKU, UPC, product number, and/or any other suitable identifying information); the number of facilities associated with the general order guide for which the product group includes an item available in that facilities portion of the distribution network; the number of distribution centers serving the various facilities associated with the general order guide that can provide at least one of the items in the product group; and actions that can be performed for a particular product group (e.g., an edit user interface element, a user interface element to expand or show details related to items in a particular product group, delete a particular product group, or user interface elements corresponding to any other suitable action.

Additionally, as shown in FIG. 10C, the user interface includes a user interface element that graphically represents the number of product groups that include at least one item that is available in each facility that is associated with the general order guide (e.g., if at least one of the items in a product group is available in each facility that product group provides full coverage) as a portion of the total number of product groups. The user interface shown in FIG. 10C also includes user interface elements to refine results based on the presence of supplemental information (e.g., an alert being associated with a particular product group or item within the product group).

FIG. 10D shows an example of a user interface presenting an expanded view of a particular product group associated with a particular general order guide in accordance with some embodiments of the disclosed subject matter. A user can cause the user interface to present details about items in a particular product group, as shown in FIG. 10D, by selecting a particular user interface element or user interface elements. For example, by selecting one of the "expand" user interface elements shown in FIG. 10C.

FIG. 10E shows an example of a user interface presenting details related to a particular product group and suggested alternatives to items included in the product group in accordance with some embodiments of the disclosed subject matter. In some embodiments, a user can navigate to the user interface of FIG. 10E using any suitable technique or combination of techniques, such as by selecting one or more user interface elements associated with identifying information of a particular product group included in a general order guide, or by selecting an "edit" user interface element.

As shown in FIG. 10E, the user interface includes a name of the general order guide that includes the product group for which details are being presented, a name of the product group for which details are being presented, a field for editing the name of the product group, a user interface element that can be selected to "save" a current configuration, information about the number of facilities and/or distribution centers covered by the product group, information about the number of items in the product group, information associated with items included in the product group (e.g., which can similar to information described above in connection with the FIG. 10C), a user interface element for specifying a selection rule to be used when generating a facility order guide (e.g., implemented in FIG. 10E as a drop down), a portion for presenting alternative items that a user may wish to add to the product group, and other user interface elements (e.g., a "search" user interface element to initiate a user directed search to add one or more products to the product group, user interface elements to control how the information is presented, such as whether to include category information, or whether to include expanded descriptions of the items).

As shown in FIG. 10E, the portion of the user interface that includes suggested alternative items can present information associated with the items, and/or one or more user interface elements that can be selected to perform a particular action. For example, each row corresponding to an alternative item included in the suggested alternatives includes coverage information and information about whether the product would cover any gaps that are not currently covered by the product group. For example, as shown in FIG. 10E, the number of additional distribution centers covered by a particular item is shown in parentheses after information about how many distribution centers (and/or facilities) the item covers (i.e., the row includes a string of characters such as "(+X)" where X is the number of additional distribution centers that would be covered if that alternative item were added to the product group). Additionally or alternatively, the number of additional facilities covered by a particular item can be shown in parentheses after information about how many facilities (and/or distribution centers) the item covers. Additionally, each row corresponding to an alternative item included in the suggested alternatives includes a user interface element to cause the item to be added to the product group.

Figure 10F:
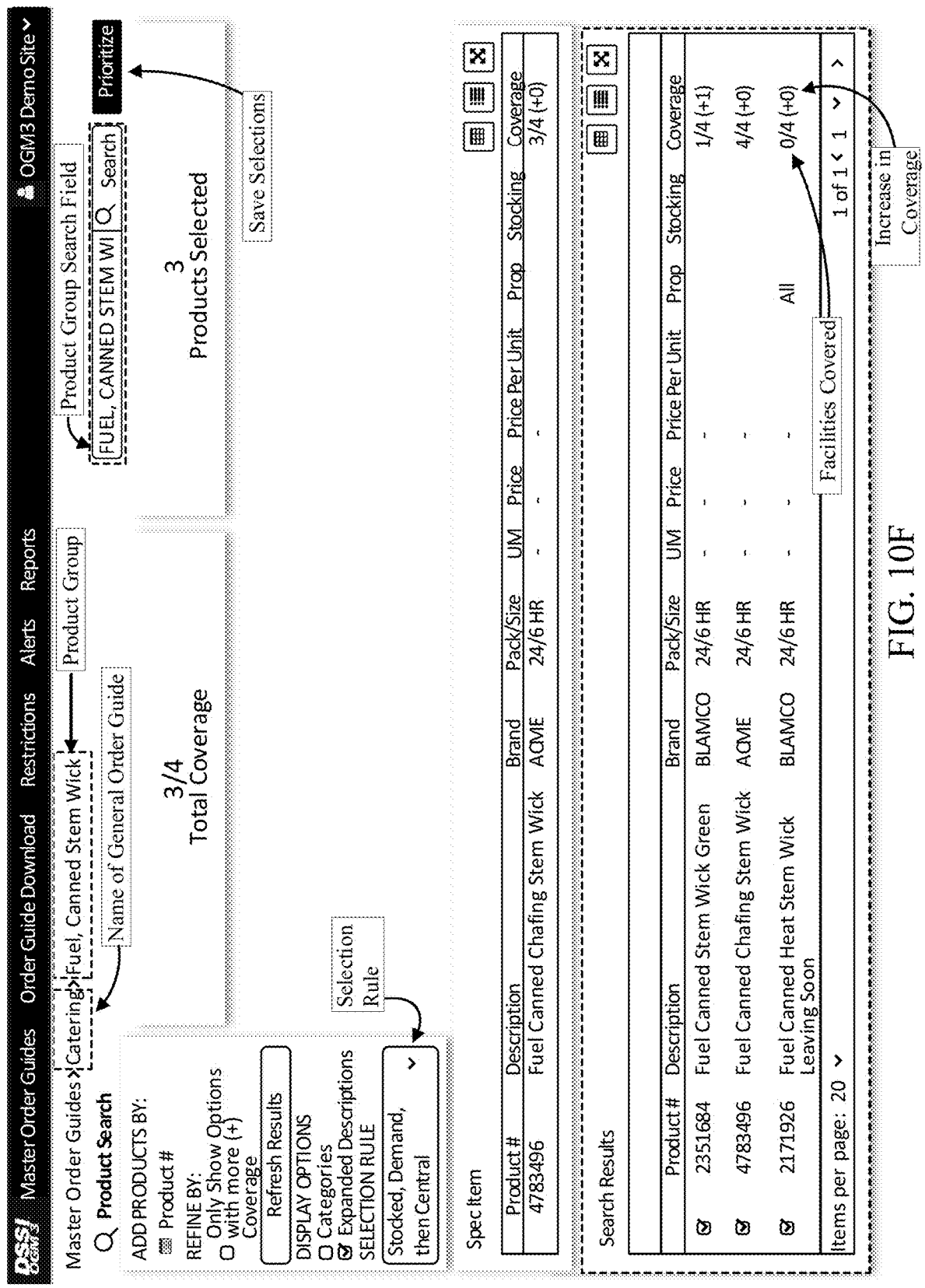
FIG. 10F shows an example of a user interface presenting details related to a particular product group and results of a user directed search in accordance with some embodiments of the disclosed subject matter.

FIG. 10F shows an example of a user interface presenting details related to a particular product group and results of a user directed search in accordance with some embodiments of the disclosed subject matter. In some embodiments, a user can navigate to the user interface of FIG. 10F using any suitable technique or combination of techniques, such as by selecting a "search" user interface element to initiate a user directed search to add one or more products to the product group from the user interface shown in FIG. 10E.

As shown in FIG. 10F, the user interface includes a name of the general order guide that includes the product group to which items can be added, a name of the product group to which items can be added, a field for inputting search terms, a user interface element for causing a search to be performed, information about the number of facilities and/or distribution centers covered by the product group, information about the number of items in the product group, a search results portion in which results of a search can be presented, and various options that can be used to control how the search results are presented. As shown in FIG. 10F, a user interface element can be provided that allows a user to control whether items that would not improve coverage are presented (e.g., implemented as a check box associated with the text "Only Show Options with More [+] Coverage" in FIG. 10F. In some embodiments, the user interface shown in FIG. 10F can include a portion that presents one or more items that have already been added to the product group. For example, as shown in FIG. 10F, a "Spec Item" portion of the user interface shows a first item included in the product group. This can serve as a memory aid that can allow a user to, for example, more easily remember what the user is searching for, what size the user has previously selected. In some embodiments, a user interface element can be provided to allow a user to inhibit presentation of the "Spec Item" portion of the user interface.

FIG. 10G shows an example of a user interface presenting a portion of a facility order guide for a particular facility generated from multiple general order guides associated with the facility in accordance with some embodiments of the disclosed subject matter. In some embodiments, a user can navigate to the user interface of FIG. 10G using any suitable technique or combination of techniques, such as by selecting a particular facility from a list of one or more facilities associated with an organization, or by selecting the "Order Guide Download" user interface element, presented in the menu bar shown in FIG. 10F.

As shown in FIG. 10G, the user interface includes a name of the facility associated with the facility order guide, and columns that can be used to present: the name of a group order guide associated with the facility; the name of a product group included on the group order guide; identifying information of a product that was selected for inclusion on the facility order guide from items included in the product group (e.g., selected based on user-defined priority, stocking status, price, brand, and/or any other suitable criteria); a description of the selected item; a brand associated with the selected item; information indicative of the size of the item that was selected (e.g., the number of items included in a package, and a size of each item); and identifying information about a distribution center from which the selected item is available to the facility.

FIG. 10H shows an example of a user interface presenting alerts related to changes in status of particular items in accordance with some embodiments of the disclosed subject matter. As shown in FIG. 10H, the user interface can include a list of items that are included in a general order guide that have had a change in stocking status.

Figure 10I:
FIG. 10I shows an example of a user interface presenting alerts related to incomplete coverage for particular product groups across several general order guides in accordance with some embodiments of the disclosed subject matter.

FIG. 10I shows an example of a user interface presenting alerts related to incomplete coverage for particular product groups across several general order guides in accordance with some embodiments of the disclosed subject matter. As shown in FIG. 10I, the user interface can include a list of product groups that are associated with a general order guide that are not covered across all of the facilities and/or distribution centers associated with the general order guide.

FIG. 10J shows an example of a report (presented as a spreadsheet in this example) that can be generated to show details of several general order guides and coverage for product groups within those general order guides across various distribution centers in accordance with some embodiments of the disclosed subject matter. As shown in FIG. 10J, the user interface can include a user interface element that causes data to be downloaded to a user's device and/or presented by a user's device (and/or to another service associated with the user) that can be used to generate a chart detailing which items are included in each product group and each general order guide, in which portions of the distribution network each product is available (e.g., by including a character, such as S, D, or R, in a cell associated with both the item and the distribution center representing a particular portion of the distribution network) and the stocking status of that item in each of the portions (e.g., by including a specific character corresponding to the stocking status), which item was selected for inclusion in a facility order guide (e.g., by including a character indicative of selection, such as the "*" character in FIG. 10J), and whether an item is proprietary (e.g., by including a character indicative of the item being proprietary, such as a lowercase p in FIG. 10J, which can indicate that the item can only be ordered by one or more particular organizations selected by the distributor). One example of a proprietary item is a branded item that includes a particular organization's name and/or logo. Another example of a proprietary item is an exclusive item that is available to select organizations (e.g., organizations that have a particular contractual relationship with the supplier of the item).

FIG. 10K shows an example of a user interface presenting alternatives to a particular product in accordance with some embodiments of the disclosed subject matter. As shown in FIG. 10K, alternative items can be presented in a user interface that provides additional information about items that may not be generally available in other portions of the user interface. For example, as shown in FIG. 10K, the user interface can include fields that indicate whether a particular product is suitable for generating the same outcomes as an original item (e.g., in this case whether the alternative is suitable for use as a disinfectant for particular pathogens). As another example, the user interface can include rating information, information about how the product is to be used (e.g., in FIG. 10K the "delivery" method). In some embodiments, a user interface that presents a comparison of various properties of an item, such as the user interface shown in FIG. 10K, can be presented in response to any suitable action. For example, selection of a "compare" user interface element while searching for items can cause such a user interface to be presented for various products that the user has manually selected. As another example, such a user interface can be presented in response to any action that triggers presentation of alternatives.

Figure 11A:
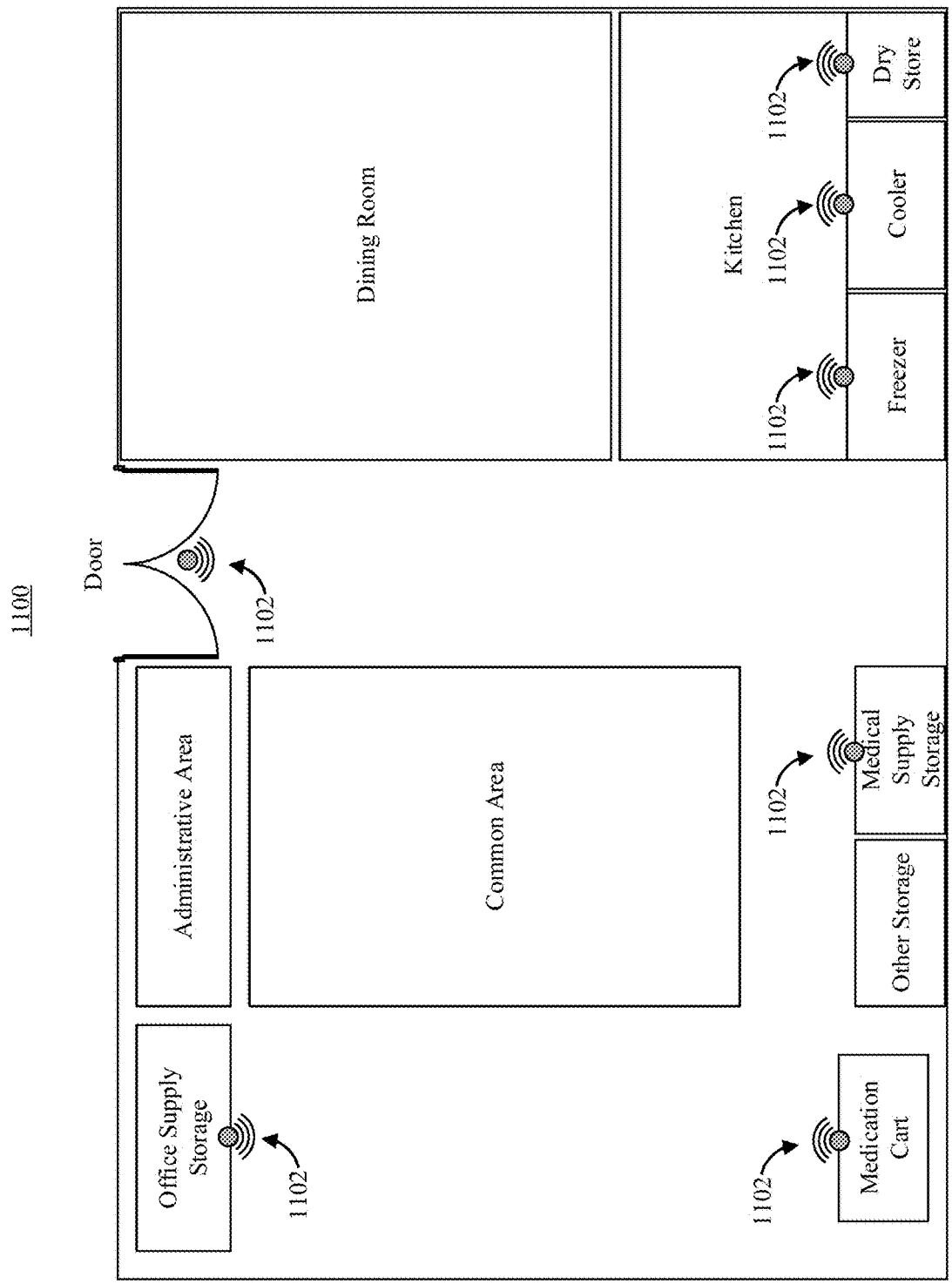
FIG. 11A shows an example of a portion of an inventory management system in accordance with some embodiments of the disclosed subject matter.

FIG. 11A shows an example 1100 of a portion of an inventory management system in accordance with some embodiments of the disclosed subject matter. As shown in FIG. 11A, a facility can include various storage areas, and each storage area can be associated with at least one transmitting device 1102. In some embodiments, each transmitting device 1102 can be configured to transmit identifying information associated with the transmitting device using any suitable technique or combination of techniques. For example, one or more transmitting devices 1102 can be configured to emit radio frequency (e.g., in the ultrahigh frequency band from 300 megahertz to 3 gigahertz) signals with a relatively short range (e.g., by transmitting at low power) that are encoded with identifying information. In a more particular example, one or more transmitting devices 1102 can be configured to operate as Bluetooth beacons that transmit a universally unique identifier (UUID). As another example, one or more transmitting devices 1102 can be configured to emit other types of signals, such as sound (e.g., ultrasound) or light (e.g., infrared light) that is encoded with identifying information.

In some embodiments, each transmitting device 1102 can be associated with a static location (e.g., a storage location, a room, an operating room, a nurse's station, a particular portion of a hallway, a door, and the like) within the facility. In such embodiments, the location of each transmitting device 1102 can be associated with identifying information of the transmitting device. For example, an inventory management system and/or inventory management service (e.g., inventory management service 404) can be used to create and/or maintain a data structure that includes identifying information of each transmitting device and associated location information. In a more particular example, the location information can be maintained in a database. Additionally or alternatively, in some embodiments, one or more transmitting devices 1102 can be associated with a mobile location (e.g., a medical cart, a medication cart, a medical device, an item of furniture, and the like) associated with the facility. In such embodiments, identifying information of the mobile location associated with a particular transmitting device 1102 can be associated with identifying information of the transmitting device. In some embodiments, as a mobile storage location (e.g., a medication cart) is moved from place to place, the location of the mobile storage location can be periodically (e.g., at regular and/or irregular intervals) determined and updated with the inventory management service. For example, one or more receiving devices (not shown) can be used to determine a location of a transmitting device 1102 associated with the mobile storage location.

In some embodiments, a computing device (e.g., a mobile computing device) can detect a signal transmitted by a particular transmitting device 1102, and can decode the signal to determine the identifying information of the particular transmitting device. Additionally, in some embodiments, the computing device can infer the distance from the strength of the detected signal.

In some embodiments, as described below in connection with FIG. 12, an inventory management system can associate particular items in a facility's inventory with particular locations associated with a beacon, such that when an item is desired a user can request the location. Additionally, when storing inventory, an inventory management system can receive an indication that a particular item is being stored, and can associate the item with a particular storage location based on identifying information associated with a transmitting device 1102.

Figure 11B:
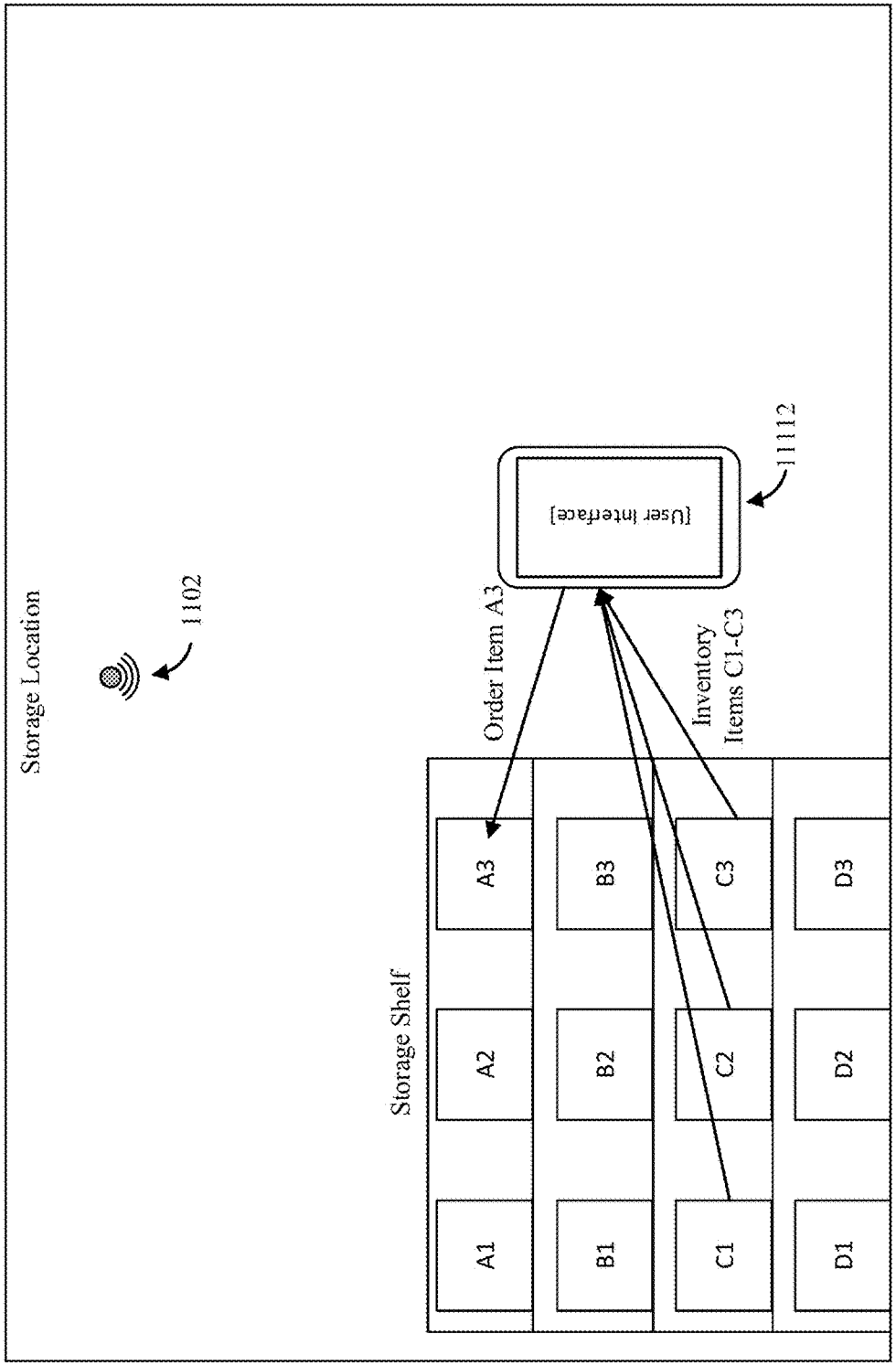
FIG. 11B shows an example of a different portion of the inventory management system in accordance with some embodiments of the disclosed subject matter.

FIG. 11B shows an example 1150 of a different portion of the inventory management system in accordance with some embodiments of the disclosed subject matter. As shown in FIG. 11B, items can be stored in a location associated with a particular transmitting device 1102. In some embodiments, a user device 1152 can be used during storage of one or more items to add the items to an inventory associated with the location of the transmitting device. In some embodiments, user device 1152 can be associated with an employee of an organization that maintains the facility in which the storage location is located. Additionally or alternatively, in some embodiments, user device 1152 can be associated with an employee of a distributor.

In some embodiments, any suitable technique or combination of techniques can be used to indicate that a particular item is being stored in the current location. For example, a user can be presented with a list of items (e.g., in a shipment, currently in inventory, and the like), and can provide input indicating which items are being stored at the current location.

As another example, a user can be prompted to capture information associated with a particular item. In such an example, the information can be identifying information of the item that specifically identifies the particular item, identifies what the item is, identifies a lot number associated with the item, identifies an expiration (or other use-by) date associated with the item, identifies one or more provenance dates, and/or any other relevant metadata associated with the item. In such an example, the user can be prompted to capture an image of a bar code associated with the item, which can be used to extract a UPC associated with the item. Additionally or alternatively, other techniques can be used to convey information, such as a QR code, a passive RFID device, a passive near field communication (NFC) device, and the like, which can be used to convey information about the item, such as a SKU, a UPC, a description of the item, a unique string of characters associated with that particular item, and the like.

In some embodiments, a user can convey inventory information related to a particular item utilizing a voice recognition system. For example, a user can be prompted to provide a description of an item into a microphone coupled to the user device (e.g., a mobile computing device or other suitable computing device). As another example, a user can be prompted to provide a quantity desired to replenish the stock of that item. In such embodiments, the inventory management service can generate an order for the desired quantity of the item and/or can add the desired quantity of the item to an order to be placed with a distributor.

Additionally, in some embodiments, user device 1152 can present a user interface that facilitate adding items that are in the storage location to an order. For example, in some embodiments, a user can provide input indicating that the user would like to reorder an item, and the user can be prompted to capture an image (or bring user device 1152 into scanning range for techniques such as NFC and RFID) of the item and/or a code associated with the item. Upon capturing such information, user device 1152 can transmit identifying information extracted from the image or signal (and/or can transmit the image or signal itself) to an order management system to be added to an order.

Figure 11C:
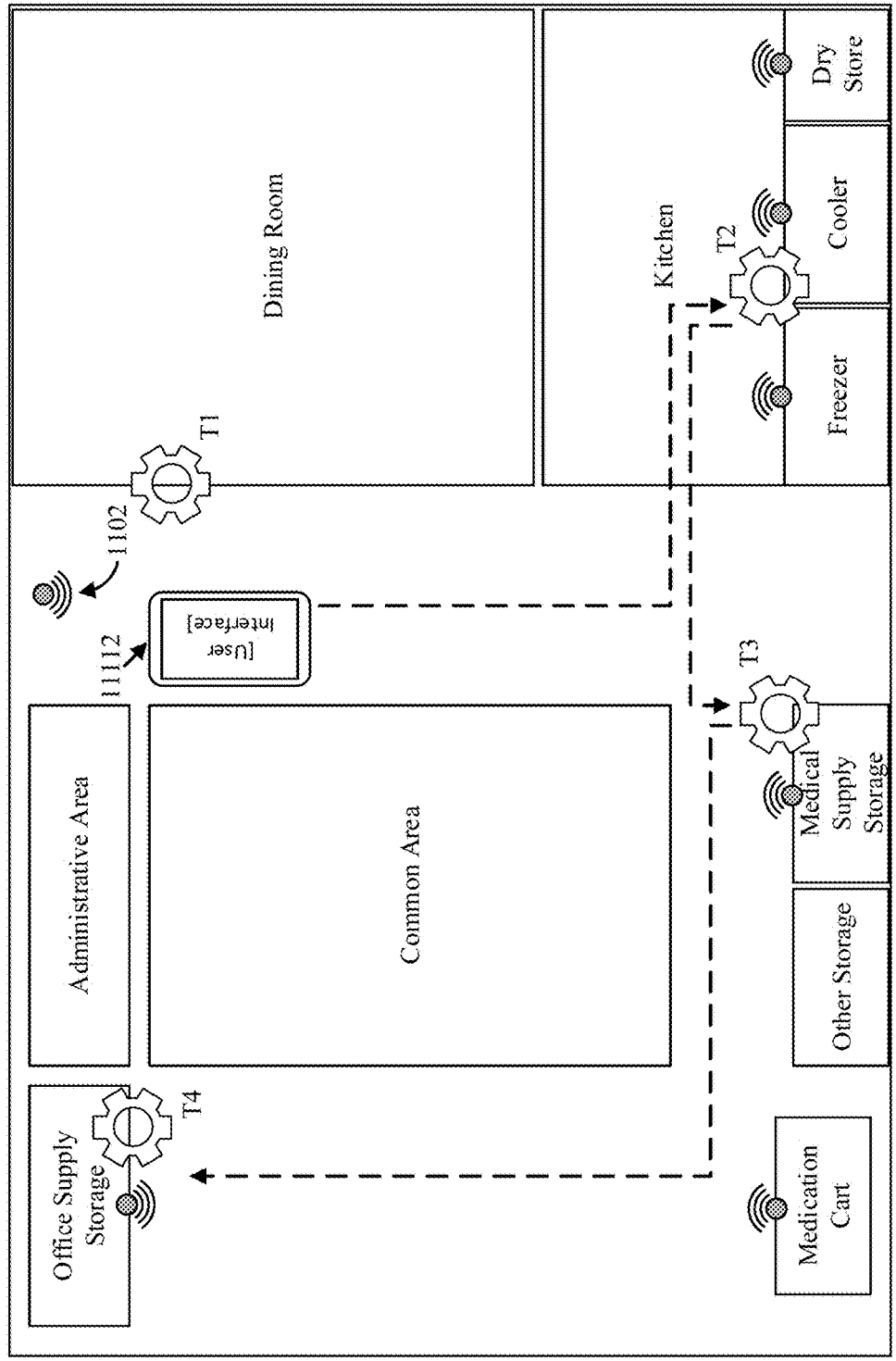
FIG. 11C shows an example of a portion of a task management system that can be used in connection with an inventory management service in accordance with some embodiments of the disclosed subject matter.

FIG. 11C shows an example 1170 of a portion of a task management system that can be used in connection with an inventory management service in accordance with some embodiments of the disclosed subject matter. In some embodiments, location information of transmitting devices 1102, the storage location of items recorded by an inventory management, and/or information about a facility's layout can be used to provide a user with a location-based workflow and/or to verify that a user has performed tasks in particular locations. For example, as shown in FIG. 11C, tasks (shown as gear icons in FIG. 11C) can be associated with various items and/or locations (e.g., tasks T1, T2, T3, and T4). Such tasks can be placed in a workflow, which can be an ordered workflow (if at least two of the tasks must be performed in a particular order) or a non-ordered workflow. In some embodiments, user device 1152 can be used to provide a user interface that can present a list (or map, graph, or any other type of user interface) or tasks to be performed, and can guide a user along paths through the facility to the location associated with the task. In some embodiments, a task management system can create an order for the workflow based on the location associated with each task to (and/or based on the current location). In such embodiments, the task management system can take into account an order in which the tasks must be performed. For example, if no order is required, the task management system can create a workflow based on location, such that the user can efficiently move between tasks. As another example, if an order is required, the task management system can prompt the user to perform the tasks in the specified order, while also attempting to create an order that does not unnecessarily add travel. Note that tasks can also have timing requirements which the task management system can take into account when creating a workflow.

As another example, the task management system can be used assist personnel in performing an inventory in a variety of storage locations within a facility. For example, the task management system can provide a user interface that presents how much of each item is expected to be in inventory at each location, and can receive information about which items are actually in inventory at each location. The task management system can then be used to rectify one or more discrepancies, to locate items that are in inventory but are not in the expected/correct location, to determine whether any surplus or deficit of inventory exists, and/or any other tasks associated with tracking inventory.

Figure 12:
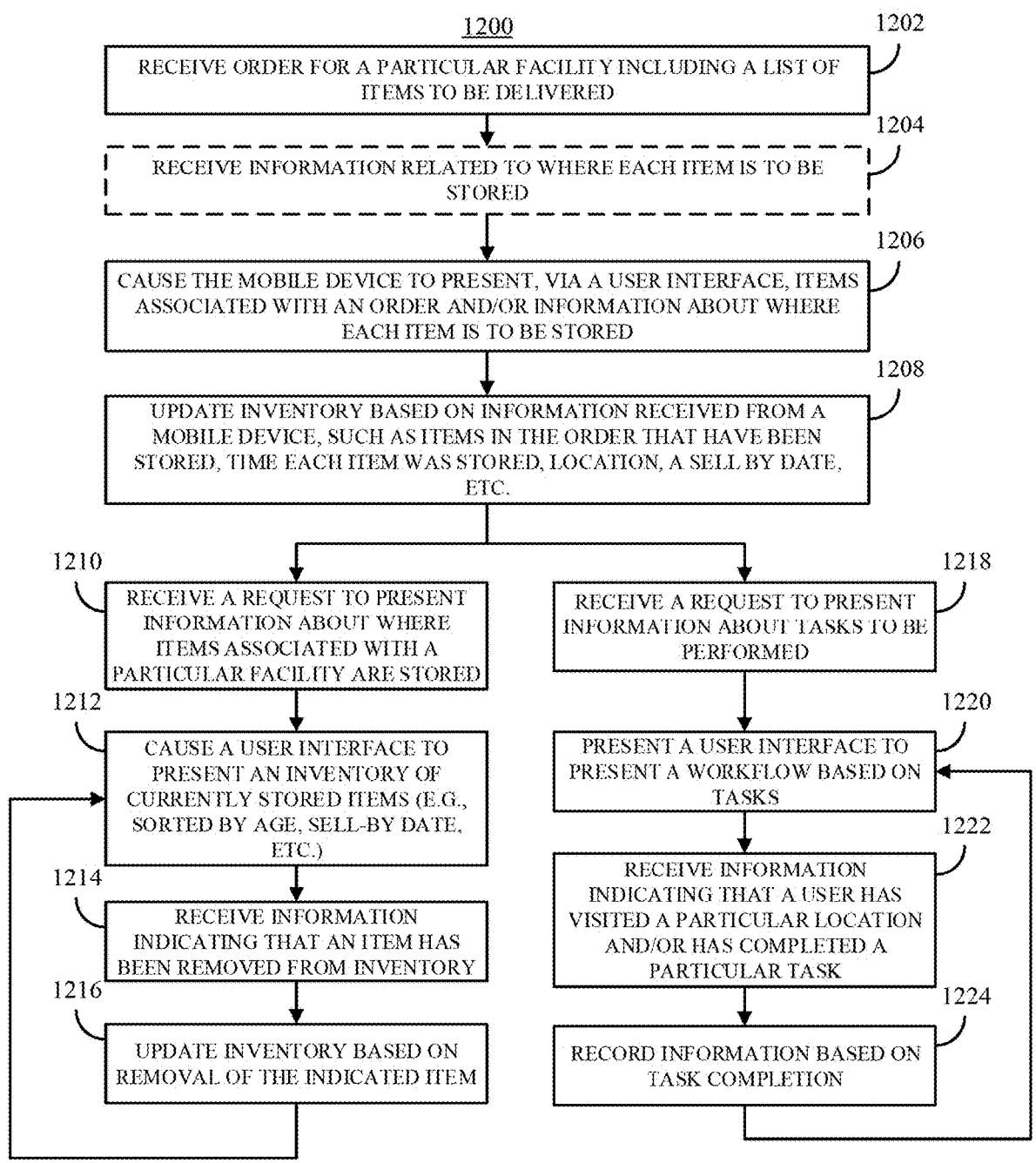
FIG. 12 shows an example of a process for managing inventory in accordance with some embodiments of the disclosed subject matter.

FIG. 12 shows an example 1200 of a process for managing inventory in accordance with some embodiments of the disclosed subject matter. As shown in FIG. 12, at 1202, process 1200 can receive an order for a particular facility including a list of items to be delivered, and quantities associated with each item. For example, at least a portion of process 1200 can be executed by an order management service. As another example, process 1200 can receive ordering information from an order management system.

At 1204, process 1200 can receive information related to where each item and/or portion of an item (e.g., when the item that is ordered includes multiple containers and/or pieces, such as boxes of gloves in a case of gloves that includes a certain number of boxes) is to be stored in the facility. For example, during order creation each item can be associated with a storage location, such as dry storage, freezer, cooler, medication cart, sterile storage, and the like. In some embodiments, when ordering or inventorying certain consumable items (e.g., those that require replenishment periodically at regular and/or irregular intervals) a purchaser can be required to specify a location where the item is to be stored until used (e.g., a particular supply closet, a walk-in freezer, a particular dry storage area, or the like). Associating the item with a physical location can facilitate accurate tracking of inventory for each storage location. Additionally, this can facilitate implementation of shelf-to-sheet inventory tracking by associating a "shelf" location (e.g., a particular storage area, a particular portion of a storage area, or the like) with each item. In some embodiments, location information received at 1204 can be recorded in a database (or other suitable data structure) associated with process 1200. Additionally or alternatively, in some embodiments, location information received at 1204 can be conveyed to a distributor with an order that is placed with that distributor.

At 1206, process 1200 can cause a mobile device (e.g., user device 1152) to present items that are to be stored and a user interface that can be used to indicate which items are being stored and/or at which location the item is being stored. In some embodiments, the mobile device can retrieve information about the items that are to be delivered from a database associated with process 1200. For example, an order number or other suitable identifying information associated with the order can be provided to process 1200 (e.g., via a manual input device such as a keyboard and/or touchscreen, via selection of a user interface element corresponding to the order from a list of pending and/or recent orders, via an image captured by a camera of the mobile device, via a voice command, and/or using any other suitable technique or combination of techniques).

In some embodiments, process 1200 can cause the information about a particular order to be presented at 606 in response to any suitable action or request. For example, in some embodiments, the mobile device can receive input selecting a particular order, and the mobile device can request information related to that order (e.g. process 1200 can receive a request from the mobile device to present items in a particular order).

At 1208, process 1200 can update inventory information based on information received from a mobile device. For example, process 1200 can store information such as the time an item was stored, a location at which it was stored, a serial number associated with the item, an expiration (or other use-by) date associated with the item, a date of manufacture, a lot number (or lot numbers) associated with the item, and the like.

At 1210, process 1200 can receive a request to present information about where items associated with a particular facility are stored. For example, an employee of the organization associated with the facility can access the inventory management service via a computing device (e.g., a mobile computing device or a desktop computing device). As another example, an employee of a vendor (e.g., a merchandiser) that services the facility can access the inventory management service via a computing device (e.g., a mobile computing device or a desktop computing device). In some embodiments, such a request can be initiated by an application that is used to guide an employee through a workflow that is, in part, based on retrieving items that are stored at various locations throughout a facility. For example, a new employee (e.g., especially in high turnover environments) may find it difficult to find all of the items required to perform a particular task, and the employee can be provided with a mobile device that can execute an application to provide directions to the employee based on the location of various items as recorded by the inventory management service. As another example, if an employee's job requires interacting with a large number of items that are stored throughout a building or set of buildings, it can be difficult for the employee to consistently locate all of the items. This can be exacerbated if the items are not consistently stored in the same locations. In such an example, the employee can be provided with access to the inventory management service (e.g., via a mobile device executing an application) to assist the employee in locating the items required to perform the employee's job. As yet another example, a task being performed by a user may require maintaining a record of a chain of custody of one or more items (e.g., drugs, surgical tools, a container in which a tissue sample has been collected), the user can be provided with a mobile device that can be used to find the items in inventory, record where the item is transferred to (e.g., a surgical tray, a medication cart, a medical cart), record when and/or how the item is used, and if appropriate, record how the item has been disposed of, or where the used item has been stored (e.g., for sterilization, for analysis by a laboratory).

Additionally or alternatively, in some embodiments, such a request can be initiated by an application that is used by a vendor to guide employees of the vendor through a workflow that is, in part, based on restocking items that are stored at various locations throughout a facility. For example, an employee of a vendor may find it difficult to find all of the storage areas that are to be restocked and/or to track which items can be used to restock each storage area, and the vendor employee can be provided with a mobile device that can execute an application to provide directions to storage areas based on the location of various items that are restocked by the vendor as recorded by the inventory management service.

At 1212, process 1200 can cause a user interface to be presented using the mobile device. In some embodiments, such a user interface can include inventory information about currently stored items which can be presented in any suitable fashion. For example, the items can be sorted by one or more of: age; expiration (or other use-by) date; lot number; provenance (e.g., for pharmacy/drug items); serial number; whether the item is in sterile inventory (e.g., for surgical tools, medical implants, and the like); name; and/or using any other suitable information. Additionally or alternatively, in some embodiments, such a user interface can include information about where items are normally stored (even if there are no such items currently stored).

At 1214, process 1200 can receive information indicating that an item has been removed from inventory. For example, a user can be prompted to capture an image of an item when retrieving the item (e.g., an image of a bar code, an image of the entire item), and process 1200 can use the image (or information extracted from the image) to determine which item is being removed from inventory. As another example, a user can be prompted to provide input indicating which item(s) is being removed, and a quantity of item(s) being removed. A particular example of a user interface that can be used to provide user input indicating which item(s) is being removed is described below in connection with FIG. 18D.

At 1216, process 1200 can update the inventory associated with the facility (and/or a particular storage area) based on the removal of the indicated item(s). In some embodiments, process 1200 can determine that a supply of a particular type of item is below a threshold level based on the updated inventory, and can prompt a user to add such an item to an order and/or can automatically add such an item to an order.

At 1218, process 1200 can receive a request to present information about tasks to be performed. In some embodiments, the tasks to be performed can be associated with a particular user (e.g., by an administrative user), and the request can be received from a device and/or application associated with the particular user. Additionally or alternatively, the tasks can be associated with a particular group and/or a particular activity. For example, the tasks can be associated with the maintenance staff, or with maintaining a particular system(s). In some embodiments, a list of tasks can be presented, which can, in some cases, include subtasks.

In some embodiments, the tasks to be performed can include any suitable tasks, which can include retrieving items that are stored in inventory, storing one or more items into inventory, and/or visiting one or more locations. For example, the tasks to be performed can be tasks associated with preparing a meal, which can include gathering a list of ingredients, and the location at which the ingredients are stored, gathering materials and/or tools used to prepare the meal (e.g., an appropriate pot, a cutting board, a knife, spices, etc.), and/or instructions to assist a user in preparing the meal. As another example, the tasks to be performed can be tasks associated with performing maintenance on one or more items, which can include identifying information and/or location information of the items on which maintenance is to be performed, a list of items required to perform the maintenance (e.g., tools, replacement parts, and the like), and/or instructions to assist a user in performing the maintenance. As yet another example, the tasks to be performed can be tasks associated with gathering items to be used in performing a medical procedure, which can include identifying information and/or location information of the items required to perform the medical procedure (e.g., tools, replacement parts, and the like), and/or instructions to assist a user in properly handling the items.

At 1220, process 1200 can cause a user interface to be presented that presents at least a portion of a workflow based on the tasks to be performed. In some embodiments, the workflow can include a list of tasks to be performed, with an indication of whether any of the tasks must be performed in a particular order and/or within a particular period of time. Additionally or alternatively, in some embodiments, the workflow can be presented graphically in connection with a depiction of locations within a facility at which the tasks are to be performed. For example, tasks can be presented as icons associated with particular locations, and a suggested path between locations can be presented in the user interface. Additionally, in some embodiments, one or more user interface elements can be provided that allow the user to indicate that a task has been completed, to provide information about the task and/or about the location or system associated with the task. For example, the user can provide notes about how the task was performed, or about anything unusual that occurred while performing the task. As another example, the user can capture an image of the location before and/or after the task was performed, which can be used to verify that the task was completed.

At 1222, process 1200 can receive information indicating that a user has visited a particular location and/or that the user has completed a particular task. For example, a mobile device can provide location information indicating whether the device has entered an area at which a task was to be performed. This can be used to verify, for example, that security personnel have visited a particular door and/or secure location. As another example, a user can provide input (e.g., by selecting a user interface element associated with a task) to indicate that a particular task has been completed. As yet another example, a user can provide input indicating that certain items have been retrieved, or that an item to be retrieved was missing.

At 1224, process 1200 can record information based on the task being completed and/or the particular location being visited. For example, if a particular task is to be performed periodically, process 1200 can record when the task has been completed and use the recorded information to track when the task is to be performed again. As another example, if a workflow requires visiting certain locations, process 1200 can determine which locations have and have not been visited. After recording such information, process 1200 can return to 1220 to present an updated user interface reflecting completion of the task and/or presenting a new task to be completed.

In some embodiments, a user can add items to an order at any time using a mobile device. For example, if a user is storing items (e.g., as described below in connection with FIG. 13), the user may notice that a particular item appears to be running low, and can add a particular quantity of that item to an order. As another example, if a user is retrieving items (e.g., in connection with 1210 to 1216), the user may notice that a particular item appears to be running low, whether the item is one that is being retrieved or not. In such an example, the user can add a particular quantity of that item to an order. As still another example, while a user is completing one or more tasks (e.g., in connection with 1218 to 1224), the user may notice that a particular item appears to be running low, whether the item is associated with the task or not. In such an example, the user can add a particular quantity of that item to an order.

In some embodiments, a user can initiate an ordering action by selecting a particular user interface element, providing a particular verbal command, and/or capturing an image associated with an item that is not currently being stored and/or specifically retrieved.

Figure 13:
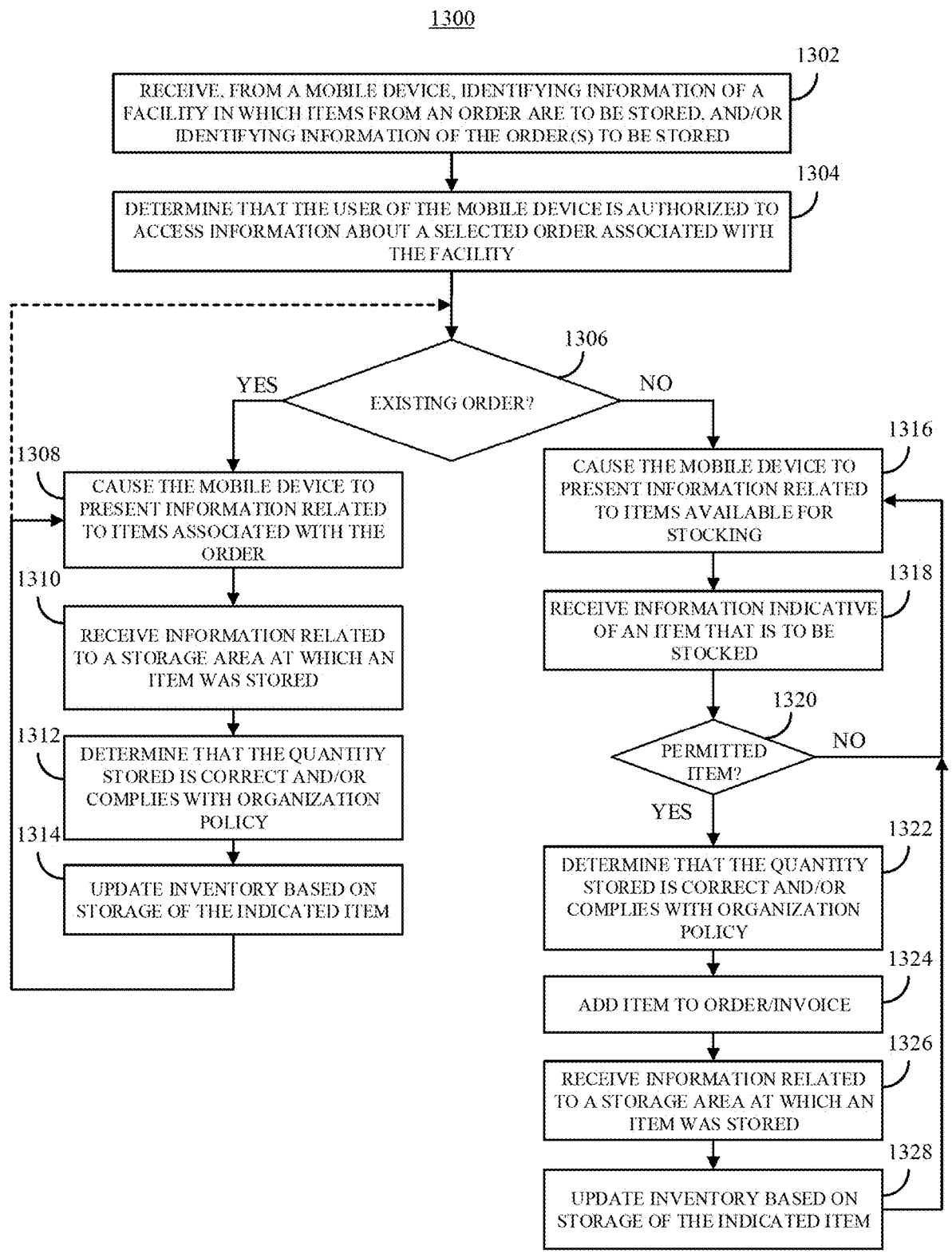
FIG. 13 shows an example of a process for updating an inventory as items are stored in accordance with some embodiments of the disclosed subject matter.

FIG. 13 shows an example of a process 1300 for updating an inventory as items are stored in accordance with some embodiments of the disclosed subject matter. At 1302, process 1300 can receive, from a mobile device, identifying information of a facility in which items from an order are to be stored and/or identifying information of the order to be stored. In some embodiments, the identifying information can include any suitable information. For example, identifying information of an order can include an invoice number, a confirmation number, or the like, associated with the order. In such an example, the identifying information can be conveyed as a string of characters (e.g., as entered by a user, as extracted from a visual code, as extracted from a signal, and the like). As another example, identifying information of a facility can include a semantically meaningful name associated with the facility, a location of the facility (e.g., based on geographic coordinates associated with the facility), a string of characters associated with the facility (e.g., an identification number or identification code), and/or any other suitable identifying information.

In some embodiments, the identifying information can be provided to the mobile device using any suitable technique or combination of techniques. For example, the mobile device can execute an inventory management application that is associated with the facility (e.g., an employee of the organization that operates the facility can be logged in to the application), and the inventory management application can allow a user to provide input indicating a facility and/or order for which items are to be stored. In such an example, a list of options can be presented (e.g., a list of facilities, a list of orders) based on information in a portion of a database associated with the organization. As another example, the inventory management application can receive a current location of the mobile device (e.g., determined by the mobile device using a geolocation system of the mobile device, using multilateration techniques, or the like), and can compare the received location to locations of facilities to determine a current facility. As yet another example, the inventory management application can receive a code from the mobile device corresponding to a code emitted by a device that is physically present in or near the facility. In a more particular example, the code can be a UUID emitted by a beacon located at the facility and/or a storage area, and/or a code delivered by the beacon as a payload.

At 1304, process 1300 can determine that the user of the mobile device is authorized to access information about a selected order associated with the facility. In some embodiments, any suitable technique can be used to determine that the user is authorized to access the order information. For example, process 1300 can determine that a user that is logged in to an application being executed by the mobile device (and/or to a service being accessed by the mobile device) has been authorized by the organization associated with the facility to access the order. In such an example, the user can be an employee of the organization, and can be authorized (e.g., by an administrative user associated with the organization) to access orders associated with the facility, orders associated with a particular distributor, all order associated with the organization, a combination of the foregoing, and/or any other suitable orders.

As another example, process 1300 can determine that a user that is logged in to an application being executed by the mobile device (and/or to a service being accessed by the mobile device) has been authorized by a distributor to access orders associated with the distributor that are to be delivered to the facility and/or the organization. In such an example, the user can be an employee or contractor of the distributor. In a more particular example, process 1300 can determine that the order being accessed has been associated with the particular user. The distributor may authorize only certain users to access information about the order, which can, for example, prevent accidental access by another user.

In some embodiments, process 1300 can determine that the user is located in a vicinity of the facility associated with the order prior to determining that the user is authorized to access the order. For example, process 1300 can receive location information of the mobile device, and can verify that the mobile device attempting to access the order is within a predetermined range of the facility and/or a portion of the facility. As another example, process 1300 can receive information associated with the facility that is accessible in the vicinity of the facility and/or a portion of the facility. In a more particular example, the information can be a UUID of a particular beacon located near a particular portion of the facility (e.g., a front entrance of the facility, a loading dock of the facility, a secure closet within the facility, a mobile cart associated with the facility, or the like). In another more particular example, the information can be a code made available by one or more devices (e.g., a beacon, a wireless access point, a near field communication (NFC) tag, a radio frequency identification (RFID) tag, or the like) located within the facility and/or near a particular portion of the facility (e.g., a front entrance of the facility, a loading dock of the facility, or the like). In some embodiments, by inhibiting access to orders when a user is not within a vicinity of the facility, the user can be prevented from fraudulently indicating that items have been delivered to the facility.

In some embodiments, if process 1300 determines that the user is not authorized, process 1300 can return to 1304, or process 1300 can terminate.

At 1306, process 1300 can determine whether the user is attempting to access an existing order. For example, the user may be associated with a vendor that is responsible for restocking supplies in one or more storage areas of the facility, and the vendor may generate an order as needed, rather than storing items from an existing order. Such a vendor is sometimes referred to herein as a merchandiser. If process 1300 determines that the user is attempting to access an existing order ("YES" at 1306), process 1300 can move to 1308.

At 1308, process 1300 can cause the mobile device to present information related to the items associated with the order. In some embodiments, the information related to the items associated with the order can include any suitable information, such as identifying information associated with each item, a quantity of each item ordered, a storage area or areas at which the item(s) is to be stored, any suitable combination of such information, and/or any other suitable information.

At 1310, process 1300 can receive, from the mobile device, an indication of where one or more of the ordered items are being stored. For example, such an indication can be a transmission indicating that a particular item is being stored, and information that can be used to determine the location, such as a UUID (or UUIDs) of a transmitting device (or devices) associated with a particular location. In some embodiments, a user associated with the organization can operate the mobile device that transmits the indication of where one or more of the ordered items are being stored. For example, the user can be an employee of the organization that is responsible for managing inventory of one or more types of product (e.g., food, cleaning supplies, medical supplies, medication). In some embodiments, a user associated with the distributor can operate the mobile device that transmits the indication of where one or more of the ordered items are being stored. For example, the user can be an employee of the distributor or a contractor paid by the distributor that delivered the ordered items to the facility, and that is also responsible for stocking the items in one or more areas designated by the organization. In such an example, location information can be accessed from a database associated with process 1300 and/or a database associated with the distributor. In a more particular example, the mobile device used by the user associated with the distributor can retrieve location information via an application associated with the distributor, and the distributor can retrieve location information from the database associated with process 1300 and/or can maintain location information in a database associated with the distributor.

At 1312, process 1300 can determine that the quantity stored is correct and/or complies with one or more policies associated with the organization. For example, process 1300 can compare the quantity of a particular item that has been stored with the quantity included on the order. In such an example, if portions of the ordered quantity are to be stored in different storage areas, process 1300 can track the quantity until the user has visited each storage area and/or has indicated that storage of the order is complete before determining that the quantity is correct. In some embodiments, a user can be required to verify each item (or container of items) as the item is stored (e.g., by scanning a tag associated with the item, such as a barcode, an NFC tag, or the like). In some embodiments, if the quantity is not correct (e.g., if the quantity stored is smaller or larger than the quantity ordered), process 1300 can determine if the quantity complies with a policy associated with the facility and/or the organization. For example, as described below in connection with FIG. 14, process 1300 determine whether the quantity stored is acceptable under the organization's business policies. In some embodiments, the policy associated with the facility and/or organization can include a maximum quantity of items that can be stocked in the facility, in a particular storage area, and/or a maximum quantity of items that can be stocked for any single order.

At 1314, process 1300 can update an inventory associated with the facility and/or one or more storage areas associated with the facility based on storage of the indicated item(s) at 1310. In some embodiments, after an item has been stored and an inventory has been updated at 1314, process 1300 can return to 1308 and/or 1306.

If process 1300 determines that the user intends on storing items that are not associated with an existing order ("NO" at 1306), process 1300 can move to 1316. In some embodiments, process 1300 can determine that the user intends on storing items that are not associated with an existing order using any suitable technique or combination of techniques. For example, process 1300 can determine that no order exists from the distributor associated with the user of the mobile device. As another example, process 1300 can determine that the user of the mobile device is associated with a vendor that is responsible for restocking items at the facility. As yet another example, process 1300 can receive an indication that a user interface element associated with generating and/or updating an order has been selected.

At 1316, process 1300 can cause the mobile device to present information related to items that are available for stocking at the facility and/or at the storage area. In some embodiments, the information related to items that are available for stocking can include any suitable information. For example, the information related to items that are available for stocking items that the distributor is responsible for stocking at the facility. As another example, the information related to items that are available for stocking can include items from an order guide associated with the facility. As yet another example, the information related to items that are available for stocking can include items that have been stocked at the facility in the past and/or items that are acceptable for stocking at the facility.

At 1318, process 1300 can receive information indicative of an item that is to be stocked. For example, a user can provide input (e.g., via an input device such as a keyboard, microphone, or camera) indicating that a particular item is to be stocked.

At 1320, process 1300 can determine if the item to be stocked is a permitted item. In some embodiments, process 1300 can use any suitable technique or combination of techniques to determine whether the item is a permitted item. For example, process 1300 can determine whether the items are on a list of approved items associated with the facility. In a more particular example, process 1300 can determine whether the items are listed on an order guide associated with the facility and/or the organization.

If process 1300 determines that the item is not a permitted item ("NO" at 1320), process 1300 can cause the mobile device to present an indication that the item is not permitted for stocking, and can return to 1316. Otherwise, if process 1300 determines that the item is a permitted item ("YES" at 1320), process 1300 can move to 1322.

At 1322, process 1300 can determine that the quantity stored is correct and/or complies with one or more policies associated with the organization. In some embodiments, process 1300 can determine that the quantity stored is correct and/or complies with one or more policies associated with the organization using any suitable technique or combination of techniques, such as one or more techniques described above in connection with 1312.

At 1324, process 1300 can add the item(s) to an order and/or invoice. In some embodiments, process 1300 can generate an order and/or invoice as items are stocked by the user.

At 1326, process 1300 can receive information related to a storage area in which the item was stored. In some embodiments, process 1300 receives information related to a storage area in which the item was stored using any suitable technique or combination of techniques, such as one or more techniques described above in connection with 1310.

At 1328, process 1300 can update an inventory associated with the facility and/or one or more storage areas associated with the facility based on storage of the indicated item(s) at 1324 and/or 1326. In some embodiments, after an item has been stored and an inventory has been updated at 1328, process 1300 can return to 1316 and/or 1308.

Figure 14:
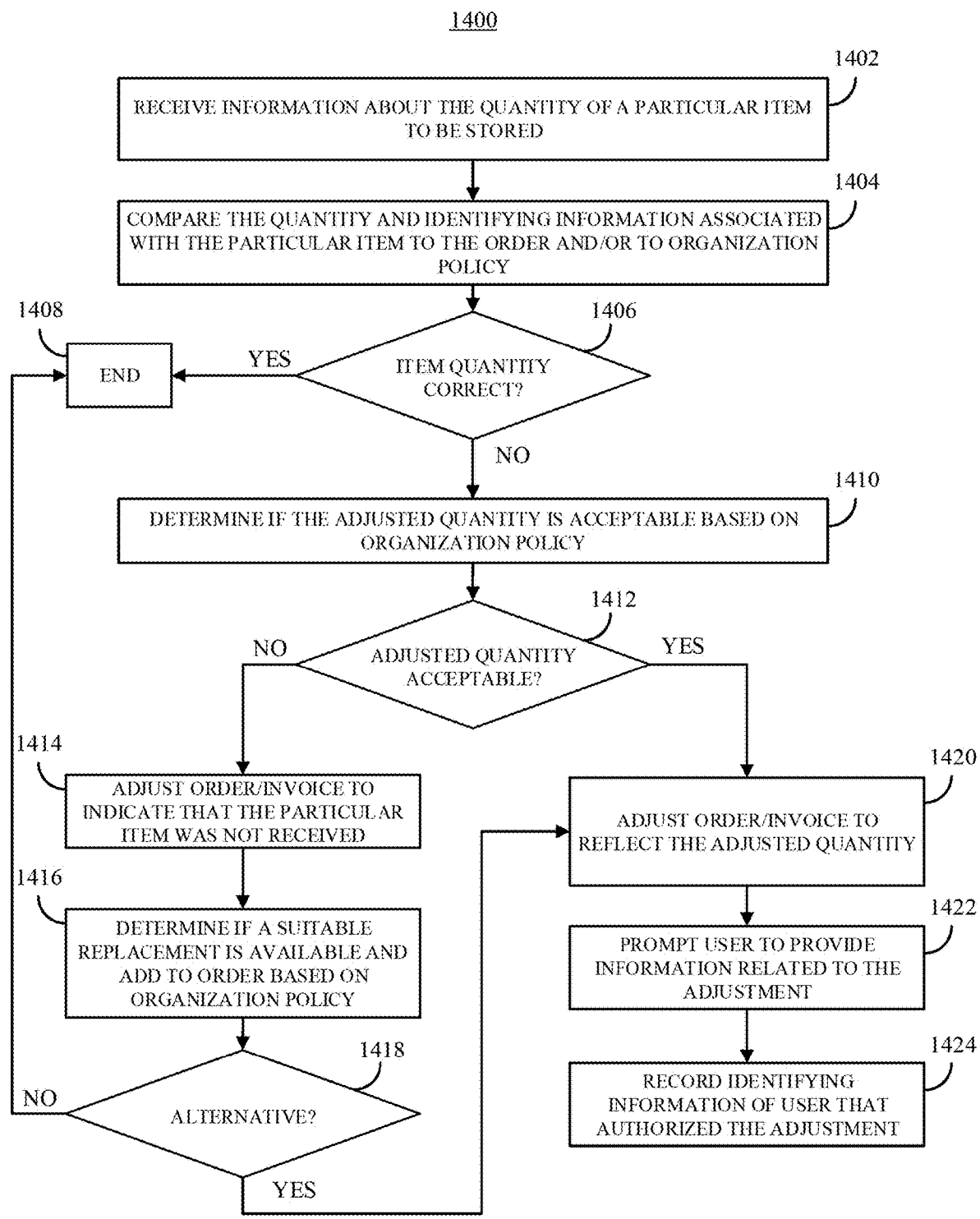
FIG. 14 shows an example of a process for addressing differences between items ordered to a facility and items delivered to the facility in accordance with some embodiments of the disclosed subject matter.

FIG. 14 shows an example of a process 1400 for addressing differences between items ordered to a facility and items delivered to the facility in accordance with some embodiments of the disclosed subject matter. As shown in FIG. 14, at 1402, process 1400 can receive information about the quantity of a particular item that is being stored in a particular storage area.

At 1404, process 1400 can compare the quantity being stored and identifying information associated with the particular item to the order and/or to organization policies. In some embodiments, process 1400 can use any suitable technique or combination of techniques to compare the product to the order and/or organizational policies. In some embodiments, process 1400 can determine whether the item being stored is the item that was ordered based on the identifying information of the item (e.g., a UPC, a SKU, a semantically meaningful name, or the like). If the identifying information of the item being stored matches the identifying information of the item that was ordered, process 1400 can directly compare the quantity being stored to the quantity that was ordered, and determine whether the quantity is within a threshold quantity of the amount ordered (e.g., where the threshold can be based on organization policies). For example, the threshold may be zero, in which case the quantity being stored would need to exactly match the quantity that was ordered. As another example, the threshold may be a percentage of the amount ordered (e.g., plus or minus 10%, plus or minus 5%, plus or minus 1%, or the like). As yet another example, the threshold may be a quantity of containers. As still another example, the threshold may be a measured amount (e.g., in pounds, in ounces, in fluid ounces, in gallons, in cubic feet, in square feet, or the like).

In some embodiments, if the identifying information of the item being stored does not match the identifying information of the item that was ordered, process 1400 can compare the quantity being stored to an equivalent of the quantity that was ordered. For example, process 1400 can convert the unit of measure of the item being stored to an equivalent to the unit of measure of the item that was ordered. As another example, process 1400 can convert the unit of measure of the item that was ordered to an equivalent to the unit of measure of the item being stored. As yet another example, process 1400 can convert the unit of measure of the item being stored and the unit of measure of the item that was ordered to a common unit of measure. In a more particular example, if the item that was ordered is sold in cases of ten boxes that each include fifty units, and the item that is being stored is sold in cases of twelve boxes that each include thirty units, process 1400 can determine an equivalent or a common unit of measure. As described above, having converted one or both of the items, process 1400 can compare the quantities and determine whether the quantity is correct within a threshold.

In some embodiments, prior to comparing the quantity of the item being stored (e.g., a potential substitute item) to the ordered item, process 1400 can determine whether the item being stored is an acceptable substitute using any suitable technique or combination of techniques. For example, process 1400 can use one or more techniques described above in connection with 1320. If the item is not a suitable substitute, process 1400 can return to 1402 or can end.

At 1406, process 1400 can determine whether the quantity being stored is correct based on the comparison at 1404. If the quantity is correct ("YES" at 1406), process 1400 can end at 1408. Otherwise, if the quantity is not correct ("NO" at 1406), process 1400 can move to 1410.

At 1410, process 1400 can determine if the quantity that is not correct (sometimes referred to herein as the adjusted quantity) is acceptable based on the organizations policies. In some embodiments, an organization can set any suitable policies that can be used to determine whether an adjusted quantity is acceptable. For example, the organization can set a maximum quantity of particular items that can be stocked in the facility, in a particular storage area, and/or a maximum quantity of items that can be stocked for any single order. Under such a policy, if the quantity being delivered does not match the quantity ordered and is greater than the maximum or would result in the total amount stocked being greater than the maximum, process 800 can determine that the adjusted quantity does not comply with the policies. As another example, the organization can set a minimum quantity of particular items that are acceptable. In such an example, the organization may have a minimum amount that corresponds to the expected needs of the facility over a predetermined period of time, and if the quantity being stored would not bring the total quantity stored to at least the minimum, then the quantity may not be acceptable.

If process 1400 determines that the adjusted quantity is not acceptable ("NO" at 1412), process 1400 can move to 1414. At 1414, process 1400 can cause the order and/or invoice to be adjusted to indicate that the particular item was not received and/or was not accepted for delivery.

At 1416, process 1400 can determine if a suitable replacement is available for stocking and can add the replacement to the order based on organization policy. In some embodiments, process 1400 can use any suitable technique or combination of techniques to determine if a suitable replacement is available. For example, process 1400 can determine whether the organization has identified any items as being acceptable alternatives to the item that was ordered. In a more particular example, an acceptable alternative item can be an item that is included in a product group with the item that was ordered. In another more particular example, an acceptable alternative item can be an item that other organizations have identified as being an acceptable alternative (e.g., other similarly situated organizations). In yet another more particular example, an acceptable alternative item can be an item that has similar characteristics, and that has a price per unit that is within a threshold price of the ordered item. The characteristics can vary based on the type of item and the requirements of the organization. For example, an organization that operates healthcare facilities may require that any alternative food item have minimum nutritional requirements to be classified as an acceptable alternative.

As another example, process 1400 can determine whether an acceptable alternative is currently available for stocking. In such an example, process 1400 can evaluate the items that are available for stocking based on items that have been loaded onto a delivery vehicle that is currently located at the facility (e.g., a delivery truck that was used to deliver the current delivery), that can be routed to the facility, and/or that can be loaded onto a delivery vehicle and delivered by a certain time (e.g., prior to the facility closing). In some embodiments, process 1400 can determine whether an item that is intended for delivery to a different facility can be used as a replacement based on the policy or policies of the organization associated with the different facility. For example, if the facility for which items are meant for would accept a lower quantity of items today and/or would accept delayed delivery, process 1400 can indicate that the item can be used as a replacement item. Note that the replacement item may be identical to the ordered item. For example, if there are additional units of the ordered item on the delivery vehicle that are meant for delivery to another facility, process 1400 can determine that these items can be used as a replacement if the organization associated with the other facility would accept a delay or reduced quantity (e.g., in return for a credit).

If process 1400 determines that there is not a suitable replacement available ("NO" at 1418), process 1400 can move to 1408 and end. Otherwise, if process 1400 determines that there is a suitable replacement available ("YES" at 1418), or if process 1400 determines that the adjusted quantity is acceptable ("YES" at 1412), process 1400 can move to 1420.

At 1420, process 1400 can adjust the order and/or invoice to reflect the adjusted quantity and/or the replacement of the ordered item with a substitute item.

At 1422, process 1400 can prompt a user to provide information related to the adjustment in quantity and/or in item. In some embodiments, the information can be any suitable information that can be used to later determine whether there was a difference between what was ordered and what was delivered. For example, the user can be prompted to enter a reason why the quantity differed, such as the delivery not including the ordered amount of the product, the amount ordered being greater than a maximum that can be stored when combined with the amount that is currently stocked (e.g., prior to delivery of additional items), a portion of the items delivered being unacceptable because of damage, spoilage, or the like, and/or any other suitable reason.

At 1424, process 1400 can record identifying information of the user that authorized the adjustment and/or recorded the reason for the adjustment.

Figure 15:
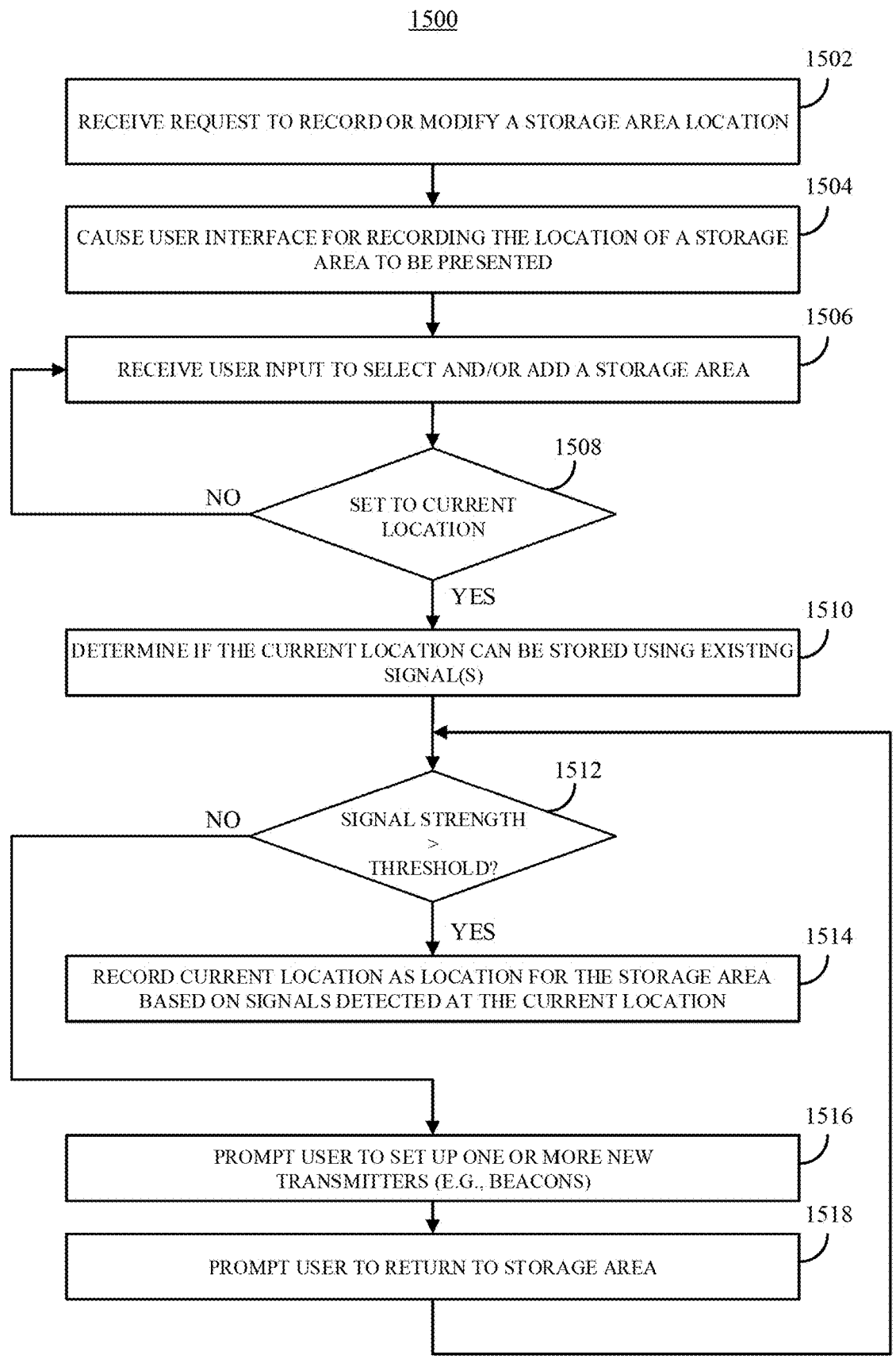
FIG. 15 shows an example of a process for recording a location of an area within a facility in accordance with some embodiments of the disclosed subject matter.

FIG. 15 shows an example of a process 1500 for recording a location of an area within a facility in accordance with some embodiments of the disclosed subject matter. As shown in FIG. 15, at 1502, process 1500 can receive a request to record and/or modify information associated with a storage area location. For example, a user can provide input to an inventory management application indicating that a new storage area is to be added to a facility. As another example, a user can provide input to an inventory management application indicating that an existing storage area is to be edited. In such examples, a device executing the inventory management application (and/or being used to access the inventory management application) can send a request to record and/or modify a storage area location.

At 1504, process 1500 can cause a user interface for recording the location of a storage area to be presented. For example, process 1500 can cause a user interface to be presented that includes instructions and/or user interface elements that can guide a user through a process of recording and/or modifying a location of a storage area.

At 1506, process 1500 can receive an indication that a user has selected an existing storage area and/or has selected a user interface element for adding a new storage area.

At 1508, process 1500 can determine whether a user element that initiates recording of a current location as the location of the selected and/or new storage area has been selected. If process 1500 determines that the user interface element that initiates recording of the current location has not been selected ("NO" at 1508), process 1500 can return to 1506 (e.g., to allow a user to select a different user interface, cancel process 1500, move to a position to be recorded as the location of the storage area, or any other suitable action). In some embodiments, process 1500 can determine whether the location has previously been associated with a storage area, and if so, can take an appropriate action. For example, process 1500 can inhibit multiple storage areas from being assigned to the same location. As another example, process 1500 can prompt a user to confirm whether the current location is associated with multiple storage areas (e.g., multiple closely located closets). As another example, process 1500 can prompt a user to move closer to the storage area to more precisely locate the storage area to be added (e.g., as the current location may be too close to a previously added storage location), or give the user the option of deleting a storage location that is currently associated with the location.

Otherwise, if process 1500 determines that the user interface element that initiates recording of the current location has been selected ("YES" at 1508), process 1500 can move to 1510. At 1510, process 1500 can determine if the current location can be stored using existing signals. For example, process 1500 can determine whether there are a sufficient number of signals and/or whether the signal strength of each signal exceeds a minimum value. In a more particular example, process 1500 can determine whether at least three beacon signals from different beacons are detectable at a sufficient signal strength to provide a reliable distance to each beacon. Note that this is merely an example, and process 1500 can use any suitable criterion or criteria to determine if existing signals are sufficient. In another example, process 1500 can determine that a single signal at a sufficiently large signal strength is sufficient (e.g., if the beacon is within a relatively small threshold distance, such as within 1 meter, and precision is not required by the organization). In such an example, a single beacon can be used for each storage area, and a process for identifying a storage area being accessed can determine that the storage area being accessed is the storage area corresponding to the highest signal strength.

If process 1500 determines that there are a sufficient number of signals with a signal strength greater than a threshold ("YES" at 1512), process 1500 can move to 1514, and can record the current location as the location for the storage area based on the signals that are at least the threshold signal strength. In some embodiments, the threshold signal strength can be any suitable signal strength, such as a signal strength corresponding to a particular distance from the transmitter.

In some embodiments, process 1500 can record the current location in relation to the signal transmitters for which signals are at least the threshold signal strength (or a predetermined number of the strongest signals). For example, process 1500 can record the current location as corresponding to a first distance from a first transmitter, a second distance from a second transmitter, and a third distance from a third transmitter. As another example, process 1500 can record the current location as corresponding to a first signal strength from a first transmitter, a second signal strength from a second transmitter, and a third signal strength from a third transmitter. In some embodiments, process 1500 can record the current location as a set of coordinates in a frame of reference defined by signal transmitters associated with the facility. For example, process 1500 can define a coordinate system for the facility based on various signal transmitters located in or around the facility based on the location of the transmitters and the signal strength profile(s) of the transmitters at various location in the facility.

However, if process 1500 determines that there are not a sufficient number of signals with a signal strength greater than a threshold ("NO" at 1512), process 1500 can move to 1516. At 1516, process 1500 can prompt a user to set up at least one additional transmitter to ensure that the number of transmitters with the signal strength over the threshold is satisfactory. In some embodiments, at 1516, process 1500 can provide a user interface that can be used to assist a user in placing an additional transmitter. For example, process 1500 can cause the user interface to prompt a user to move to an area that is within a certain range of the current location (e.g., zero to ten meters, two to ten meters, or any other suitable range), and in a direction away from existing transmitters (if possible). In some embodiments, process 1500 can present a signal strength for various detected transmitters, and can instruct a user to move in a direction in which one or more signal strengths decrease.

At 1518, after a user has installed a new transmitter (or moved an existing transmitter), process 1500 can prompt a user to return to the storage area for which the locations are to be recorded, and process 1500 can return to 1512.

Figure 16D:
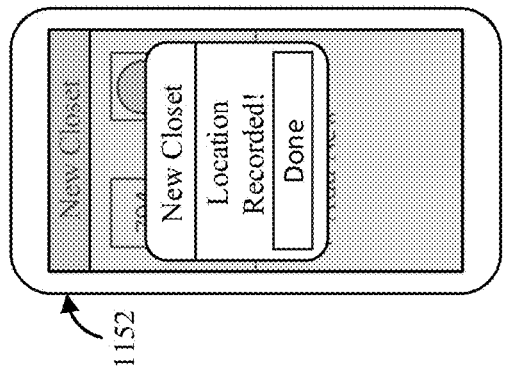
FIG. 16D shows an example of a user interface for managing a particular storage area associated with a facility using the inventory management application in accordance with some embodiments of the disclosed subject matter.
Figure 16G:
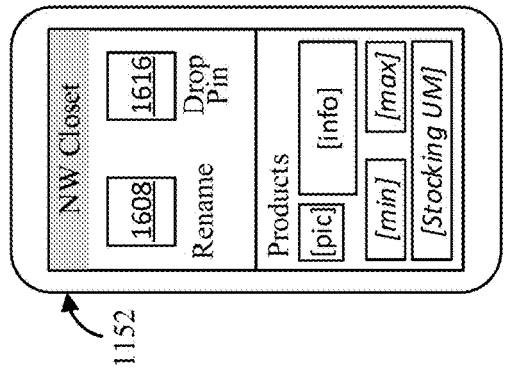
FIG. 16G shows an example of a user interface for informing a user that a location has been recorded for the new storage area in accordance with some embodiments of the disclosed subject matter.
Figure 16C:
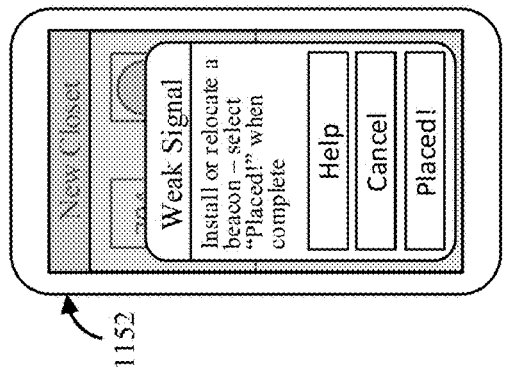
FIG. 16C shows an example of a user interface for managing storage areas associated with a facility using the inventory management application in accordance with some embodiments of the disclosed subject matter.
Figure 16F:
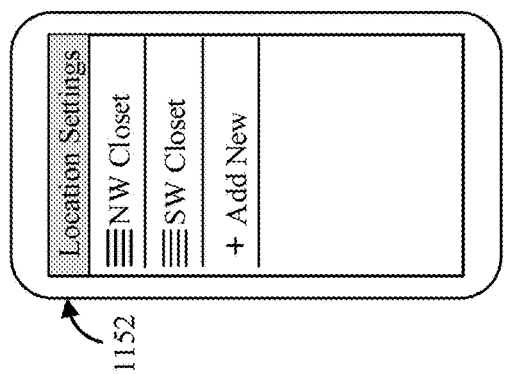
FIG. 16F shows an example of a user interface prompting a user to place one or more additional radio transmitters to facilitate accurate recording of a location associated with the new storage area in accordance with some embodiments of the disclosed subject matter.
Figure 16B:
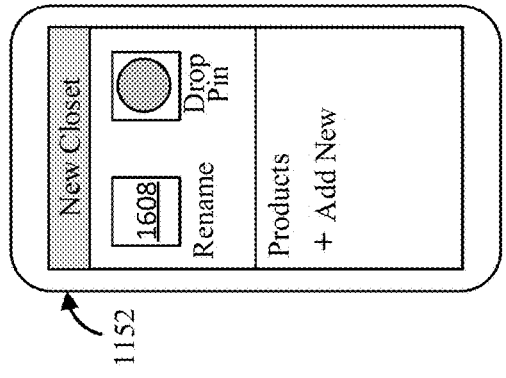
FIG. 16B shows an example of the user interface of FIG. 16A in which a user interface element is being selected in accordance with some embodiments of the disclosed subject matter.
Figure 16E:
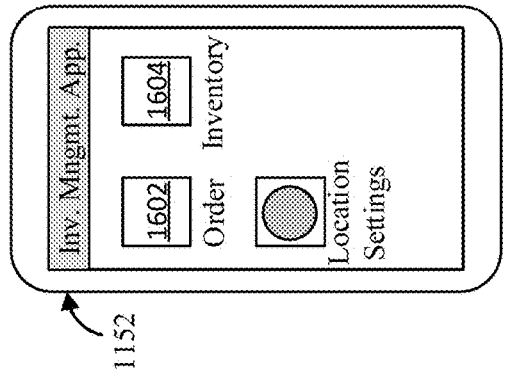
FIG. 16E shows an example of a user interface for associating a new storage area associated with a facility using the inventory management application in accordance with some embodiments of the disclosed subject matter.
Figure 16A:
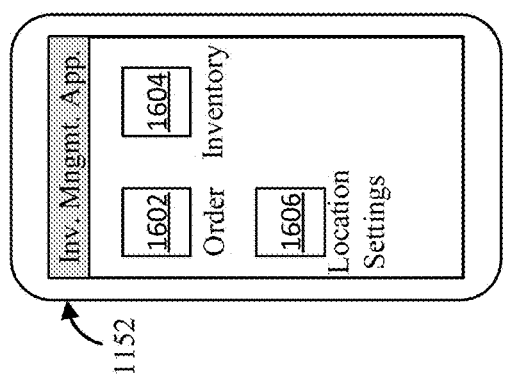
FIG. 16A shows an example of a user interface for an inventory management application in accordance with some embodiments of the disclosed subject matter.

FIG. 16A to 16G show examples of user interfaces that can be used to manage storage area locations for an inventory management application in accordance with some embodiments of the disclosed subject matter. As shown in FIG. 16A, various user interface elements can be presented by mobile device 1152 via a user interface. For example, the user interface can include a user interface element 1602 that can be selected to manage current orders and/or to generate a new order, a user interface element 1604 that can be selected to manage current inventory, and a user interface element 1606 that can be selected to manage location settings for storage areas in a current facility (or, in some embodiments, any facility to which the user has authorization). As shown in FIG. 16B, a user can select user interface element 1606 to cause a location settings user interface to be presented as shown in FIG. 16C. The location settings user interface can present existing storage areas (e.g., "NW Closet" and "SW Closet") associated with the current facility. Note that, in some embodiments, the storage areas to be presented can be determined by automatically determining the current facility (e.g., by determining that mobile device 1152 is located in the vicinity of the facility using any suitable technique or combination of techniques, such as techniques described above in connection with 1302 of FIG. 13).

In some embodiments, a user can select a user interface element corresponding to an existing storage area. For example, if the user selects the portion of the user interface corresponding to the "NW Closet" label, a user interface for managing the selected storage area can be presented as shown in FIG. 16D. In some embodiments, a user interface for managing a particular storage area (e.g., as shown in FIG. 16D) can include a user interface element 1608 that can be selected to edit the name of the storage area, and a user interface element 1610 that can be selected to set the location of the storage area to the current location. Additionally, in some embodiments, products and/or items associated with the storage area can be managed. In such embodiments, a product and/or item can be added or removed from the storage area, a minimum quantity and/or maximum quantity of the product and/or item that is permitted to be stored at the current storage area can be set, a unit of measure for a product and/or item can be set, and any other parameters or item metadata associated with products and/or items that can be stored in the current storage area.

In some embodiments, a user can select a user interface element corresponding to a new storage area to the list of storage areas. For example, if the user selects the portion of the user interface corresponding to the "+ Add New" label, a user interface for adding a new storage area can be presented as shown in FIG. 16E. In some embodiments, a user interface for adding a new storage area (e.g., as shown in FIG. 16E) can include user interface element 1608 that can be selected to edit the name of the storage area, and user interface element 1610 that can be selected to set the location of the new storage area to the current location. In some embodiments, user interface element 1610 can be grayed out (e.g., selection of user interface element 1610 can be inhibited), if a current location is within a threshold distance (e.g., within 0.5 meter, within 1 meter, within 1.5 meters) of a location of an existing storage area. Alternatively, in some embodiments, if user interface element 1010 is selected while user device 1152 is within a threshold distance (e.g., within 0.5 meter, within 1 meter, within 1.5 meters) of a location of an existing storage area, the inventory management application can prompt a user to take an appropriate action (e.g., as described above in connection with 1508 of FIG. 15).

Additionally, in some embodiments, products and/or items associated with the new storage area can be managed. In such embodiments, a product and/or item can be added or removed from the new storage area, a minimum quantity and/or maximum quantity of the product and/or item that is permitted to be stored at the new storage area can be set, a unit of measure for a product and/or item can be set, and any other parameters associated with products and/or items that can be stored in the new storage area.

FIG. 16F shows an example of a user interface that can be presented in response to a user selecting user interface element 1610 in the user interface shown in FIG. 16E. As shown in FIG. 16F, if the signal strength is not sufficient at the current location (e.g., as described above in connection with 1512 of FIG. 15), the user interface can prompt a user to place one or more additional transmitters to facilitate accurate recording of a location associated with the new storage area in accordance with some embodiments of the disclosed subject matter.

In some embodiments, the user interface indicating that the signal strength is not sufficient can include various user interface elements, such as a "help" user interface element, a "cancel" user interface element, and a "placed!" user interface element. In some embodiments, selecting the "help" user interface element can cause a user interface to be presented that can guide a user through a process of placing an additional transmitter (e.g., as described above in connection with 1516 of FIG. 15). In some embodiments, selecting the "cancel" user interface element can cause the user interface to revert to a previous user interface (e.g., the user interface shown in FIG. 16E). In some embodiments, selecting the "placed!" user interface element can cause the mobile device to detect signals that can be used to record the location of the new storage area (e.g., after prompting a user to return to the storage area and/or after the user has returned to the storage area).

FIG. 16G shows an example of a user interface for informing a user that a location has been recorded for the new storage area in accordance with some embodiments of the disclosed subject matter. In some embodiments, selecting the "done" user interface element can cause the user interface to present a user interface for managing the storage area (e.g., the user interface shown in FIG. 16E).

Figure 17A:
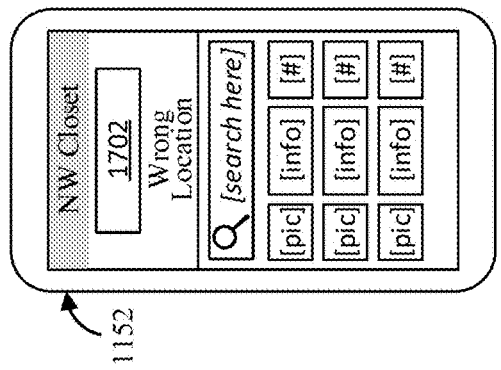
FIG. 17A shows another example of a user interface for an inventory management application in accordance with some embodiments of the disclosed subject matter.
Figure 17B:
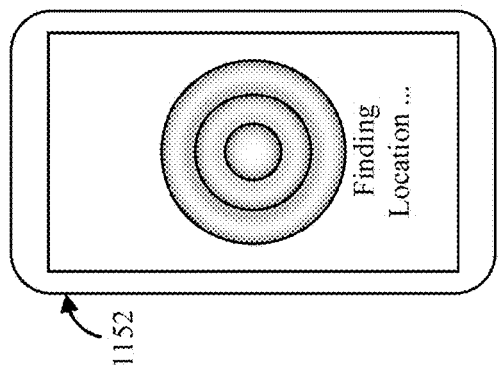
FIG. 17B shows an example of the user interface of FIG. 17A in which a user interface element is being selected in accordance with some embodiments of the disclosed subject matter.
Figure 17C:
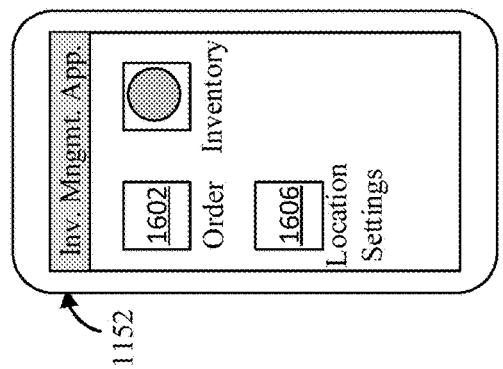
FIG. 17C shows an example of a user interface indicating that the current location of the user device is being determined in accordance with some embodiments of the disclosed subject matter.

FIG. 17A to 17F show examples of user interfaces that can be used to manage inventory for a particular storage area location using an inventory management application in accordance with some embodiments of the disclosed subject matter. FIG. 17A shows a similar user interface to the user interface shown in FIG. 16A. As shown in FIG. 17B, a user can select user interface element 1604 to cause an inventory management user interface to be presented. In some embodiments, user device 1152 can attempt to identify a storage location for which inventory is to be managed. For example, as shown in FIG. 17C, user device 1152 can present a user interface indicating that user device 1152 is attempting to determine a current location. In some embodiments, user device 1152 can detect signals from one or more transmitters in connection with the user interface shown in FIG. 17C, and can use the detected signals to identify which storage area (if any) is closest to the current location of user device 1152.

Figure 17D:
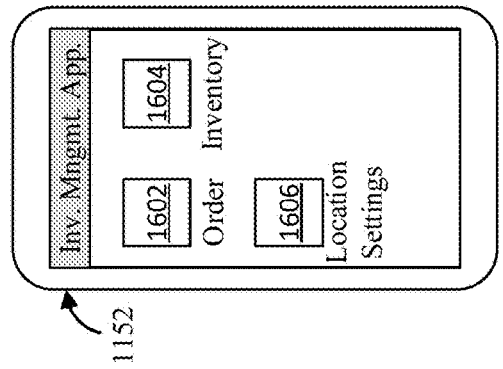
FIG. 17D shows an example of a user interface for presenting items in an inventory associated with a storage area found nearby the current location of the user device in accordance with some embodiments of the disclosed subject matter.

In some embodiments, after determining which storage area the user is accessing, user device 1152 can present a user interface for managing items in an inventory associated with the storage area as shown in FIG. 17D. In some embodiments, the user interface for managing the inventory associated with the storage area can include a user interface element 1702 that a user can select if the user is not at the presented storage area (e.g., if the incorrect storage area were identified). In some embodiments, is a user selected user interface element 1702, the inventory management application can decrease a confidence that the location information used to identify the storage area corresponds to the storage area presented in the user interface of FIG. 17D.

In some embodiments, various items in inventory at the storage area and/or that are normally in inventory at the storage area but which may be temporarily depleted can be presented within the user interface, and one or more user interface elements used to present information about the inventory can be selectable to cause more information about the product to be presented, and/or to cause another user interface (e.g., a user interface in which the item can be added to an order) to be presented. For example, as shown in FIG. 17E, a user can select a user interface element to cause a user interface associated that particular item to be presented. In some embodiments, user device 1152 can retrieve information about the item and/or particular instances of the item that were recorded as being stored as the storage location (e.g., from inventory management service 404, from a distributor database, form a manufacturer database, and/or from any other suitable sources).

Figure 17F:
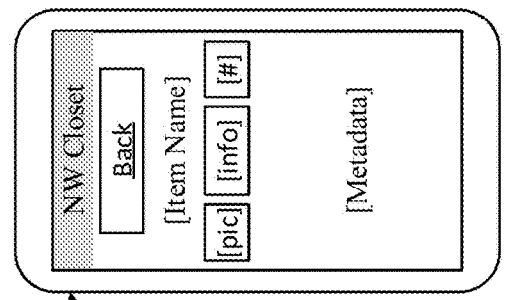
FIG. 17F shows an example of a user interface presenting metadata associated with a particular item corresponding to the user interface element selected in the user interface shown in FIG. 17E in accordance with some embodiments of the disclosed subject matter.
Figure 17E:
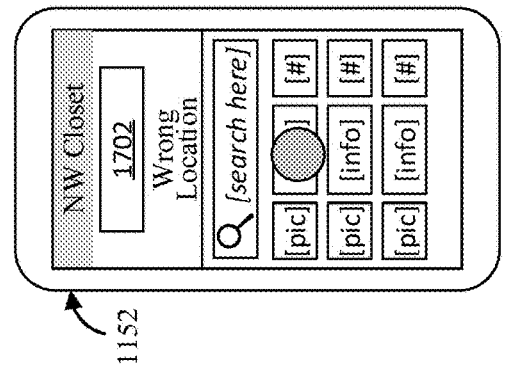
FIG. 17E shows an example of the user interface of FIG. 17D in which a user interface element is being selected in accordance with some embodiments of the disclosed subject matter.

For example, as shown in FIG. 17F, user device 1152 can present a user interface presenting details about the item that was selected in the user interface shown in FIG. 17E, such as metadata associated with the item. Such metadata can include lot numbers for the items in the storage area, serial numbers for the items in the storage area, information indicating when the items were stored in the storage area, information indicating who stored each item in the storage area, manufacture dates for the items, provenance data, expiration (or other use-by) dates associated with the items, when each item was last sterilized, and/or any other suitable metadata.

Figures 18A, 18B:
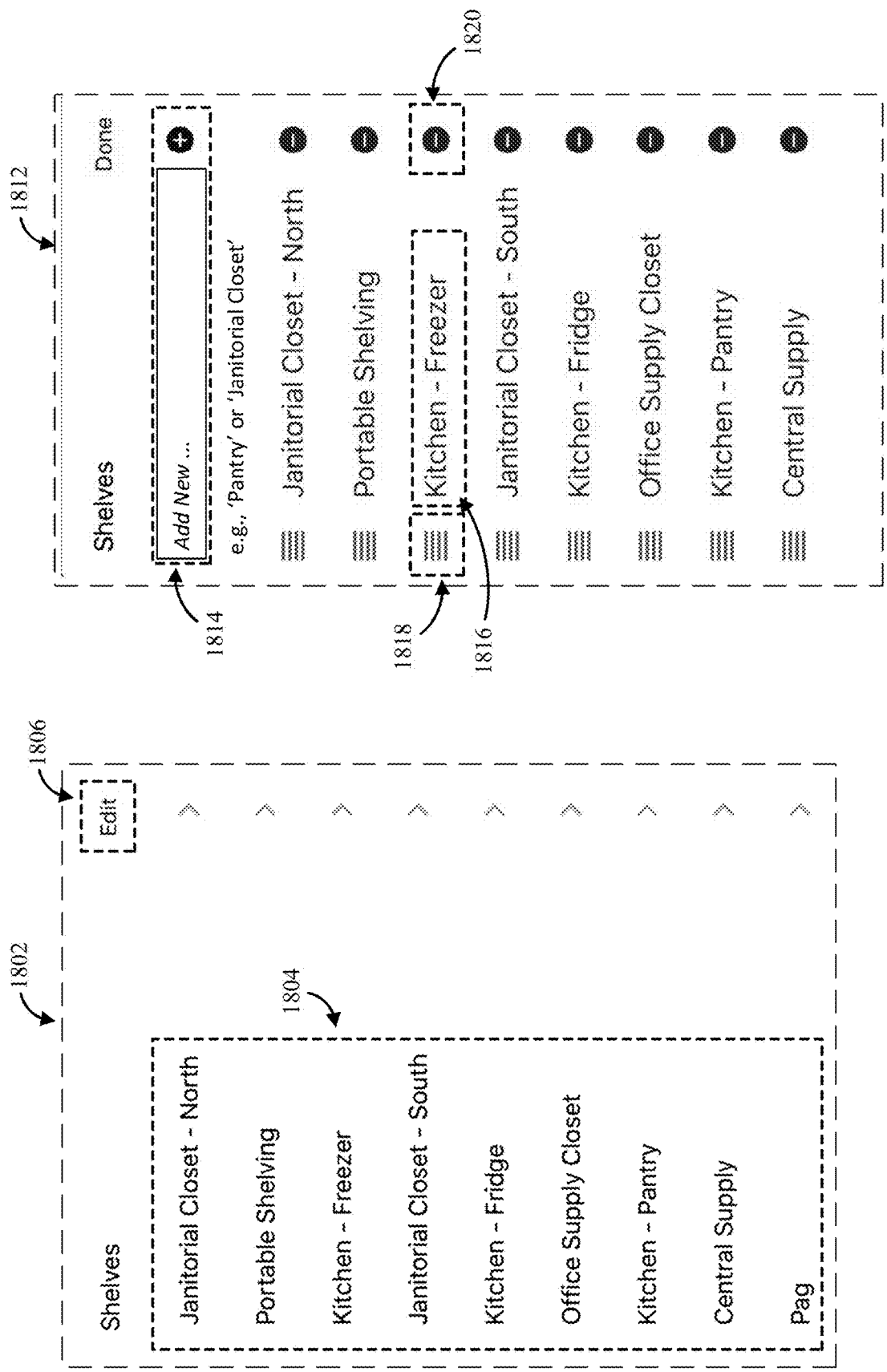
FIG. 18A shows an example of a user interface for presenting various storage areas associated with a facility within an inventory management application in accordance with some embodiments.
FIG. 18B shows an example of a user interface for managing storage areas associated with a facility within an inventory management application in accordance with some embodiments.

FIGS. 18A to 18E show examples of user interfaces for presenting and managing various storage areas associated with a facility within an inventory management application in accordance with some embodiments. As shown in FIG. 18A, a user interface 1802 can be presented which includes various storage areas 1804 (represented as "shelves" in user interface 1802). In some embodiments, a user can select a particular storage area by selecting a portion of the user interface corresponding to a name of the storage area. In some embodiments, user interface 1802 can include a user interface element 1806 that can be selected to edit the shelves associated with the facility. For example, selecting edit user interface element 1806 can cause a user interface to be presented that can be used to add, remove, and/or manage an order of the shelves associated with the facility. In a more particular example, selecting edit user interface element 1806 can cause a user interface such as the user interface 1812 shown in FIG. 18B to be presented. As shown in FIG. 18B, a field and associated user interface element 1814 can be presented within user interface 1812 to facilitate adding a new storage location. Additionally, user interface 1812 can present a name 1816 associated with each of various current storage areas. Additionally, a user interface element 1818 can be dragged to change a location of the storage area within user interfaces 1802 and 1812, and a user interface element 1820 that can be selected to remove the corresponding storage area from user interfaces 1802 and 1812.

A portion of a user interface 1832 is shown in FIG. 18C with an indication that a user has selected a portion 1834 of user interface 1832 corresponding to a particular storage area (e.g., "kitchen—freezer"), In some embodiments, in response to the user selecting portion 1834, a user interface 1842 can be presented with products and/or items associated with the selected storage area, as shown in FIG. 18D. In some embodiments, user interface 1842 can include various products and/or items that are permitted to be stored in the selected storage area and/or that are recorded as currently being stored in the storage area. In some embodiments, each product and/or item can be associated with various information such identifying information (e.g., a name, a product number), a cost, a unit of measure (e.g., case, pack, box, and the like). In some embodiments, each item and/or product can be associated with a user interface 1846 that can be used to present a current quantity of the item that is recorded as being stored in the storage area, and user interface elements for ordering more of the item (e.g., represented using a "+" symbol), removing a quantity of the item from the storage area (e.g., represented using a "−" symbol), or changing decreasing the quantity to be order (e.g., represented using the "−" symbol when the number presented is greater than the current amount stored in the storage area). Additionally, a user interface element 1844 can be selected to edit the products and/or items that can be stored in the storage area. For example, selecting edit user interface element 1844 can cause a user interface 1852 to be presented as shown in FIG. 18E. In some embodiments, user interface 1852 can include various products and/or items that are currently associated the storage area, and for each item a user interface element 1854 can be dragged to change a location of the product/item within user interfaces 1842 and 1852, and a user interface element 1856 that can be selected to remove the corresponding product/item from user interfaces 1842 and 1852. Additionally, in some embodiments, a user interface element 1856 (e.g., corresponding to the product itself) can be selected to edit information (e.g., metadata) associated with a particular product, such as a SKU of the item, lot numbers for the items in the storage area, serial numbers for the items in the storage area, information indicating when the items were stored in the storage area, information indicating who stored each item in the storage area, manufacture dates for the items, provenance data, expiration (or other use-by) dates associated with the items, when each item was last sterilized, and/or any other suitable metadata. Additionally, in some embodiments, selection of user interface element 1856 can cause a user interface to be presented that can facilitate submitting a message to an appropriate destination to report that metadata associated with the item (e.g. a name, a description, an image, etc.) as provided by the distributor, the manufacturer, a third party, or the like, is incorrect.

FIG. 19A shows yet another example of a user interface for an inventory management application in accordance with some embodiments of the disclosed subject matter. As shown in FIG. 19A, user device 1152 can present a user interface that includes selectable user interface elements 1902 and 1904 that can be used to navigate to an ordering portion of a user interface and a portion of the user interface that can be used to review and/or update an inventory of items stored in one or more locations associated with the facility.

FIG. 19B shows an example of the user interface of FIG. 19A in which a user interface element is being selected in accordance with some embodiments of the disclosed subject matter. As shown in FIG. 19B, a user has selected user interface element 1904 associated with an ordering portion of the user interface.

FIG. 19C shows an example of a user interface for the inventory management application of FIG. 19A prompting a user to select a user interface element and/or provide a vocal instruction for ordering one or more items in accordance with some embodiments of the disclosed subject matter. As shown in FIG. 19C, a user interface element (illustrated as a microphone icon) can be presented which can indicate to a user that the user can provide input using voice commands. Additionally, a selectable user interface element 1306 can be presented, which can be selected to present a portion of the user interface that can be used to browse an inventory associated with the storage area to select items to be ordered (e.g., in lieu of providing audio instructions). For example, selecting user interface element 1906 can cause a user interface similar to the user interface shown in FIG. 18D to be presented.

FIG. 19D shows an example of a user device receiving audio corresponding to an instruction to order items using the user interface of FIG. 19C in accordance with some embodiments of the disclosed subject matter. As shown in FIG. 19D, a user can provide audio instruction 1908 that include content indicating a quantity and an item to order. In the example shown in FIG. 19D, the user states "I need five boxes of medium gloves." In some embodiments, user device 1152 and/or a remote computing device (e.g., a server such as server 402) can select an item to order based on the audio input and/or can select and present (e.g., visually via a display, audibly via a speaker) one or more items that a user may order based on the audio input using any suitable technique or combination of techniques. For example, user device 1152 and/or the remote computing device can identify an item or items based on user preferences, which can be explicit or implicit. In such an example, the item or items can be identified based on an explicit user input designating a particular item as a preferred item to purchase to fulfill orders for a particular product (e.g., hygienic gloves). Additionally or alternatively, the item or items can be identified based on an inference of a user's preferences based on past purchases of items representing a particular product to be ordered. As another example, user device 1152 and/or the remote computing device can identify an item or items based on information that is not specifically associated with the user, such as search optimization for similar products. In some embodiments, any suitable technique or combination of techniques can be used to infer user preferences and/or infer a preferred item based on more general information. For example, one or more machine learning techniques can be used to identify an item that is acceptable and/or preferred by a user. In such an example, any suitable machine learning technique or combination of techniques can be used to infer a user's (or users') preferences, such as term frequency-inverse document frequency (tf-idf) techniques, random forest techniques, K-means clustering techniques, Word2Vec techniques, GLoVe-based vectorization models, convolutional neural network (CNN) classification techniques, any other suitable machine learning techniques, or any suitable combination thereof.

FIG. 19E shows an example of a user interface for the inventory management application of FIG. 19A confirming items that were added to an order in response to audio detected by the user device in accordance with some embodiments of the disclosed subject matter. As shown in FIG. 19E, user device 1152 can present a user interface confirming the item that has been added to the order based on audio 1908, and the quantity. If the quantity is different than what was requested (e.g., because a substitute item having a different number of items per box was ordered), an explanation of why the quantity is different can also be presented.

Figure 20:
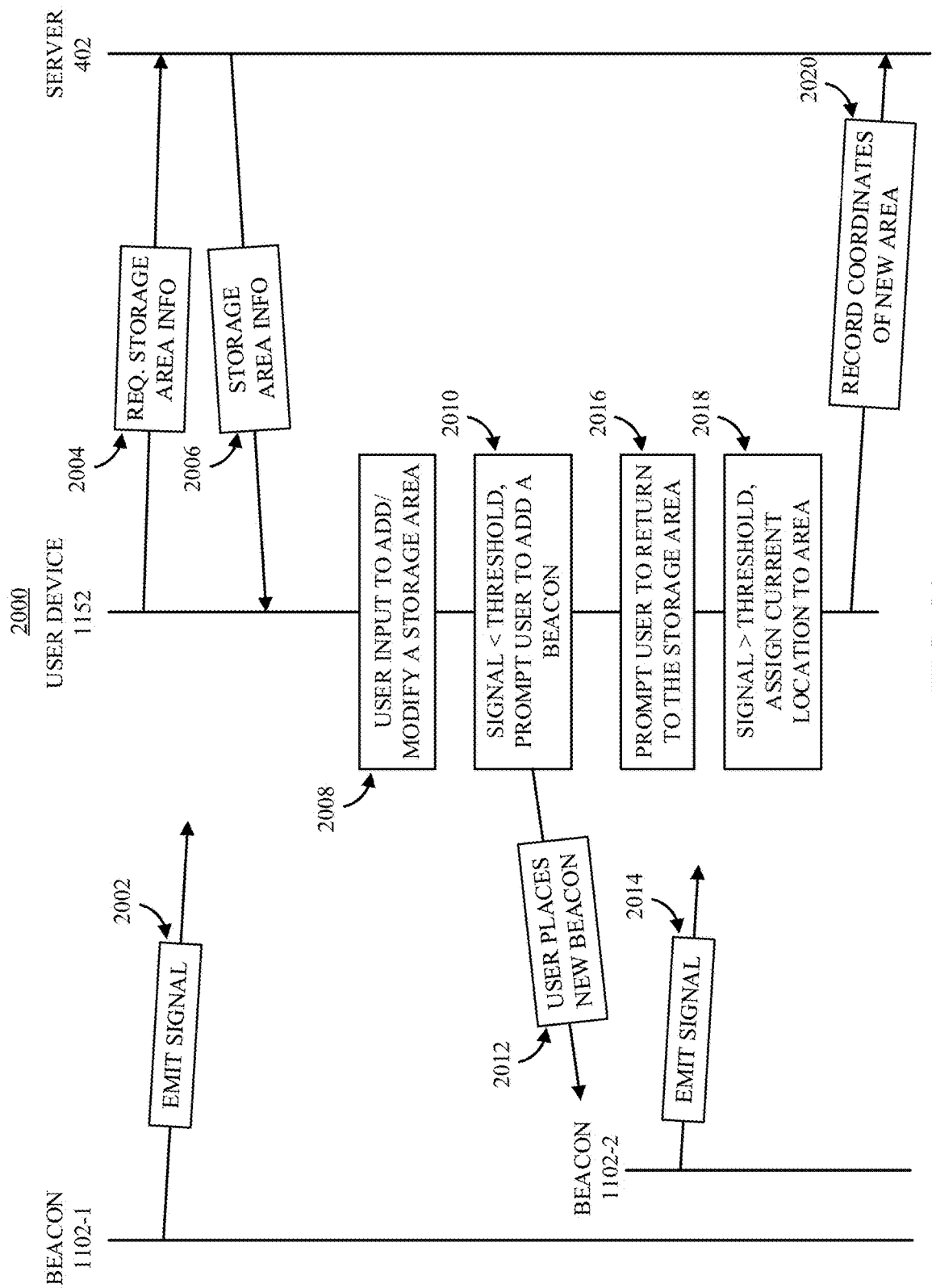
FIG. 20 shows an example of a process for adding a new storage area to an inventory management system in accordance with some embodiments of the disclosed subject matter.

FIG. 20 shows an example of a process 2000 for adding a new storage area to an inventory management system in accordance with some embodiments of the disclosed subject matter. As shown in FIG. 20, in process 2000 a beacon 1102-1 can emit a signal at 2002, and can continue to emit signals periodically and/or substantially continuously. In some embodiments, the signal emitted at 2002 can include identifying information associated with beacon 1102-1 (e.g., a UUID associated with beacon 1102-1).

In some embodiments, user device 1152 can transmit a request 2004 for information about storage areas associated with a particular facility to server 402. In some embodiments, request 2004 can be based on a current location of user device 1152 (e.g., based on the UUID of beacon 1102-1 detected in the signal emitted at 2002 indicating that user device 1152 is located within the vicinity of the facility associated with beacon 1102-1). Alternatively, in some embodiments, request 2004 can be based on user input to a user interface (e.g., user input to the user interface shown in FIG. 16A).

In some embodiments, server 402 can receive the request 2004 for information about storage areas associated with the facility, and can transmit storage area information that can be used to present information about which storage areas are associated with the facility, products/items that are permitted to be stored within the storage areas, and/or any other suitable information.

In some embodiments, user device 1152 can receive the information 2006, and can present a user interface with the storage areas currently associated with the facility and/or storage areas that are close to the current location of user device 1152. For example, user device 1152 can present a user interface such as the user interface shown in FIG. 16C.

In some embodiments, user device 1152 can receive user input to add and/or modify a storage area at 2008. For example, a user can select a portion of the user interface shown in FIG. 16C to modify a current storage area and/or add a new storage area.

In some embodiments, user device 1152 can determine, at 2010, that the signal strength of current beacons is not sufficient to accurately locate the storage area being added/modified, and can prompt the user to add an additional beacon.

In some embodiments, at 2012, the user can add a new beacon 1102-2, which can begin emitting signals at 2014. After the user has installed the new beacon at 2012 (e.g., indicated by selecting a particular user interface element, such as the "placed!" user interface element shown in FIG. 16F), at 2016, user device 1152 can prompt the user to return to the vicinity of the storage area.

In some embodiments, user device 1152 can determine, at 2018, that the signal strength of current beacons is now sufficient to accurately locate the storage area being added/modified, and can assign the current location to the storage area. As described above, in some embodiments, prior to permitting a user to add a new storage area at 2008, user device 1152 can determine whether a storage area has already been assigned to the current location (e.g., by checking storage area information 2006 received from server 402), and if a storage area already is assigned to a current location (or within a threshold distance of the current location), user device 1152 and/or server 402 can take an appropriate action, such as inhibiting addition of a new storage area, or another action (e.g., described above in connection with FIG. 1508 of FIG. 15).

In some embodiments, user device 1152 can transmit, at 2020, information that can be used to record the location of the storage area to server 402, which can record the location information. For example, in some embodiments, user device 1152 can transmit pairs of UUID and signal strength, which can be used by server 402 to determine a location of user device 1152 when the signals were recorded in a local coordinate system associated with the facility (or a portion of the facility). As another example, in some embodiments, user device 1152 can determine the coordinates of the storage location (e.g., if the coordinates of each beacon are known by user device 1152). As yet another example, in some embodiments, user device 1152 can transmit pairs of UUID and signal strength, which can record by server 402 to be used when determining which storage area is located near user device 1152 (or another user device).

Figure 21:
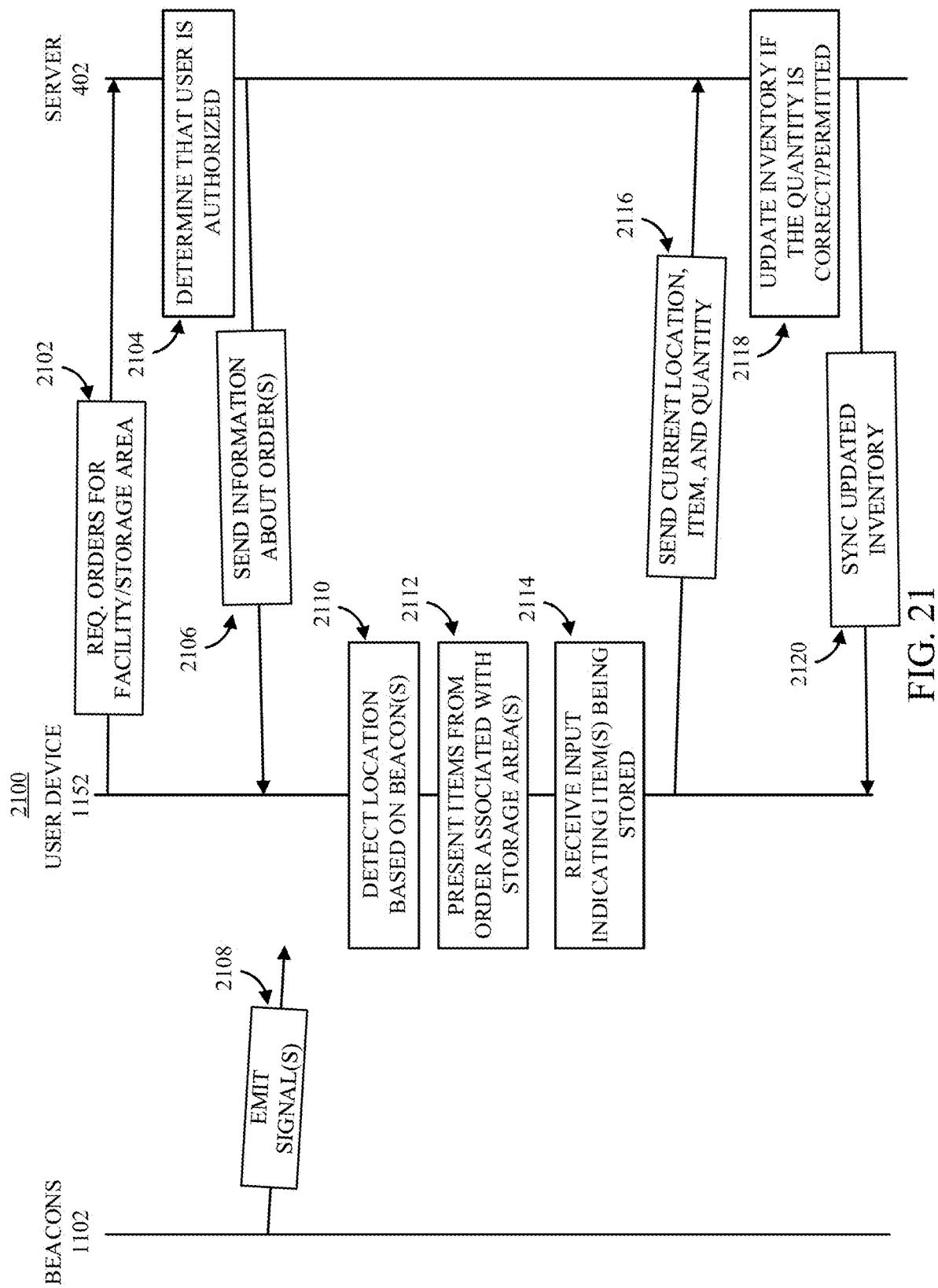
FIG. 21 shows an example of a process for updating inventory associated with a particular storage area as a user associated with a facility stores items from an order in accordance with some embodiments of the disclosed subject matter.

FIG. 21 shows an example of a process for updating inventory associated with a particular storage area as a user associated with a facility stores items from an order in accordance with some embodiments of the disclosed subject matter. As shown in FIG. 21, in process 2100 user device 1152 can transmit a request 2102 for an order or orders associated with a facility and/or storage area(s) to server 402. In some embodiments, request 2102 can be based on a current location of user device 1152 (e.g., based on the UUID of beacon 1102 detected in a signal(s) emitted by a beacon(s) associated with the facility). Alternatively, in some embodiments, request 2102 can be based on user input to a user interface (e.g., user input to the user interface shown in FIG. 17A). In some embodiments, request 2102 can be based on identifying information of an order, such as an order number, an invoice number, which can be automatically extracted (e.g., by capturing an image of the number, or a visual code representing the number such as a barcode a QR code, or any other suitable code) or manually entered (e.g., using a keyboard or virtual keyboard, using voice commands).

In some embodiments, server 402 can receive request 2102 for information about orders associated with the facility/a storage area(s), and can determine that the user is authorized to access the order information at 2104. For example, if the user that is logged in via user device 1152 is an employee of the facility (and/or user device 1152 is associated with the facility), server 402 can determine whether the user is authorized by accessing a list of authorized users and/or devices associated with the organization.

In some embodiments, in response to determining that the user is authorized at 2104, server 402 can transmit information about orders associated with the facility at 2106. In some embodiments, user device 1152 can receive the information 2106, and can present a user interface with information about current orders and/or recent orders, and a user can select a particular order. Additionally or alternatively, if identifying information of a particular order were transmitted at 2102, user device 1152 can present information about that particular order.

In some embodiments, beacon(s) 1102 can emit signals at 2108, and can continue to emit signals periodically and/or substantially continuously. In some embodiments, the signal(s) emitted at 2108 can include identifying information associated with beacons 1102 (e.g., UUIDs associated with each beacon 1102).

In some embodiments, user device 112 can detect, at 2110, the current location of user device 1152 by detecting signals emitted at 2108 from one or more beacons. For example, user device 1152 can attempt to detect signals emitted by beacons, and can determine the relative signal strength in comparison to an expected maximum signal strength.

In some embodiments, user device 1152 can, at 2112, present a user interface with items from a particular order that are to be stored in a storage area in the vicinity of user device 1152.

In some embodiments, user device 1152 can, at 2114, receive input indicating that an item is being stored. In some embodiments, such input can be provided via the user interface and/or can be provided using another input device (e.g., a camera, a microphone, or the like). In some embodiments, a user can provide an indication of the quantity of the item that is being stored. Additionally or alternatively, in some embodiments, the user can be prompted to scan each container (e.g., box, case, can, jar, or any other suitable container) or item as the item(s) is being stored. Note that the units of measure in which a product/item is stored can differ from the unit of measure in which the product is ordered and/or delivered. For example, an item can be delivered in a purchase unit of measure (e.g., an arbitrary value used to describe the product, such as a "Case" or "Package"). In some embodiments, this unit of measure can be extracted from order information, but the user can provide a different unit of measure when an item is being stored. For example, a case of an item can come packaged as a number of boxes that each contain individual packages of products. In such an example, storage area A may be used to store a relatively large quantity (e.g., an entire box or boxes) and the quantity can be recorded in terms of boxes, while storage area B may be used to store a smaller quantity (e.g., because storage area B only has space for a single package, or because not as much is needed in the vicinity of storage area B) and the quantity can be recorded in terms of packages. In some embodiments, arbitrary names (e.g., case, box, package) can be mapped using numerical values. For example, if a case contains 6 boxes, and each box then contains 3 packages, which each contain 10 units, these conversion values can be used to indicate the number of packages or units that are currently stored, in addition to the more arbitrary labels. In some embodiments, the conversion values can be used when determining a quantity to order, as an item may be available in different quantities at different prices, which may not otherwise be apparent to a user.

In some embodiments, user device 1152 can transmit, at 2116, information about the current location (e.g., based on signals detected at 2110, based on a storage area identified based on the signals detected at 2110), an item that is being stored, and a quantity of the item that is being stored. In some embodiments, user device 1152 can transmit any other suitable metadata associated with the item or items being stored, such as a lot number(s) for the item(s) being stored, a serial number(s) for the item(s) being stored, a manufacture date(s) for the item(s) being stored, a provenance date(s) for the item(s) being stored, an expiration (or other use-by) date(s) for the item(s) being stored, when the item was last sterilized, and/or any other suitable metadata.

In some embodiments, server 402 can receive the information 2116, and can update an inventory associated with the storage area if the quantity stored is correct and/or permitted at 2118 (e.g., as described above in connection with FIG. 14), and can transmit information about the updated inventory at 2120 to ensure that the inventory information is synchronized between server 402 and user device 1152.

Figure 22:
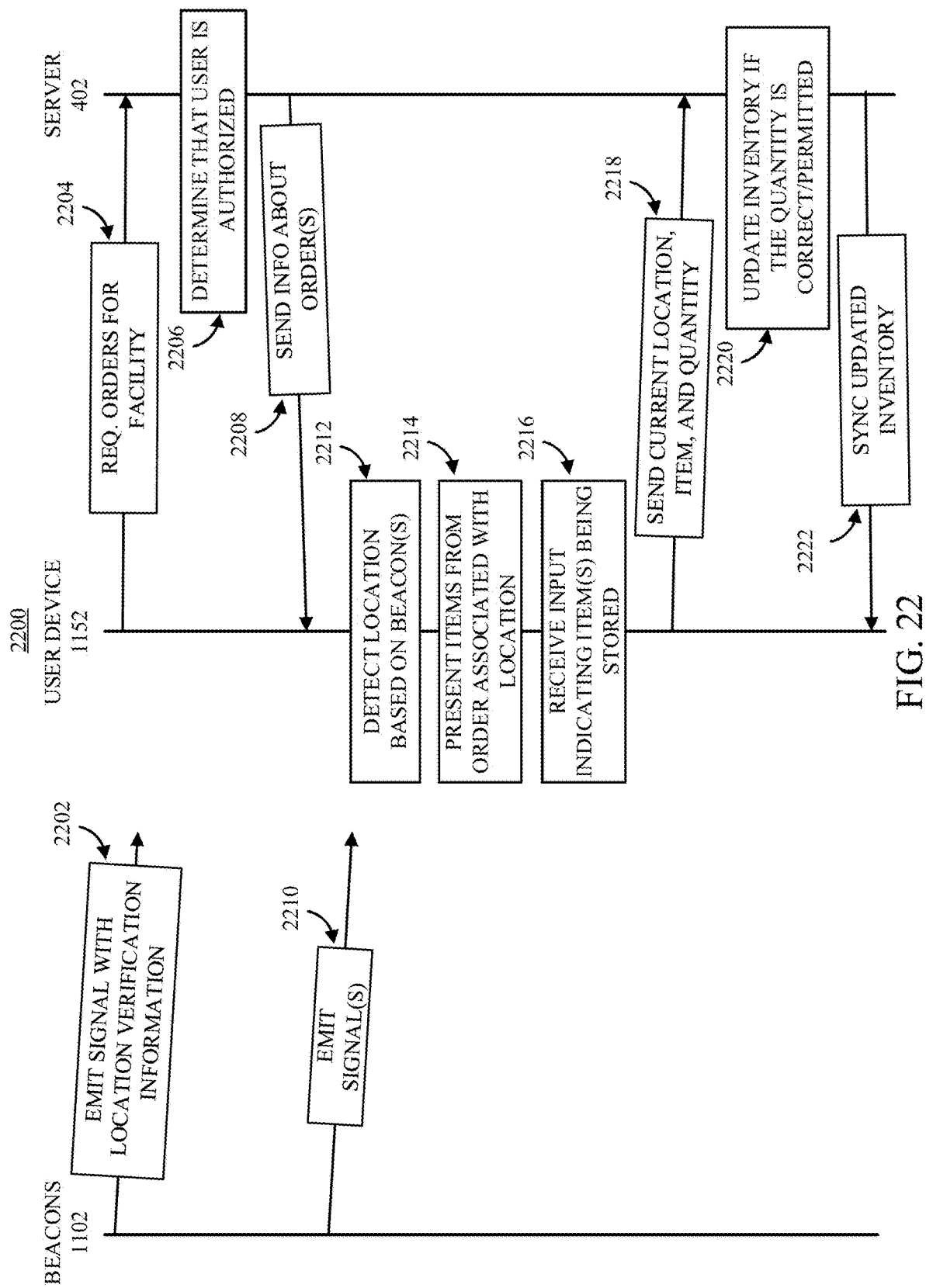
FIG. 22 shows an example of a process for updating inventory associated with a particular storage area as a user associated with a distributor stores items from an order in accordance with some embodiments of the disclosed subject matter.

FIG. 22 shows an example of a process 2200 for updating inventory associated with a particular storage area as a user associated with a distributor stores items from an order in accordance with some embodiments of the disclosed subject matter. As shown in FIG. 22, in process 2200 beacon(s) 1102 can emit signals at 2202 that include information that can be used (e.g., by server 402) to verify that a user device is in the vicinity of a particular beacon 1102 (e.g., a beacon located near an entrance or loading dock of a facility).

In some embodiments, user device 1152 can transmit a request 2204 for an order or orders associated with a facility and/or storage area(s) to server 402. In some embodiments, request 2204 can be associated with information encoded in the signal(s) emitted at 2202, which server 402 can use to verify that user device 1152 is in the presence of at least one beacon associated with the facility.

Additionally, in some embodiments, request 2204 can be based on user input to a user interface (e.g., user input to the user interface shown in FIG. 17A). In some embodiments, request 2204 can be based on identifying information of an order, such as an order number, an invoice number, which can be automatically extracted (e.g., by capturing an image of the number, or a visual code representing the number such as a barcode a QR code, or any other suitable code) or manually entered (e.g., using a keyboard or virtual keyboard, using voice commands). In some embodiments, a user of user device 1152 in FIG. 22 can be an employee or contractor associated with a distributor (e.g., rather than an employee of the organization).

In some embodiments, server 402 can receive request 2204 for information about orders associated with the facility/a storage area(s), and can determine that the user is authorized to access the order information at 2206. For example, if the user that is logged in via user device 1152 is an employee of the distributor (and/or user device 1152 is associated with the distributor), server 402 can determine whether the user is authorized by accessing a list of authorized users and/or devices associated with the distributor, and verifying that the information associated with the request indicates that user device 1152 is located within, or in the vicinity of, the facility. In some embodiments, a user associated with the distributor can access the order when not in the vicinity of the facility, but may be inhibited from making changes (e.g., indicating that items have been delivered or stored, making changes to the order, or the like).

In some embodiments, in response to determining that the user is authorized at 2206, server 402 can transmit information about an order(s) associated with the facility at 2208. In some embodiments, user device 1152 can receive the information 2208, and can present a user interface with information about current orders and/or recent orders, and a user can select a particular order. Additionally or alternatively, if identifying information of a particular order were transmitted at 2204, user device 1152 can present information about that particular order.

In some embodiments, beacon(s) 1102 can continue to emit signals periodically and/or substantially continuously at 2210. In some embodiments, the signal(s) emitted at 2210 can include identifying information associated with beacons 1102 (e.g., UUIDs associated with each beacon 1102).

In some embodiments, user device 1152 can detect, at 2212, the current location of user device 1152 by detecting signals emitted at 2202 and/or 2210 from one or more beacons. For example, user device 1152 can attempt to detect signals emitted by beacons 1102, and can determine the relative signal strength in comparison to an expected maximum signal strength.

In some embodiments, user device 1152 can, at 2214, present a user interface with items from a particular order that are to be stored in a storage area in the vicinity of user device 1152, as determined using signals emitted at 2210.

In some embodiments, user device 1152 can, at 2216, receive input indicating that an item is being stored. In some embodiments, such input can be provided via the user interface and/or can be provided using another input device (e.g., a camera, a microphone, or the like). In some embodiments, a user can provide an indication of the quantity of the item that is being stored. Additionally or alternatively, in some embodiments, the user can be prompted to scan each container (e.g., box, case, can, jar, or any other suitable container) or item as the item(s) is being stored.

In some embodiments, user device 1152 can transmit, at 2218, information about the current location (e.g., based on signals detected at 2202 and/or 2210, based on a storage area identified based on the signals detected at 2202 and/or 210), an item that is being stored, and a quantity of the item that is being stored. In some embodiments, user device 1152 can transmit any other suitable metadata associated with the item or items being stored, such as a lot number(s) for the item(s) being stored, a serial number(s) for the item(s) being stored, a manufacture date(s) for the item(s) being stored, a provenance date(s) for the item(s) being stored, an expiration (or other use-by) date(s) for the item(s) being stored, when the item was last sterilized, and/or any other suitable metadata.

In some embodiments, server 402 can receive the information 2218, and can update an inventory associated with the storage area if the quantity stored is correct and/or permitted at 2220 (e.g., as described above in connection with FIG. 14), and can transmit information about the updated inventory at 2222 to ensure that the inventory information is synchronized between server 402 and user device 1152.

Figure 23:
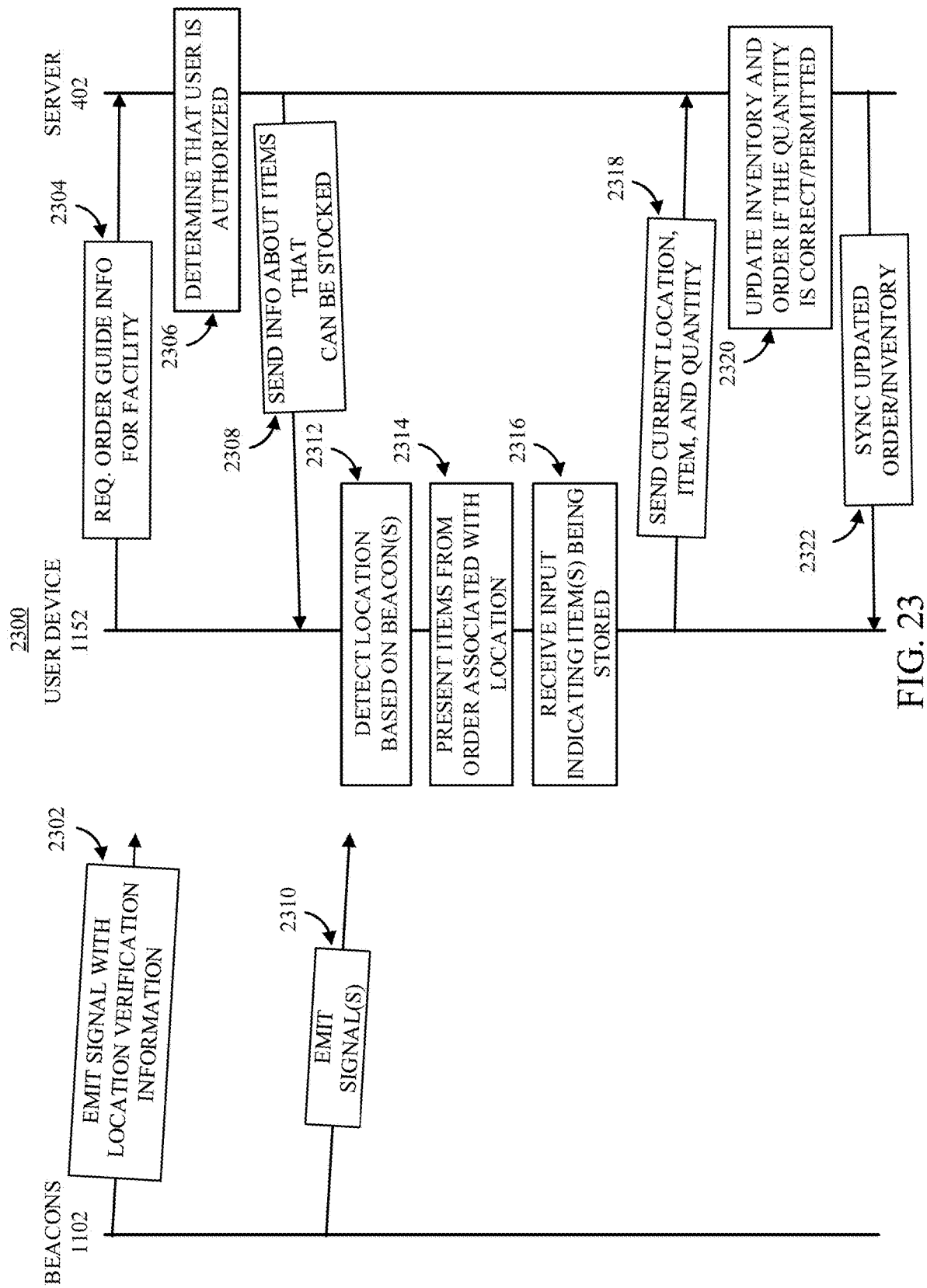
FIG. 23 shows an example of a process for updating inventory associated with a particular storage area as a merchandiser stores items and generates an order in accordance with some embodiments of the disclosed subject matter.

FIG. 23 shows an example of a process 2300 for updating inventory associated with a particular storage area as a merchandiser stores items and generates an order in accordance with some embodiments of the disclosed subject matter. As shown in FIG. 23, in process 2300 beacon(s) 1102 can emit signals at 2302 that include information that can be used (e.g., by server 402) to verify that a user device is in the vicinity of a particular beacon 1102 (e.g., a beacon located near an entrance or loading dock of a facility).

In some embodiments, user device 1152 can transmit a request 2304 for order guide information associated with a facility and/or storage area(s) to server 402. In some embodiments, request 2304 can be associated with information encoded in the signal(s) emitted at 2302, which server 402 can use to verify that user device 1152 is in the presence of at least one beacon associated with the facility.

Additionally, in some embodiments, request 2304 can be based on user input to a user interface (e.g., user input to the user interface shown in FIG. 17A). In some embodiments, request 2304 can be based on identifying information of an order, such as an order number, an invoice number, which can be automatically extracted (e.g., by capturing an image of the number, or a visual code representing the number such as a barcode a QR code, or any other suitable code) or manually entered (e.g., using a keyboard or virtual keyboard, using voice commands). In some embodiments, a user of user device 1152 in FIG. 23 can be an employee or contractor associated with a merchandiser and/or distributor (e.g., rather than an employee of the organization).

In some embodiments, server 402 can receive request 2304 for order guide information (e.g., information about items that can be stocked at the facility) associated with the facility/a storage area(s), and can determine that the user is authorized to access the order information at 2306. For example, if the user that is logged in via user device 1152 is an employee of the merchandiser/distributor (and/or user device 1152 is associated with the merchandiser/distributor), server 402 can determine whether the user is authorized by accessing a list of authorized users and/or devices associated with the merchandiser/distributor, and verifying that the information associated with the request indicates that user device 1152 is located within, or in the vicinity of, the facility. In some embodiments, a user associated with the merchandiser/distributor can access order guide information when not in the vicinity of the facility, but may be inhibited from generating or making changes to an order (e.g., indicating that items have stocked, making changes to the order, or the like).

In some embodiments, in response to determining that the user is authorized at 2306, server 402 can transmit order guide information about items that can be stocked at the facility at 2308. In some embodiments, user device 1152 can receive the order guide information 2308, and can present a user interface with information about which items can be stocked, and where (e.g., which storage areas) the items can be stocked.

In some embodiments, beacon(s) 1102 can continue to emit signals periodically and/or substantially continuously at 2310. In some embodiments, the signal(s) emitted at 2310 can include identifying information associated with beacons 1102 (e.g., UUIDs associated with each beacon 1102).

In some embodiments, user device 1152 can detect, at 2312, the current location of user device 1152 by detecting signals emitted at 2302 and/or 2310 from one or more beacons. For example, user device 1152 can attempt to detect signals emitted by beacons 1102, and can determine the relative signal strength in comparison to an expected maximum signal strength.

In some embodiments, user device 1152 can, at 2314, present a user interface with items that can be stocked in a particular storage area in the vicinity of user device 1152, as determined using signals emitted at 2310.

In some embodiments, user device 1152 can, at 2316, receive input indicating that an item is being stocked. In some embodiments, such input can be provided via the user interface and/or can be provided using another input device (e.g., a camera, a microphone, or the like). In some embodiments, a user can provide an indication of the quantity of the item that is being stored. Additionally or alternatively, in some embodiments, the user can be prompted to scan each container (e.g., box, case, can, jar, or any other suitable container) or item as the item(s) is being stored.

In some embodiments, user device 1152 can transmit, at 2318, information about the current location (e.g., based on signals detected at 2302 and/or 2310, based on a storage area identified based on the signals detected at 2302 and/or 2310), an item that is being stored, and a quantity of the item that is being stocked. In some embodiments, user device 1152 can transmit any other suitable metadata associated with the item or items being stored, such as a lot number(s) for the item(s) being stored, a serial number(s) for the item(s) being stored, a manufacture date(s) for the item(s) being stored, a provenance date(s) for the item(s) being stored, an expiration (or other use-by) date(s) for the item(s) being stored, when the item was last sterilized, and/or any other suitable metadata.

In some embodiments, server 402 can receive the information 2318, and can update an inventory associated with the storage area and/or can update an order, if the quantity being stocked is correct and/or permitted at 2320 (e.g., as described above in connection with FIG. 14), and can transmit information about the updated inventory at 2322 to ensure that the amount being stocked is synchronized between server 402 and user device 1152, such that the user can verify that the proper amount will be charged to the organization associated with the facility.

Figure 24:
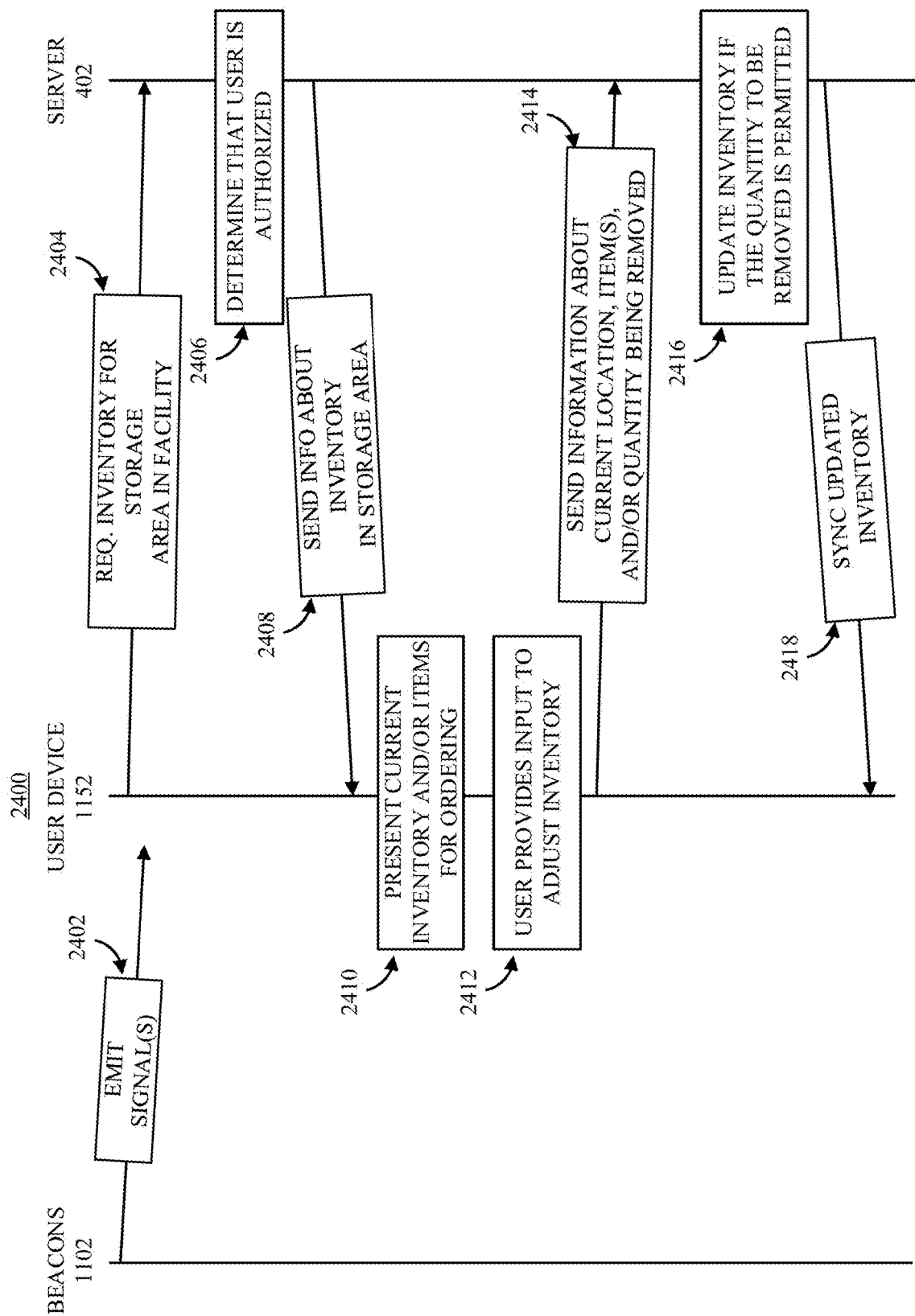
FIG. 24 shows an example of a process for managing inventory associated with a particular storage area as items are removed in accordance with some embodiments of the disclosed subject matter.

FIG. 24 shows an example of a process 2400 for managing inventory associated with a particular storage area as items are removed in accordance with some embodiments of the disclosed subject matter. As shown in FIG. 24, in process 2400 beacon(s) 1102 can emit signals at 2402 that can be used (e.g., by server 402, by user device 1152) to determine a location of user device 1152.

In some embodiments, user device 1152 can transmit a request 2404 for inventory associated with a storage area in a facility to server 402. In some embodiments, request 2404 can be associated with location information that is based on the signal(s) emitted at 2402, which server 402 can use to determine which storage area is closest to user device 1152 (e.g., to determine which storage area the user is most likely to be accessing).

Additionally, in some embodiments, request 2104 can be based on user input to a user interface (e.g., user input to the user interface shown in FIG. 17A). In some embodiments, request 2104 can be based on identifying information of a storage area, such as a storage area identification number or the like, which can be automatically extracted (e.g., by capturing an image of the number, or a visual code representing the number such as a barcode a QR code, or any other suitable code) or manually entered (e.g., using a keyboard or virtual keyboard, using voice commands). In some embodiments, a user of user device 1152 in FIG. 24 can be an employee associated with the facility and/or an organization associated with the facility.

In some embodiments, server 402 can receive request 2404 for inventory information associated with a storage area(s), and can determine that the user is authorized to access the inventory information at 2406. For example, if the user that is logged in via user device 1152 is an employee of the facility (and/or user device 1152 is associated with the facility), server 402 can determine whether the user is authorized by accessing a list of authorized users and/or devices associated with the facility.

In some embodiments, in response to determining that the user is authorized at 2406, server 402 can transmit information about inventory stored at the storage area and/or information about products/items that are permitted to be stored at the storage area at 2408. In some embodiments, server 402 can transmit any other suitable metadata associated with the item or items associated with the storage area, such as a lot number(s) for the item(s) being stored, a serial number(s) for the item(s) being stored, a manufacture date(s) for the item(s) being stored, a provenance date(s) for the item(s) being stored, an expiration (or other use-by) date(s) for the item(s) being stored, when the item was last sterilized, and/or any other suitable metadata.

In some embodiments, user device 1152 can receive the inventory information 2408, and can present, at 2410, a user interface with information about which items are currently stored in the storage area and/or which products/items are permitted to be stored.

In some embodiments, user device 1152 can, at 2412, receive input indicating that an item is being removed from storage. In some embodiments, such input can be provided via the user interface and/or can be provided using another input device (e.g., a camera, a microphone, or the like). In some embodiments, a user can provide an indication of the quantity of the item that is being removed. Additionally or alternatively, in some embodiments, the user can be prompted to scan each container (e.g., box, case, can, jar, or any other suitable container) or item as the item(s) is being removed.

In some embodiments, user device 1152 can transmit, at 2414, information about the current location (e.g., based on signals emitted at 2402, based on a storage area identified based on the signals emitted at 2402), an item that is being removed, and a quantity of the item that is being removed. In some embodiments, user device 1152 can prompt a user to select a particular item(s) to remove from inventory based on metadata received in connection with inventory information 2408. For example, a facility may operate a particular storage area according to a policy (e.g., a first-in, first-out policy) in which items that are stored first are to be removed first. In such an example, user device 1152 can prompt a user to select the instances of a particular item that were stored earliest when removing that item from the storage area (e.g., based on a lot number associated with the item, based on a serial number associated with the item, based on identifying information such as a visual code associated with the item, based on a storage location of the item). As another example, for perishable items, user device 1152 can prompt a user to select the instances of a particular item have an earliest expiration (or other use-by) date (e.g., based on a lot number associated with the item, based on a serial number associated with the item, based on identifying information such as a visual code associated with the item, based on a storage location of the item). Additionally or alternatively, in some embodiments, stocking rules can be implemented to encourage a policy (e.g., a first-in, first-out policy) to be followed. For example, when items are being stored, items that are already present can be placed to be most accessible (e.g., at the front of a shelf, at the top of a bin), while newly stocked items can be stored to be least accessible (e.g., at the back of a shelf, at the bottom of a bin). In such an example, when removing items, a user can be prompted to remove items that are located at the location designated for first-removal (e.g., the front of the shelf, the top of the bin), and may not be prompted to remove items having particular characteristics (e.g., specific lot numbers, specific serial numbers).

In some embodiments, server 402 can receive the information 2414, and can update an inventory associated with the storage area, if the quantity being removed stocked is permitted at 2416, and can transmit information about the updated inventory at 2418 to ensure that the amount currently stocked is synchronized between server 402 and user device 1152, such that the user can verify that the quantity that is recorded as being removed and still stored matches the items that are present in the storage area. Note that, in some embodiments, the quantity that a user can remove may be limited for particular types of items (e.g., high value items, controlled substances, or the like), and removing more than a particular amount may require authorization by an administrative user (e.g., an employee's supervisor, a pharmacist, or any other suitable administrative user).

Figure 25:
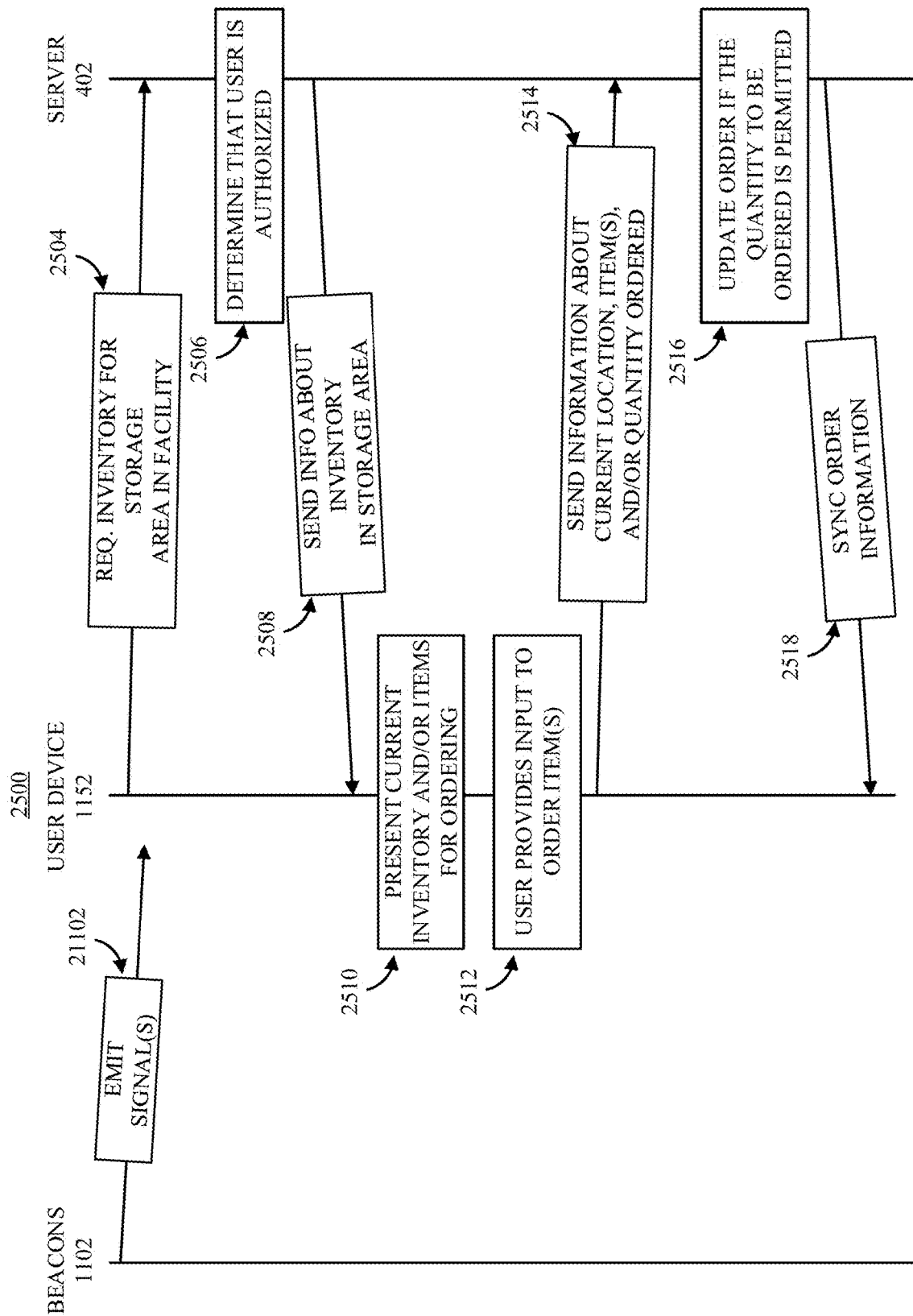
FIG. 25 shows an example of a process for ordering additional items from products associated with a particular storage area in accordance with some embodiments of the disclosed subject matter.

FIG. 25 shows an example of a process 2500 for ordering additional items from products associated with a particular storage area in accordance with some embodiments of the disclosed subject matter. As shown in FIG. 25, in process 2500 beacon(s) 1102 can emit signals at 2502 that can be used (e.g., by server 1102, by user device 1152) to determine a location of user device 1152.

In some embodiments, user device 1152 can transmit a request 2504 for inventory associated with a storage area in a facility to server 402. In some embodiments, request 2504 can be associated with location information that is based on the signal(s) emitted at 2502, which server 402 can use to determine which storage area is closest to user device 1152 (e.g., to determine which storage area the user is most likely to be accessing).

Additionally, in some embodiments, request 2504 can be based on user input to a user interface (e.g., user input to the user interface shown in FIG. 17A). In some embodiments, request 2504 can be based on identifying information of a storage area, such as a storage area identification number or the like, which can be automatically extracted (e.g., by capturing an image of the number, or a visual code representing the number such as a barcode a QR code, or any other suitable code) or manually entered (e.g., using a keyboard or virtual keyboard, using voice commands). In some embodiments, a user of user device 1152 in FIG. 25 can be an employee associated with the facility and/or an organization associated with the facility.

In some embodiments, server 402 can receive request 2504 for inventory information associated with a storage area(s), and can determine that the user is authorized to access the inventory information at 2506. For example, if the user that is logged in via user device 1152 is an employee of the facility (and/or user device 1152 is associated with the facility), server 402 can determine whether the user is authorized by accessing a list of authorized users and/or devices associated with the facility.

In some embodiments, in response to determining that the user is authorized at 2506, server 402 can transmit information about inventory stored at the storage area and/or information about products/items that are permitted to be stored at the storage area at 2508. In some embodiments, user device 1152 can receive the inventory information 2508, and can present, at 2510, a user interface with information about which items are currently stored in the storage area, which products/items are permitted to be stored, and/or which items can be ordered. In some embodiments, server 402 can use a count of current stock on hand (e.g., based on manual entry or the tracking of stock entering/leaving inventory as described above in connection with 1208 and 1214 of FIG. 12) to suggest an amount of a particular item(s) to order. For example, in some embodiments, server 402 can calculate stocking need based on projected demand (e.g., based on census data, such as a current number of residents of an elder care facility) projected shipping lead times, and/or manual PAR/ROP-ROQ/MinMax values. Note that, in some embodiments, the required units can be converted from stocking units to purchase units. For example, an item may be shipped in cases containing 10 boxes of gloves (e.g., a purchase unit), which can then be broken down and stored around the facility as boxes (e.g., a stocking unit). In such an example, server 402 can track the number of boxes on hand, and can convert the number of boxes needed to a number of cases to be ordered. For example, if server 402 determines that 12 boxes are needed, server 402 can convert 12 boxes into 2 cases (e.g., 12 needed/10 per case=1.2 cases rounded up to 2) to recommend for ordering. In some embodiments, server 402 can automatically can items to an order based on anticipated need without user intervention, although a user may be required to authorize the order. In some embodiments, server 402 can generate one or more lists of deficiently-stocked products to create one or more purchase orders. For example, if there is a low quantity of Product A that is available from/is typically ordered from Supplier 1 and a low quantity of Product B that is available from/is typically ordered from Supplier 2, server 302 can separate purchase orders.

In some embodiments, user device 1152 can, at 2512, receive input indicating that an item is to be ordered. In some embodiments, such input can be provided via the user interface and/or can be provided using another input device (e.g., a camera, a microphone, or the like). In some embodiments, a user can provide an indication of the quantity of the item that is being ordered. Additionally or alternatively, in some embodiments, the user can be prompted to scan a container (e.g., box, case, can, jar, or any other suitable container) or item as the item(s) that is being re-ordered.

In some embodiments, user device 1152 can transmit, at 2514, information about the current location (e.g., based on signals emitted at 2502, based on a storage area identified based on the signals emitted at 2502), an item that is being ordered, and a quantity of the item that is being ordered.

In some embodiments, server 402 can receive information 2514, and can generate and/or update an order associated with the facility, if the quantity being ordered is permitted at 2516, and can transmit information about an updated order at 2518 to ensure that the amount being ordered is synchronized between server 402 and user device 1152, such that the user can verify that the quantity being ordered matches the user's expectations. Note that, in some embodiments, the quantity that a user can order may be limited for particular types of items (e.g., high value items, controlled substances, or the like), and ordering more than a particular amount may require authorization by an administrative user (e.g., an employee's supervisor, a pharmacist, or any other suitable administrative user). In some embodiments, server 2516 can interact with one or more purchasing systems to begin the order process (which may include substituting items based on product groups where the item that was to be ordered is not available is more expensive than an alternative, or is otherwise less desirable), and initiating an approval and/or review process.

Figure 26:
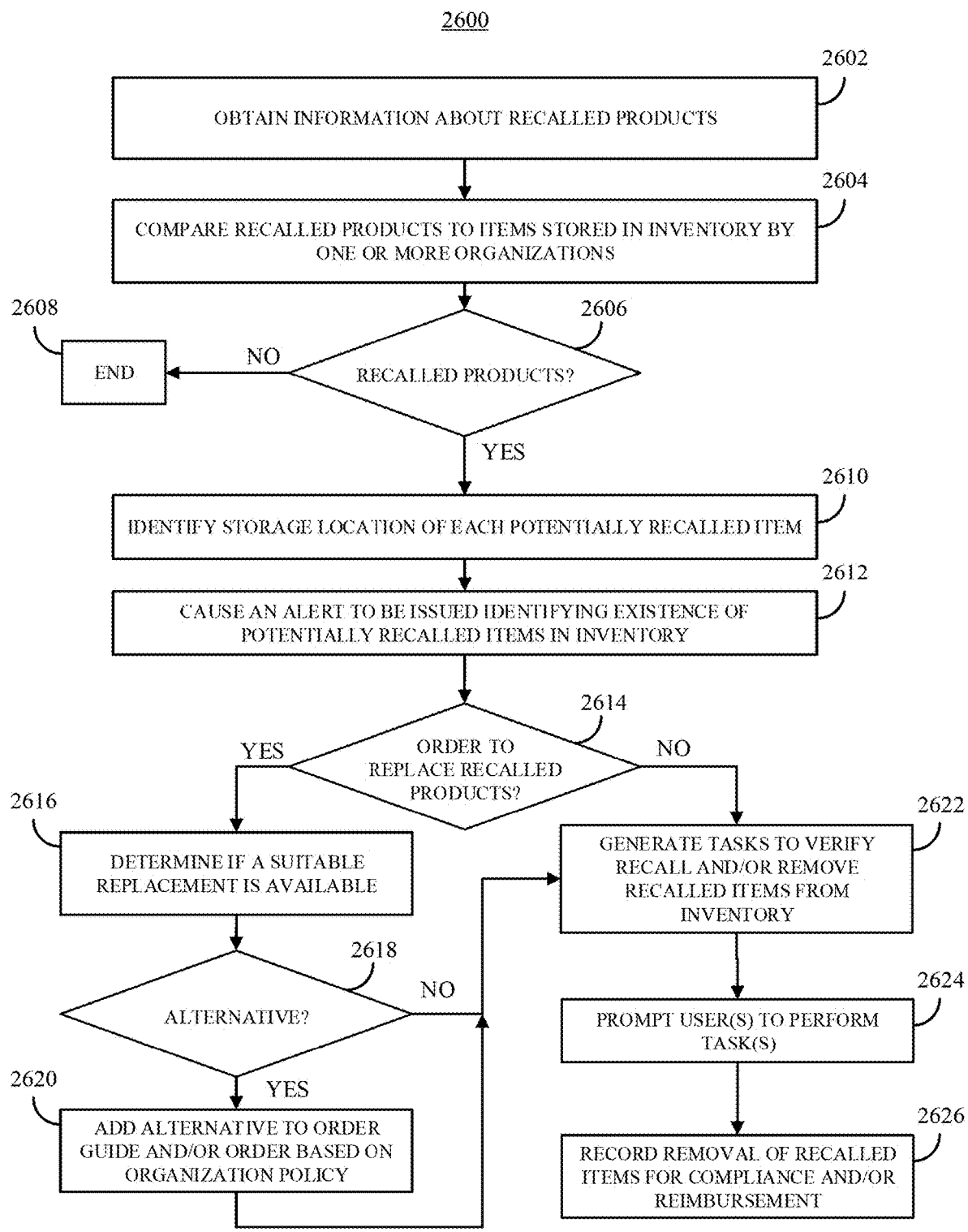
FIG. 26 shows an example of a process for addressing recalls of products in inventory in accordance with some embodiments of the disclosed subject matter.

FIG. 26 shows an example 2600 of a process for addressing recalls of products in inventory in accordance with some embodiments of the disclosed subject matter. As shown in FIG. 26, at 2602, process 2600 can obtain information about recalled products that may be in an inventory of one or more organizations. In some embodiments, process 2600 can obtain the recall information from any suitable source. For example, process 2600 can obtain recall information from a government or government entity (e.g., from one or more Food and Drug Administration (FDA) databases, from one or more United States Department of Agriculture (USDA) databases). As another example, process 2600 can obtain recall information from a manufacturer and/or organization (e.g., a trade association) affiliated with one or more manufacturers (e.g., from one or more databases made available by trade associations, from one or more databases made available by a manufacturer).

In some embodiments, the recall information can include any suitable identifying information about the product or products that are subject to recall. For example, the recall information can identify a product name, a provenance, a manufacturing date or range of manufacturing dates, a lot number or range of lot numbers, and/or any other suitable information.

At 2604, process 2600 can compare information about products that have been recalled to information about items stored in an inventory of one or more organizations. In some embodiments, the information can be compared using any suitable technique or combination of techniques, and using any suitable information. In some embodiments, process 2600 can determine whether an item in inventory of an organization is a recalled product based on the identifying information of the item (e.g., a UPC, a SKU, a semantically meaningful name, a lot number, a serial number, or the like), or a combination of different types of identifying information. If the identifying information of the item in inventory matches the identifying information of the recalled product, process 2600 can determine that the item is potentially a recalled product. In some embodiments, if the identifying information of the item in inventory does not match the identifying information of the recalled product exactly (e.g., if the metadata of the item in inventory is missing information, or if multiple pieces of metadata match but a critical piece of metadata such as the UPC, SKU, or semantically meaningful name does not match), process 2600 can determine that the item may be a recalled product (e.g., process 2600 can flag the item for further investigation). In some embodiments, the recalled products can be any product that can be stored in inventory as an item, such as food, pharmaceuticals, medical devices, medical implants, tools, and the like.

At 2606, process 2600 can determine if any of the items in inventory for a particular organization are recalled products (or potentially recalled products) based on the comparison at 2604. If no items were identified as being potentially recalled ("NO" at 2606), process 2600 can end at 2608. Otherwise, if items were identified as being potentially recalled ("YES" at 2606), process 2600 can move to 2610.

At 2610, process 2600 can identify a storage location of each potentially recalled item (e.g., based on records made when the items were stored). For example, process 2600 can query an inventory management system (e.g., provided via inventory management service 404) for a storage location of any items with characteristics that match the recalled products.

At 2612, process 2600 can cause an alert to be issued to one or more users identifying the existence of the potentially recalled items in inventory of the organization. In some embodiments, the alert can include general information about the products that have been recalled that may potentially be in inventory, identifying information of the facilities in which the products may be in inventory (e.g., as items stored in one or more storage locations). In some embodiments, process 2600 can cause the alert to be issued to any suitable user or users. For example, process 2600 can cause an alert to be issued to a user associated with the organization (e.g., a user associated with overall operations of the organization). As another example, process 2600 can cause an alert to be issued to a user associated with a department that is responsible for purchasing, storing, using, and/or disposing of the item that has potentially been recalled (e.g., a user with responsibility at the facility for the inventory in which the item is located). In such an example, if multiple products have been recalled at a single facility, an alert can be issued to multiple users at the facility, such as a user responsible for overall operations of the facility, a user responsible for food preparation (e.g., if a food product has been recalled), and a user responsible for maintaining an inventory of over the counter medications (e.g., if an over the counter drug has been recalled). In such an example, the user responsible for overall operations can receive an alert indicating that both the food product and the over the counter medication have been recalled, while the user responsible for food preparation only receives an alert indicating that the food product has been recalled and the user responsible for maintaining an inventory of over the counter medications only receives an alert indicating that the over the counter medication has been recalled.

In some embodiments, the alert can be associated with a user interface element that, when selected, initiates an order for a replacement for the potentially recalled items. For example, if a food item (e.g., ground beef) has been recalled, an alert can be generated that is sent to both a user that is responsible for overall operations of a facility and a user that is responsible for ordering food for the facility. In such an example, one or both of the alerts can be associated with a selectable user interface element that facilitates replacing the recalled product with a suitable alternative (e.g., to minimize the disruption caused by the recall). In some embodiments, selecting the user interface element can initiate an ordering process for an alternative to the potentially recalled item(s).

If process 2600 determines that an order to replace the recalled products has been initiated ("YES" at 2614), process 2600 can move to 2616.

At 2616, process 2600 can determine if a suitable replacement is available for the recalled item. In some embodiments, process 2600 can use any suitable technique or combination of techniques to determine if a suitable replacement is available. For example, process 2600 can use one or more techniques for selecting an alternative described above in connection with FIGS. 6-10K. For example, if the recalled product was ordered using a facility order guide, process 2600 can determine whether there is a next highest priority item in a product group from which the item was selected for inclusion in the facility order guide (e.g., as described above in connection with FIG. 8). In such an example, if the potentially recalled item was a highest priority item, and a second highest priority item is available for delivery to the facility, process 2600 can generate an order for a replacement quantity of the second highest priority item. As another example, process 2600 can identify a suitable alternative to the recalled product if the recalled item was not part of a product group and/or other products in the product group are not available for delivery to the facility (e.g., within a threshold amount of time). In such an example, process 2600 can identify a suitable alternative as described above in connection with 812 of FIG. 8.

At 2618, if process 2600 determines that a suitable alternative exists ("YES" at 2618), process 2600 can move to 2620.

At 2620, process 2600 can add the alternative to a master order guide, a facility order guide, and/or an order for the facility based on organization policy. In some embodiments, process 2600 can use any suitable technique or combination of techniques to determine if a suitable replacement is available. In some embodiments, if the replacement has already been identified as an acceptable alternative, the order can be automatically placed (e.g., without user intervention) and/or can be expedited (e.g., based on the urgency of replacing the recalled item). Alternatively, in some embodiments, regardless of whether the replacement has already been identified as an acceptable alternative, a user can be required to review and authorize the order.

Otherwise, if process 2600 determines that an order to replace the recalled products has not been initiated ("NO" at 2614), if there is no acceptable alternative ("NO" at 2618) and/or if the alternative has been added to an order, process 2600 can move to 2622.

At 2622, process 2600 can generate one or tasks for users to verify the recall status of the potentially recalled items and/or to remove any recalled items from inventory. In some embodiments, process 2600 can generate such tasks using any suitable technique or combination of techniques, such as techniques described above in connection with 1218 of FIG. 12.

At 2624, process 2600 can prompt one or more users to perform the tasks to verify the recall status of the items and/or to remove the potentially recalled items from inventory. In some embodiments, a user tasked with removing the potentially recalled items can be any suitable user, such as an employee associated with the organization or an employee of a distributor delivering a replacement for the recalled product. In a particular example, as described above in connection with 1220 of FIG. 12, a distributor can be given access to an inventory management service to permit the distributor to stock a facility with items being delivered. In such an example, the distributor can also be tasked with removing the potentially recalled items.

At 2626, process 2600 can record the removal of recalled items (e.g., as described above in connection with 1212-1216 of FIG. 12). In some embodiments, the record of the removal and/or disposal of the recalled items can be used to verify compliance with one or more policies, rules, regulations, and/or laws. Additionally, in some embodiments, the record of the removal and/or disposal of the recalled items can be used to request reimbursement (e.g., from a manufacturer of the recalled item).

Figure 27:
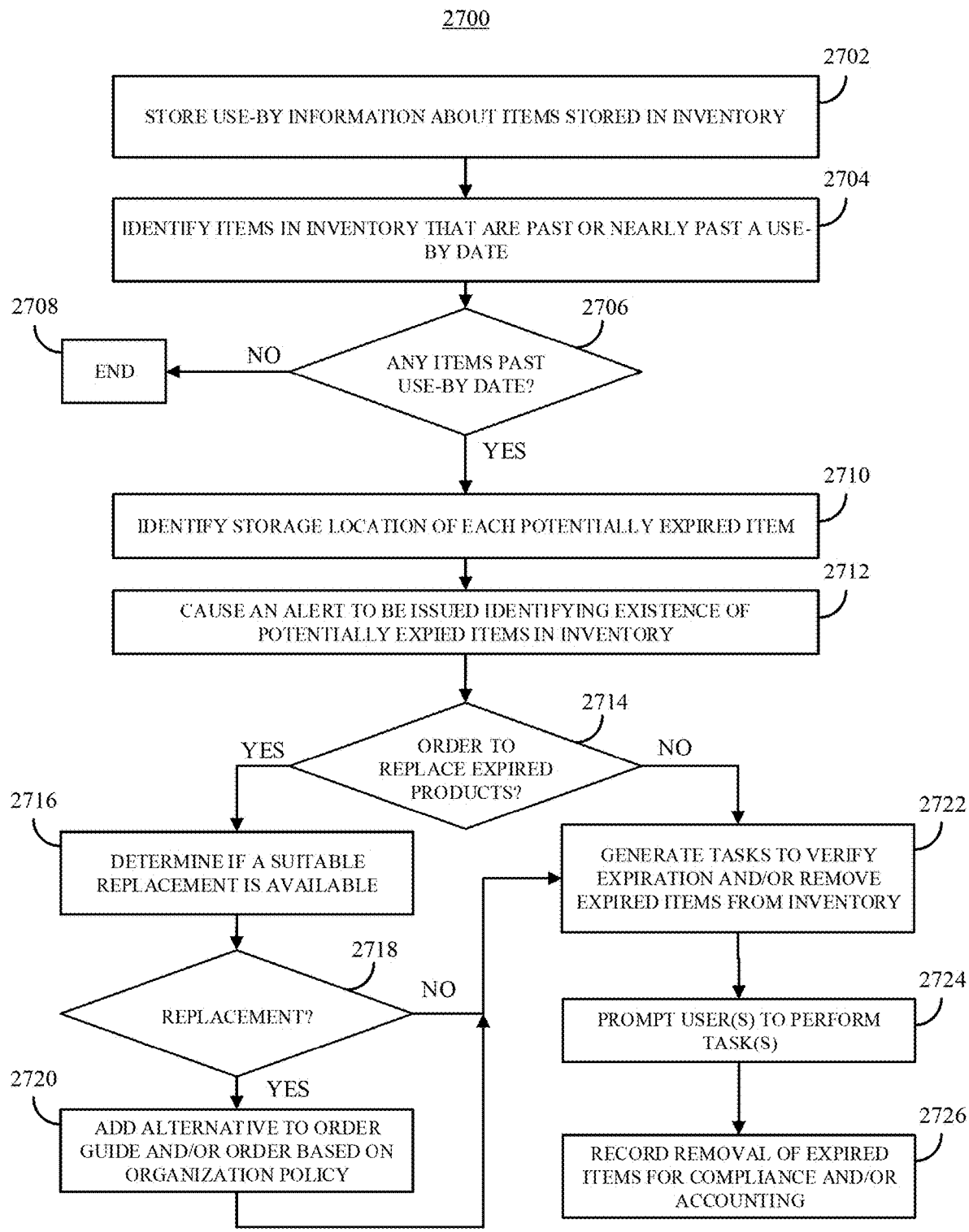
FIG. 27 shows an example of a process for addressing products in inventory that have reached a use-by date in accordance with some embodiments of the disclosed subject matter.

FIG. 27 shows an example 2700 of a process for addressing products in inventory that have reached a use-by date in accordance with some embodiments of the disclosed subject matter. As shown in FIG. 27, at 2702, process 2700 can store information use-by information about items that are stored in inventory. In some embodiments, process 2700 can determine a use-by information based on any suitable information. For example, a use-by date can be explicitly associated with an item (e.g., personal protective equipment, sterilized equipment that must be re-sterilized after a specified time period has elapsed, pharmaceuticals). As another example, a user-by date can be inferred based on the date that the item was received and/or stored (e.g., perishable food can be assigned a use-by date that is based on when the item was first received and/or where the item is being stored such as at room temperature or in a freezer, items with a warranty or service plan can be assigned a use-by date based on the expiration of the warranty and/or service plan). As yet another example, a use-by date can be based on a date of manufacture and an expected shelf life of the item.

At 2704, process 2700 can identify items in inventory that are past or nearly past (e.g., within one day, a few days, a week, a month) of the user-by date. In some embodiments, process 2700 can identify such items using any suitable technique or combination of techniques, such as by submitting a database query for items that have a use-by date within a certain date range.

At 2706, process 2700 can determine if any of the items in inventory for a particular organization are expired or nearly expired (i.e., past and/or nearly past a use-by date). If no items were identified as being potentially expired ("NO" at 2706), process 2700 can end at 2708. Otherwise, if items were identified as being potentially expired ("YES" at 2706), process 2700 can move to 2710.

At 2710, process 2700 can identify a storage location of each potentially expired item (e.g., based on records made when the items were stored). For example, process 2700 can query an inventory management system (e.g., provided via inventory management service 404) for a storage location of any items with a use-by date that falls within a specified date range.

At 2712, process 2700 can cause an alert to be issued to one or more users identifying the existence of the potentially expired items in inventory of the organization. In some embodiments, the alert can include general information about the products that are potentially expired that are in inventory, identifying information of the facilities in which the products are in inventory (e.g., as items stored in one or more storage locations). In some embodiments, process 2700 can cause the alert to be issued to any suitable user or users. For example, process 2700 can cause an alert to be issued to a user associated with the organization (e.g., a user associated with overall operations of the organization). As another example, process 2700 can cause an alert to be issued to a user associated with a department that is responsible for purchasing, storing, using, and/or disposing of the item that is potentially expired (e.g., a user with responsibility at the facility for the inventory in which the item is located). In such an example, if multiple products are potentially expired at a single facility, an alert can be issued to multiple users at the facility, such as a user responsible for overall operations of the facility, a user responsible for food preparation (e.g., if one or more food items are potentially expired), and a user responsible for maintaining an inventory of over the counter medications (e.g., if an over the counter drug is potentially expired). In such an example, the user responsible for overall operations can receive an alert indicating that both the food product and the over the counter medication are potentially expired, while the user responsible for food preparation only receives an alert indicating that the food product is potentially expired and the user responsible for maintaining an inventory of over the counter medications only receives an alert indicating that the over the counter medication is potentially expired.

In some embodiments, the alert can be associated with a user interface element that, when selected, initiates an order for a replacement for the potentially expired item(s). For example, if a food item (e.g., a container of emergency rations) is potentially expired, an alert can be generated that is sent to both a user that is responsible for overall operations of a facility and a user that is responsible for ordering food for the facility. In such an example, one or both of the alerts can be associated with a selectable user interface element that facilitates replacing the potentially expired item(s) with a suitable replacement (e.g., the same item if available and suitable, or a different item if not available or if the organization no longer finds the item that has potentially expired to be suitable, to minimize the disruption caused by the expiring item(s)). In some embodiments, selecting the user interface element can initiate an ordering process for an alternative to the potentially expiring item(s).

If process 2700 determines that an order to replace the expired or expiring item(s) has been initiated ("YES" at 2714), process 2700 can move to 2716.

At 2716, process 2700 can determine if a suitable replacement is available for the expired and/or expiring item(s). In some embodiments, process 2700 can use any suitable technique or combination of techniques to determine if a suitable replacement is available. For example, process 2700 can use one or more techniques for selecting an alternative described above in connection with FIGS. 6-10K. For example, if the expiring and/or expired item was ordered using a facility order guide, process 2700 can determine whether the product group that included that item is still on a general order guide associated with the facility and/or a highest priority item in the product group from which the item was selected for inclusion in the facility order guide (e.g., as described above in connection with FIG. 8). In such an example, if the expiring and/or expired item is still a highest priority item, process 2700 can generate an order for a replacement quantity of the same item. As another example, process 2700 can identify a suitable alternative to the expiring and/or expired product if the produce group from which it was selected is no longer on a general order guide associated with the facility, or all products in the product group are unavailable for delivery to the facility (e.g., within a threshold amount of time). In such an example, process 2700 can identify a suitable alternative as described above in connection with 812 of FIG. 8.

At 2718, if process 2700 determines that a suitable replacement exists ("YES" at 2718), process 2700 can move to 2720.

At 2720, process 2700 can add the replacement to a master order guide, a facility order guide, and/or an order for the facility based on organization policy. In some embodiments, process 2700 can use any suitable technique or combination of techniques to determine if a suitable replacement is available. In some embodiments, if the replacement has already been identified as an acceptable alternative, the order can be automatically placed (e.g., without user intervention) and/or can be expedited (e.g., based on the urgency of replacing the expiring and/or expired item). Alternatively, in some embodiments, regardless of whether the replacement has already been identified as an acceptable alternative, a user can be required to review and authorize the order.

Otherwise, if process 2700 determines that an order to replace the recalled products has not been initiated ("YES" at 2714), if there is no acceptable alternative ("YES" at 2718) and/or if the alternative has been added to an order, process 2700 can move to 2722.

At 2722, process 2700 can generate one or tasks for users to verify the expired status of the potentially expired items and/or to remove any expired items from inventory. In some embodiments, process 2700 can generate such tasks using any suitable technique or combination of techniques, such as techniques described above in connection with 1218 of FIG. 12.

At 2724, process 2700 can prompt one or more users to perform the tasks to verify the expired status of the items and/or to remove the potentially expired items from inventory. In some embodiments, a user tasked with removing the potentially expired items can be any suitable user, such as an employee associated with the organization or an employee of a distributor delivering a replacement for the expired items. In a particular example, as described above in connection with 1220 of FIG. 12, a distributor can be given access to an inventory management service to permit the distributor to stock a facility with items being delivered. In such an example, the distributor can also be tasked with removing the potentially expired items and replacing them with new items.

At 2726, process 2700 can record the removal of expired items (e.g., as described above in connection with 1212-1216 of FIG. 12). In some embodiments, the record of the removal and/or disposal of the expired items can be used to verify compliance with one or more policies, rules, regulations, and/or laws. Additionally, in some embodiments, the record of the removal and/or disposal of the expired items can be used to request partial reimbursement (e.g., from a distributor of the expired item) and/or to track the loss of the item(s) for accounting purposes.

It should be noted that, as used herein, the term mechanism can encompass hardware, software, firmware, or any suitable combination thereof.

It should be understood that the above described steps of the process of FIGS. 6-9, 12-15, and 20-27 can be executed or performed in any order or sequence not limited to the order and sequence shown and described in the figures. Also, some of the above steps of the processes of FIGS. 6-9, 12-15, and 20-27 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for automatically addressing recall of items in an inventory, the method comprising:
receiving, from a remote computing device, information indicating that one or more items are subject to a recall;
determining, without user intervention, that one or more items stored in a facility are potentially recalled based on the information indicating that the one or more items are subject to recall and based on information about items currently stored in the facility;
causing an alert to be issued to a user associated with the facility, wherein the alert indicates that one or more potentially recalled items are stored in the facility;
prompting the user to perform a task associated with a first potentially recalled item associated with a storage location;
causing a mobile device to present identifying information associated with the first potentially recalled item in a user interface in connection with identifying information associated with the storage location;
receiving, from the mobile device, identifying information associated with a transmitting device;
determining, based on the identifying information associated with the transmitting device, that a first location within the facility corresponding to a location of the mobile device is proximate to the storage location;
receiving, from the mobile device, an indication that the task has been completed;
recording that the task associated with the first potentially recalled item has been completed;
receiving identifying information associated with a plurality of items, wherein the plurality of items includes the first potentially recalled item;
causing a second mobile device to present at least a subset of the plurality of items in a user interface;
receiving, from the second mobile device, identifying information associated with the transmitting device, wherein the transmitting device is associated with a second location within the facility;
determining, based on the identifying information associated with the transmitting device, a third location within the facility corresponding to a location of the second mobile device;
receiving, from the second mobile device, an indication that the first potentially recalled item is being stored at the third location;
receiving, from the second mobile device, metadata associated with the first potentially recalled item, wherein the metadata associated with the first potentially recalled item is useable to determine when the item was produced; and
associating the first potentially recalled item and associated metadata with the storage location, which is proximate to the third location, wherein associating the first potentially recalled item with the storage location is performed prior to receiving the information indicating that one or more items are subject to a recall.

2. The method of claim 1, wherein the task comprises verifying whether the first potentially recalled item associated with a storage location are subject to the recall.

3. The method of claim 1,
wherein receiving the indication that the task has been completed comprises receiving an indication that the first potentially recalled item has been removed from the storage location, and
wherein recording that the task associated with the first potentially recalled item has been completed comprises recording that the first potentially recalled item has been removed from the storage location.

4. The method of claim 1, further comprising:
causing a computing device to present a selectable user interface element associated with the alert;
receiving, from the computing device, an indication that the user interface element has been selected; and
in response to receiving the indication that the user interface element has been selected, initiating an order for a replacement for the first potentially recalled item.

5. The method of claim 1, further comprising:
causing the mobile device to present a selectable user interface element associated with the alert;
receiving, from the mobile device, an indication that the user interface element has been selected; and
in response to receiving the indication that the user interface element has been selected, initiating an order for a replacement for the first potentially recalled item.

6. The method of claim 1, further comprising:
identifying, without user intervention, at least one potential substitute for the first potentially recalled item, wherein the at least one potential substitute includes a second item.

7. The method of claim 6, further comprising:
determining that the second item is available in portion of a distribution network that includes the facility; and
adding, without user intervention, the second item to an order guide associated with the facility.

8. The method of claim 1, further comprising:
causing the mobile device to present directions from a current location of the mobile device to the storage location.

9. The method of claim 1, further comprising:
receiving, from the mobile device, an indication that the first potentially recalled item does not correspond to any of the one or more items that are subject to the recall.

10. The method of claim 1, wherein the information indicating that one or more items are subject to the recall comprises identifying information associated with a first recalled item, and
wherein determining that one or more items stored in the facility are potentially recalled comprises:
comparing the identifying information associated with the first recalled item to identifying information associated with one or more items stored in the facility.

11. The method of claim 10, wherein the identifying information associated with the first recalled item includes one or more lot numbers subject to the recall.

12. The method of claim 11, wherein comparing the identifying information associated with the first recalled item to identifying information associated with one or more items stored in the facility comprises:
comparing a lot number associated with the first potentially recalled item to the one or more lot numbers.

13. The method of claim 1, further comprising:
transmitting, to a remote server, a request for recall information; and
receiving the information indicating that one or more items are subject to the recall responsive to the request.

14. The method of claim 1, further comprising:
causing the alert to be issued to a second user associated with the facility.

15. The method of claim 1, further comprising:
receiving, from the second mobile device, identifying information of a user associated with the second mobile device; and
recording that the user associated with the second mobile device stored the first potentially recalled item at the third location.

16. The method of claim 1, wherein receiving the indication that the task has been completed comprises receiving an indication that the first potentially recalled item has been removed from the storage location, and the method further comprises:
receiving, from the mobile device, identifying information of a user associated with the mobile device; and
recording that the user associated with the mobile device removed the first potentially recalled item from the storage location.

17. The method of claim 1, wherein the transmitting device is a Bluetooth beacon and the identifying information associated with the transmitting device is a universally unique identifier (UUID), the method further comprising:

receiving, from the mobile device, data indicative of a signal strength of a signal received from the transmitting device.

18. The method of claim 1, wherein the first potentially recalled item is a medical device.

19. A system for automatically addressing recall of items in an inventory, the system comprising:
at least one hardware processor that is programmed to:
receive, from a remote computing device, information indicating that one or more items are subject to a recall;
determine, without user intervention, that one or more items stored in a facility are potentially recalled based on the information indicating that the one or more items are subject to recall and based on information about items currently stored in the facility;
cause an alert to be issued to a user associated with the facility, wherein the alert indicates that one or more potentially recalled items are stored in the facility;
prompt the user to perform a task associated with a first potentially recalled item associated with a storage location;
cause a mobile device to present identifying information associated with the first potentially recalled item in a user interface in connection with identifying information associated with the storage location;
receive, from the mobile device, identifying information associated with a transmitting device;
determine, based on the identifying information associated with the transmitting device, that a first location within the facility corresponding to a location of the mobile device is proximate to the storage location;
receive, from the mobile device, an indication that the task has been completed;
record that the task associated with the first potentially recalled item has been completed;
receive identifying information associated with a plurality of items, wherein the plurality of items includes the first potentially recalled item;
cause a second mobile device to present at least a subset of the plurality of items in a user interface;
receive, from the second mobile device, identifying information associated with the transmitting device, wherein the transmitting device is associated with a second location within the facility;
determine, based on the identifying information associated with the transmitting device, a third location within the facility corresponding to a location of the second mobile device;
receive, from the second mobile device, an indication that the first potentially recalled item is being stored at the third location;
receive, from the second mobile device, metadata associated with the first potentially recalled item, wherein the metadata associated with the first potentially recalled item is useable to determine when the item was produced; and
associate the first potentially recalled item and associated metadata with the storage location, which is proximate to the third location, wherein associating the first potentially recalled item with the storage location is performed prior to receiving the information indicating that one or more items are subject to a recall.

20. A non-transitory computer readable medium containing computer executable instructions that, when executed by a processor, cause the processor to perform a method for automatically addressing recall of items in an inventory, the method comprising:
receiving, from a remote computing device, information indicating that one or more items are subject to a recall;
determining, without user intervention, that one or more items stored in a facility are potentially recalled based on the information indicating that the one or more items are subject to recall and based on information about items currently stored in the facility;
causing an alert to be issued to a user associated with the facility, wherein the alert indicates that one or more potentially recalled items are stored in the facility;
prompting the user to perform a task associated with a first potentially recalled item associated with a storage location;
causing a mobile device to present identifying information associated with the first potentially recalled item in a user interface in connection with identifying information associated with the storage location;
receiving, from the mobile device, identifying information associated with a transmitting device;
determining, based on the identifying information associated with the transmitting device, that a first location within the facility corresponding to a location of the mobile device is proximate to the storage location;
receiving, from the mobile device, an indication that the task has been completed;
recording that the task associated with the first potentially recalled item has been completed;
receiving identifying information associated with a plurality of items, wherein the plurality of items includes the first potentially recalled item;
causing a second mobile device to present at least a subset of the plurality of items in a user interface;
receiving, from the second mobile device, identifying information associated with the transmitting device, wherein the transmitting device is associated with a second location within the facility;
determining, based on the identifying information associated with the transmitting device, a third location within the facility corresponding to a location of the second mobile device;
receiving, from the second mobile device, an indication that the first potentially recalled item is being stored at the third location;
receiving, from the second mobile device, metadata associated with the first potentially recalled item, wherein the metadata associated with the first potentially recalled item is useable to determine when the item was produced; and
associating the first potentially recalled item and associated metadata with the storage location, which is proximate to the third location, wherein associating the first potentially recalled item with the storage location is performed prior to receiving the information indicating that one or more items are subject to a recall.

* * * * *